United States Patent
Decoufle

(10) Patent No.: US 10,173,139 B2
(45) Date of Patent: Jan. 8, 2019

(54) SYSTEMS AND METHODS FOR PLAYING ELECTRONIC GAMES AND SHARING DIGITAL MEDIA

(71) Applicant: Blueboard Media, LLC, Atlanta, GA (US)

(72) Inventor: Christopher J. Decoufle, Atlanta, GA (US)

(73) Assignee: BLUEBOARD MEDIA, LLC, Atlanta, GA (US)

(*) Notice: Subject to any disclaimer, the term of this patent is extended or adjusted under 35 U.S.C. 154(b) by 0 days.

(21) Appl. No.: 14/601,203

(22) Filed: Jan. 20, 2015

(65) Prior Publication Data

US 2016/0096110 A1     Apr. 7, 2016

Related U.S. Application Data

(63) Continuation-in-part of application No. 14/503,828, filed on Oct. 1, 2014, now Pat. No. 9,919,215.

(51) Int. Cl.

| | |
|---|---|
| A63F 13/00 | (2014.01) |
| A63F 13/795 | (2014.01) |
| A63F 13/63 | (2014.01) |
| A63F 13/822 | (2014.01) |
| A63F 13/87 | (2014.01) |
| G06F 17/22 | (2006.01) |
| H04L 29/08 | (2006.01) |

(Continued)

(52) U.S. Cl.
CPC ............ *A63F 13/795* (2014.09); *A63F 13/35* (2014.09); *A63F 13/63* (2014.09); *A63F 13/822* (2014.09); *A63F 13/87* (2014.09); *G06F 17/2247* (2013.01); *G06F 17/241* (2013.01); *G06Q 30/02* (2013.01); *G06Q 50/01* (2013.01); *H04L 67/32* (2013.01); *A63F 2300/6018* (2013.01); *A63F 2300/807* (2013.01)

(58) Field of Classification Search
CPC .................. A63F 3/0421; A63F 3/0423; A63F 2003/0431
See application file for complete search history.

(56) References Cited

U.S. PATENT DOCUMENTS 4,421,487 A    12/1983  Laughon et al.
4,687,201 A     8/1987  Riviera
(Continued)

FOREIGN PATENT DOCUMENTS

EP       2 187 364 A1    5/2010
WO    2013/153447 A2    10/2013

OTHER PUBLICATIONS

Luis Von Ahn, "Games with a Purpose", Computer, Jun. 2006, pp. 96-98, vol. 36, No. 6, IEEE Computer Society Press, US.

(Continued)

*Primary Examiner* — Steven J Hylinski
(74) *Attorney, Agent, or Firm* — Morris, Manning & Martin, LLP; Bryan D. Stewart

(57) ABSTRACT

Various systems and methods for sharing electronic media are disclosed herein. According to particular embodiments, the system enables a user to select media (e.g., an image, a video, a gif, etc,) and compose a phrase to be associated with the media. In some embodiments, the system creates a post from the media and the phrase and enables the user to transmit the post to one or more other users to play (e.g., guess the phrase).

15 Claims, 33 Drawing Sheets

(51) Int. Cl.
*A63F 13/35* (2014.01)
*G06F 17/24* (2006.01)
*G06Q 50/00* (2012.01)
*G06Q 30/02* (2012.01)

(56) References Cited

U.S. PATENT DOCUMENTS

| | | | |
|---|---|---|---|
| 5,203,705 A | 4/1993 | Hardy et al. | |
| 5,607,160 A | 3/1997 | Stevens et al. | |
| 5,921,864 A | 7/1999 | Walker et al. | |
| 6,279,911 B1 | 8/2001 | Cherry | |
| 6,318,722 B1 | 11/2001 | Shafer | |
| 6,340,159 B1 | 1/2002 | Giangrante | |
| 6,450,499 B1* | 9/2002 | Letang | A63F 3/0423 273/272 |
| 6,935,945 B2 | 8/2005 | Orak | |
| 7,686,682 B2 | 3/2010 | Diakopoulos et al. | |
| 7,744,091 B2 | 6/2010 | Berke et al. | |
| 7,785,180 B1 | 8/2010 | von Ahn et al. | |
| 7,867,094 B1* | 1/2011 | Wisdom | A63F 13/63 463/43 |
| 7,909,695 B2 | 3/2011 | Phelps et al. | |
| 7,972,205 B2 | 7/2011 | Krishna | |
| 7,980,953 B2 | 7/2011 | von Ahn Arellano | |
| 8,006,268 B2 | 8/2011 | Sloo | |
| 8,032,483 B1 | 10/2011 | Haveliwala et al. | |
| 8,366,546 B1 | 2/2013 | Naik et al. | |
| 8,397,179 B2 | 3/2013 | Takagi | |
| 8,465,355 B1 | 6/2013 | Liang | |
| 8,556,696 B2 | 10/2013 | Hoyt et al. | |
| 8,565,810 B1* | 10/2013 | Giles et al. | 455/550.1 |
| 8,684,807 B1* | 4/2014 | Crici | A63F 13/795 434/322 |
| 8,840,474 B1* | 9/2014 | Dasan | A63F 13/71 463/40 |
| 9,100,629 B1* | 8/2015 | Brenden | A63F 13/86 |
| 2001/0036865 A1 | 11/2001 | Neal, III | |
| 2002/0016196 A1 | 2/2002 | Orak | |
| 2002/0076684 A1 | 6/2002 | Blevins et al. | |
| 2002/0125637 A1 | 9/2002 | Leis | |
| 2002/0183112 A1 | 12/2002 | Emmerson et al. | |
| 2003/0003990 A1 | 1/2003 | Von Kohorn | |
| 2003/0139210 A1 | 7/2003 | Raben | |
| 2004/0141649 A1* | 7/2004 | Landstad | G06K 9/222 382/189 |
| 2004/0209231 A1 | 10/2004 | Merritt | |
| 2004/0219497 A1 | 11/2004 | Wen et al. | |
| 2005/0049024 A1 | 3/2005 | Unsicker et al. | |
| 2005/0261044 A1 | 11/2005 | Persidsky | |
| 2006/0040242 A1 | 2/2006 | Mejia | |
| 2006/0183092 A1 | 8/2006 | Kogo | |
| 2007/0248938 A1 | 10/2007 | Ronald | |
| 2008/0021957 A1 | 1/2008 | Medved et al. | |
| 2008/0064460 A1 | 3/2008 | Daniel | |
| 2008/0140512 A1 | 6/2008 | Bruster | |
| 2008/0166687 A1 | 7/2008 | McClarty | |
| 2008/0207318 A1 | 8/2008 | Bailey et al. | |
| 2008/0242419 A1 | 10/2008 | Rieman et al. | |
| 2008/0288345 A1 | 11/2008 | Hirsch | |
| 2009/0125296 A1* | 5/2009 | Imlach | G06F 17/276 704/9 |
| 2009/0160130 A1* | 6/2009 | Le Cottier | A63F 9/0098 273/272 |
| 2009/0325661 A1 | 12/2009 | Gross | |
| 2009/0325690 A1* | 12/2009 | Zhou | A63F 13/12 463/29 |
| 2009/0325696 A1 | 12/2009 | Gross | |
| 2011/0029609 A1* | 2/2011 | Kavallierou | H04N 1/0044 709/204 |
| 2011/0133408 A1 | 6/2011 | Phelps et al. | |
| 2011/0230246 A1 | 9/2011 | Brook et al. | |
| 2011/0256513 A1 | 10/2011 | Levitt et al. | |
| 2011/0281638 A1* | 11/2011 | Bansi | A63F 13/69 463/23 |
| 2011/0313996 A1 | 12/2011 | Strauss et al. | |
| 2012/0015748 A1* | 1/2012 | Osada | A63F 13/10 463/43 |
| 2012/0021829 A1 | 1/2012 | Shoham et al. | |
| 2012/0056377 A1 | 3/2012 | Morgan | |
| 2012/0071220 A1 | 3/2012 | Hoyt et al. | |
| 2012/0156668 A1* | 6/2012 | Zelin | G09B 5/12 434/362 |
| 2012/0178073 A1* | 7/2012 | Wasmund | A63F 9/18 434/362 |
| 2012/0178536 A1* | 7/2012 | Oh et al. | 463/42 |
| 2012/0309527 A1 | 12/2012 | Donnell et al. | |
| 2013/0079077 A1* | 3/2013 | Stegall | A63F 13/80 463/9 |
| 2013/0084970 A1 | 4/2013 | Geisner et al. | |
| 2013/0084976 A1 | 4/2013 | Kumaran et al. | |
| 2013/0132904 A1* | 5/2013 | Primiani | G06F 3/04886 715/834 |
| 2013/0165229 A1 | 6/2013 | Park | |
| 2013/0203475 A1 | 8/2013 | Kil et al. | |
| 2013/0236878 A1 | 9/2013 | Saltanov | |
| 2013/0275894 A1* | 10/2013 | Bell | G06Q 50/00 715/764 |
| 2013/0311245 A1* | 11/2013 | Blackburn | G06Q 10/06393 705/7.39 |
| 2013/0324169 A1* | 12/2013 | Kamal | H04W 4/008 455/466 |
| 2013/0325952 A1 | 12/2013 | Draznin et al. | |
| 2014/0082645 A1 | 3/2014 | Stern et al. | |
| 2014/0084540 A1* | 3/2014 | Hedgecock | A63F 3/0423 273/272 |
| 2014/0087881 A1 | 3/2014 | Lipman et al. | |
| 2014/0094275 A1* | 4/2014 | Abouchar et al. | 463/25 |
| 2014/0121011 A1 | 5/2014 | Liu | |
| 2014/0128136 A1 | 5/2014 | Brown et al. | |
| 2014/0179412 A1 | 6/2014 | Seabolt et al. | |
| 2014/0179426 A1 | 6/2014 | Perry et al. | |
| 2014/0187323 A1 | 7/2014 | Perry | |
| 2014/0221066 A1 | 8/2014 | McCord | |
| 2014/0274413 A1 | 9/2014 | Chelst | |
| 2014/0315639 A1 | 10/2014 | Cao et al. | |
| 2014/0344695 A1* | 11/2014 | Lawandus | G06F 3/0484 715/719 |
| 2015/0143221 A1 | 5/2015 | Ahuja et al. | |
| 2015/0304698 A1* | 10/2015 | Redol | H04N 21/854 725/23 |

OTHER PUBLICATIONS

K-1 Student Center Activities: Phonological Awareness, Florida Center for Reading Research, http://www.fcrr.org/studentactivities/PA_024a.pdf, retrieved on Oct. 22, 2014.
How to play Draw Something Game Online, http://www.drawsomethinggameonline.com/, retrieved Oct. 22, 2014.
International Search Report and Written Opinion dated Feb. 3, 2016 in related international application No. PCT/US2015/053564.
Final Office Action dated Dec. 14, 2015 in related U.S. Appl. No. 14/503,828.

* cited by examiner

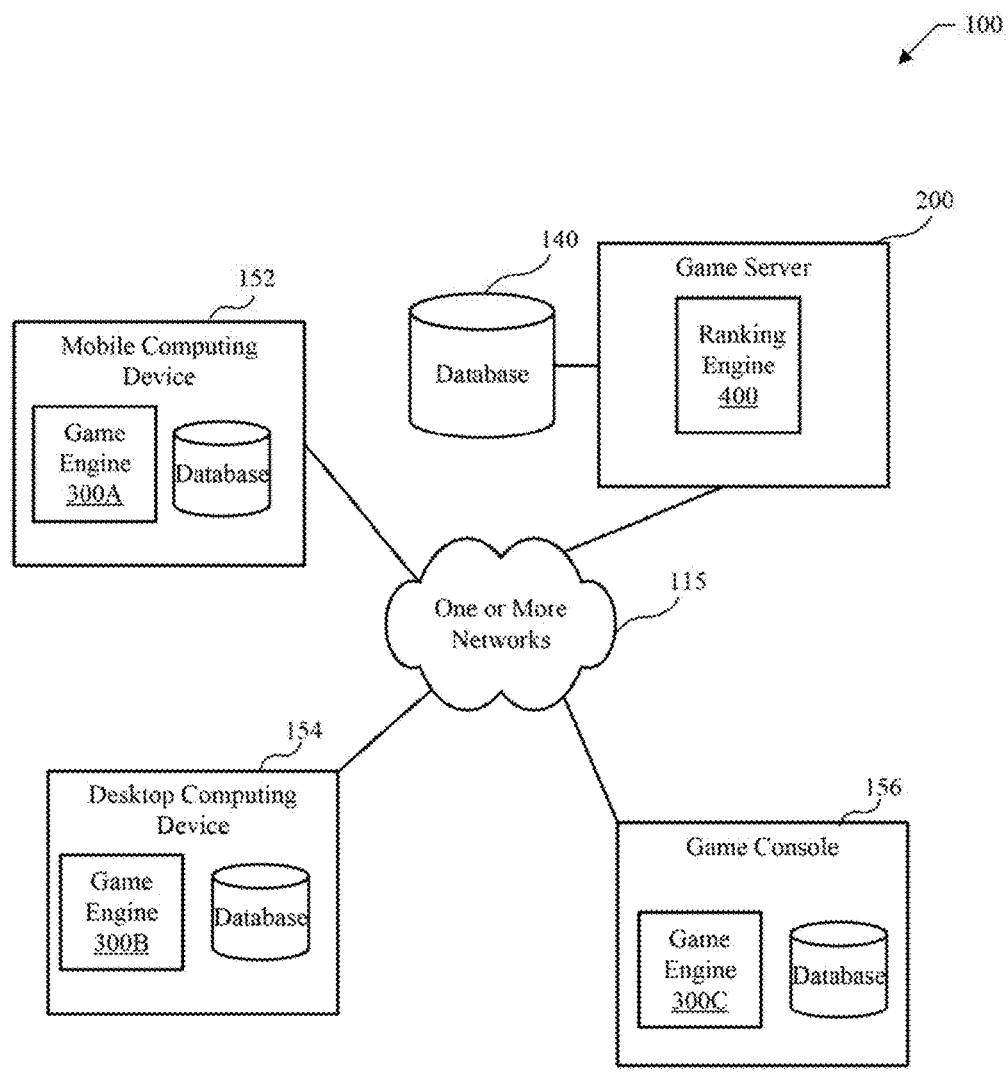
FIG. 1 EXEMPLARY SYSTEM ENVIRONMENT

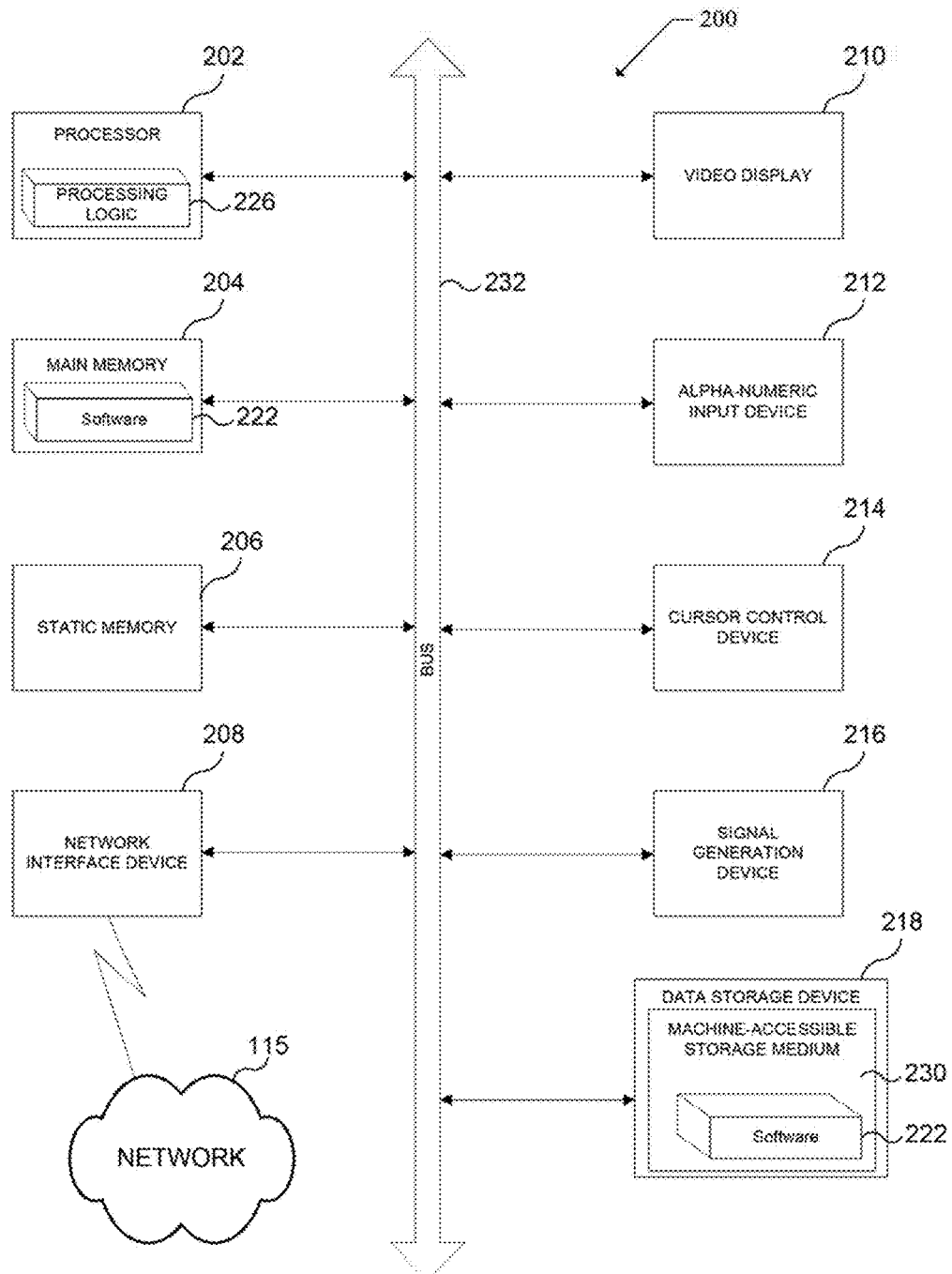
FIG. 2 EXEMPLARY COMPUTER ARCHITECTURE

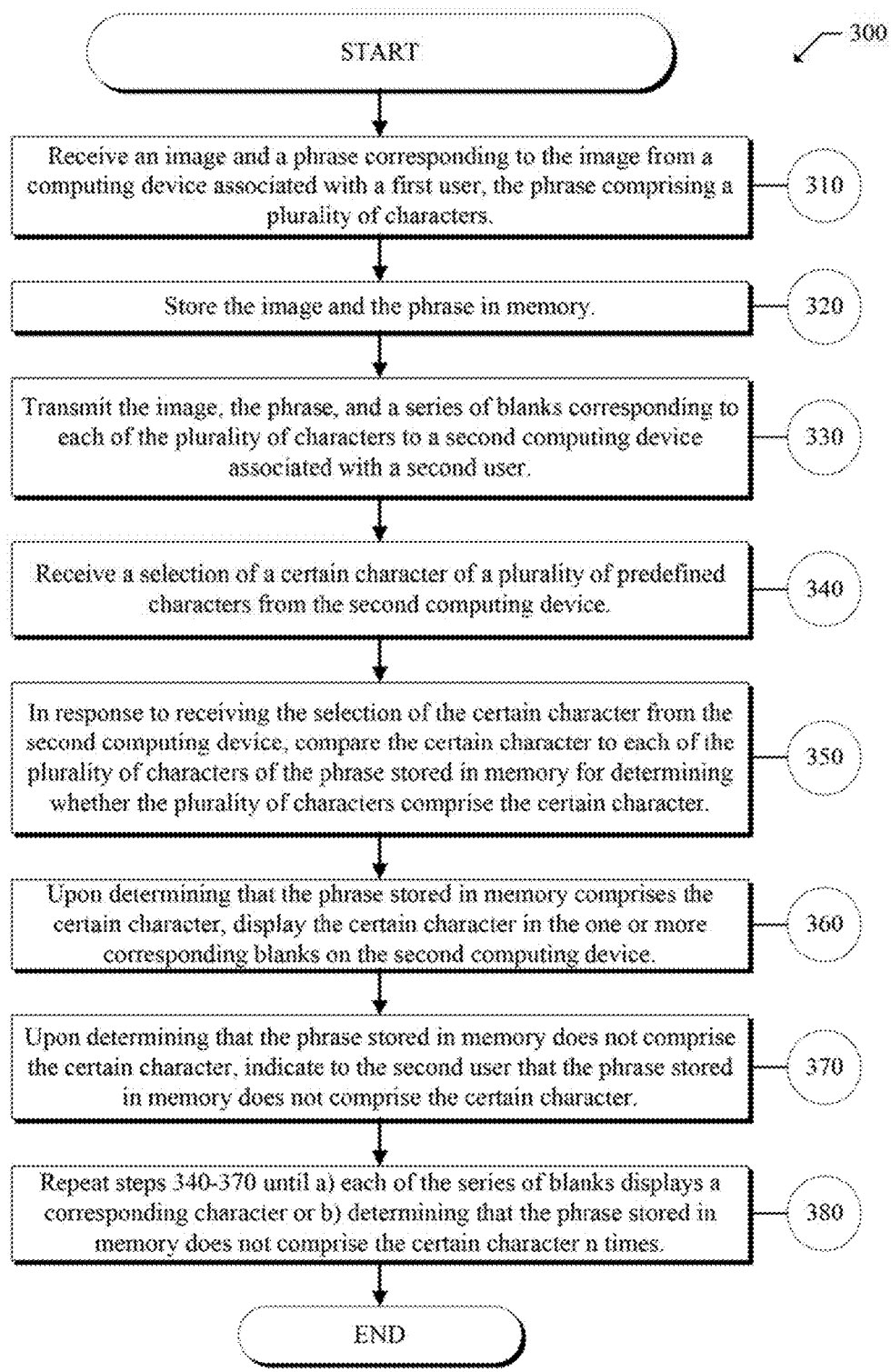
FIG. 3 EXEMPLARY GAME PLAY PROCESS

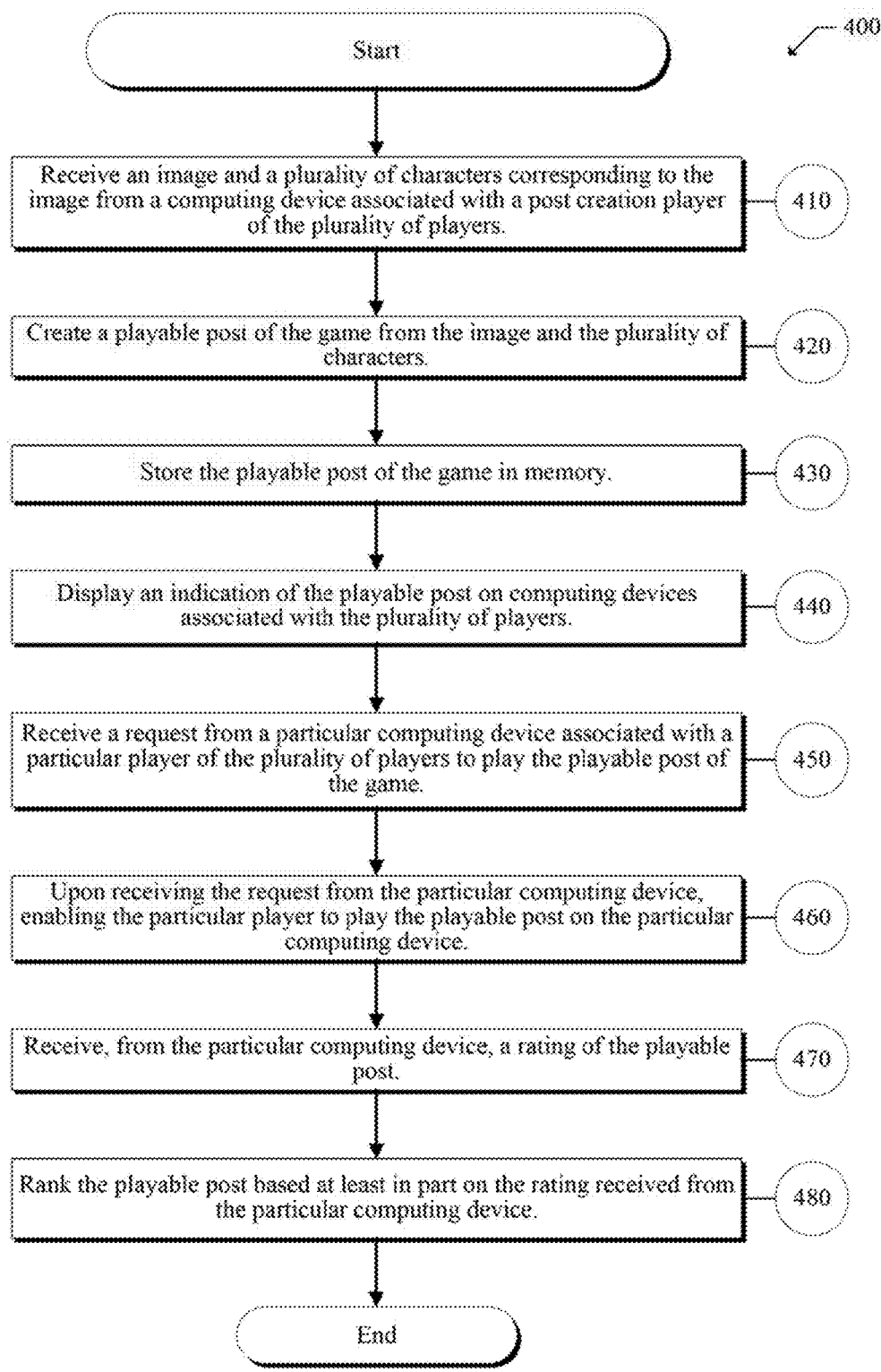
FIG. 4 EXEMPLARY POST RANKING PROCESS

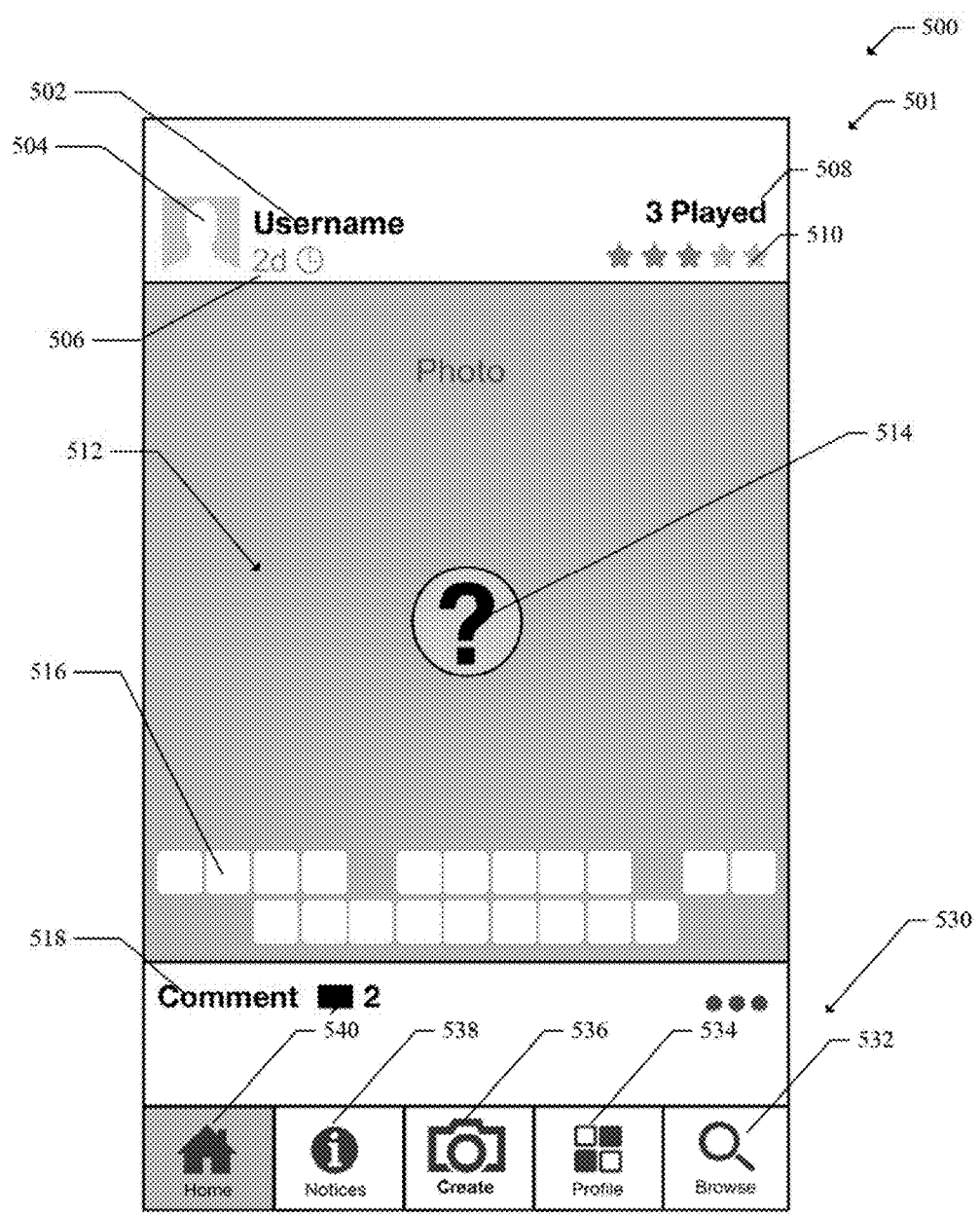
FIG. 5 EXEMPLARY HOME SCREEN

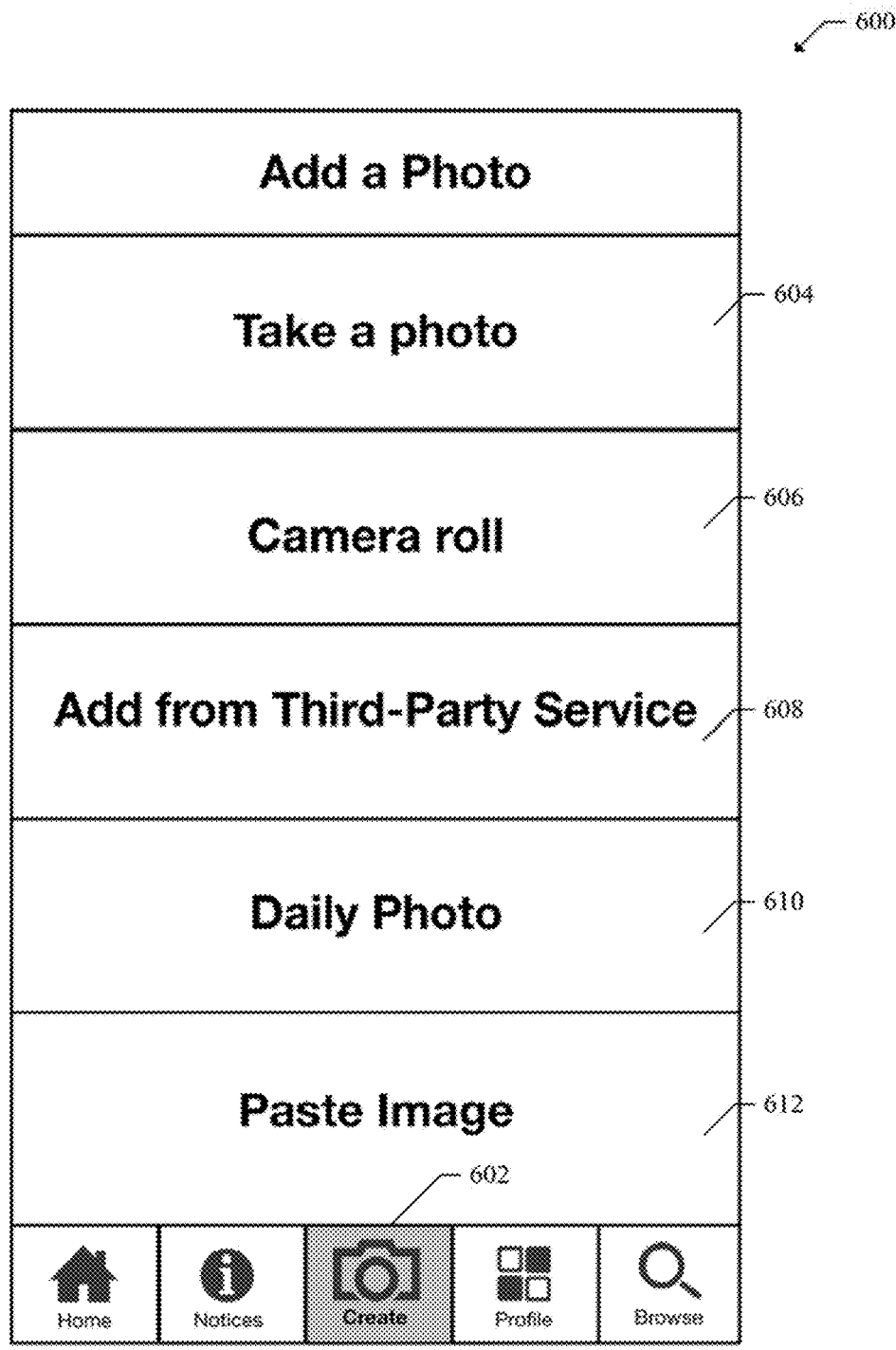
FIG. 6 PHOTO SOURCE SELECTION

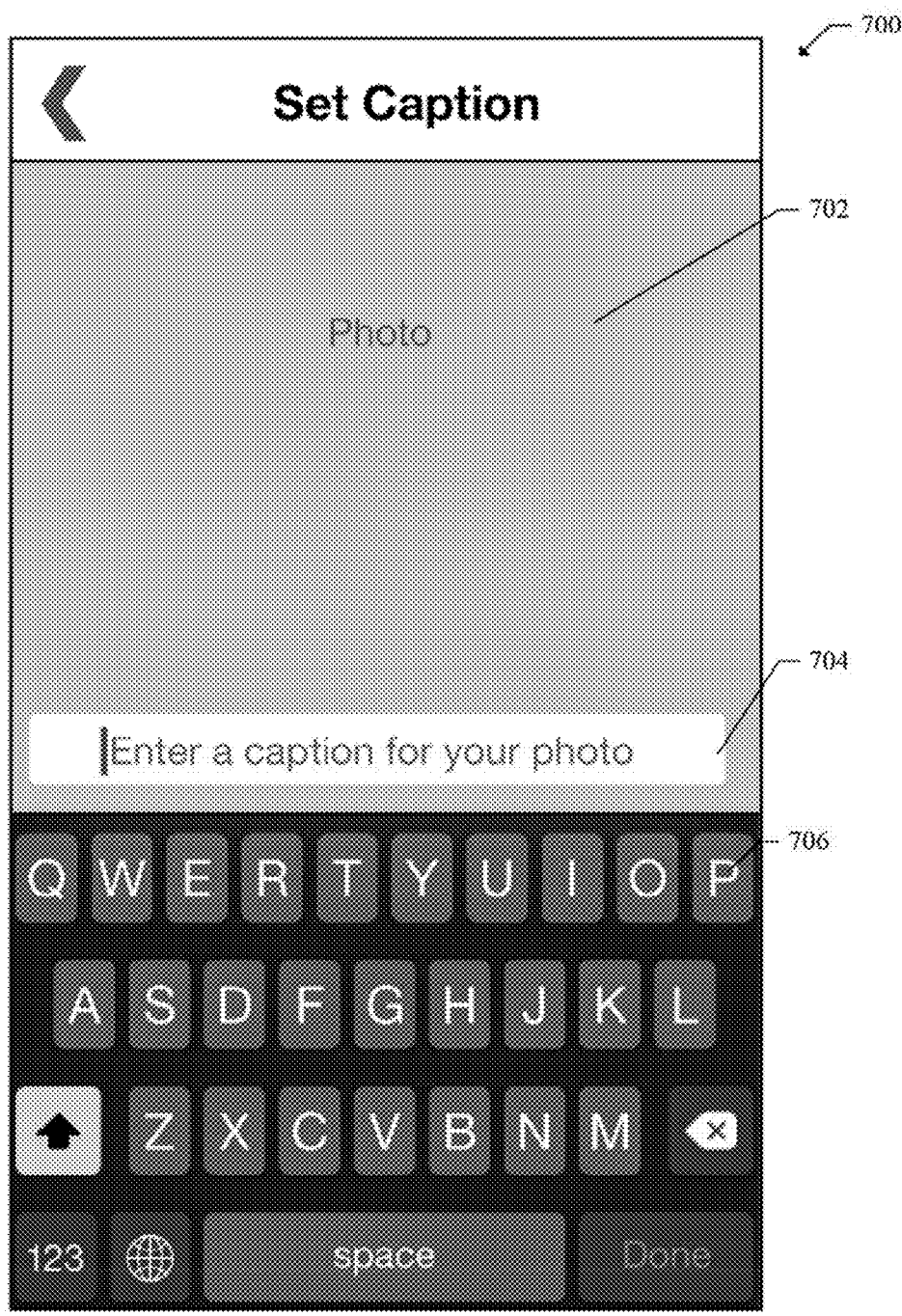
FIG. 7 ADD PHRASE

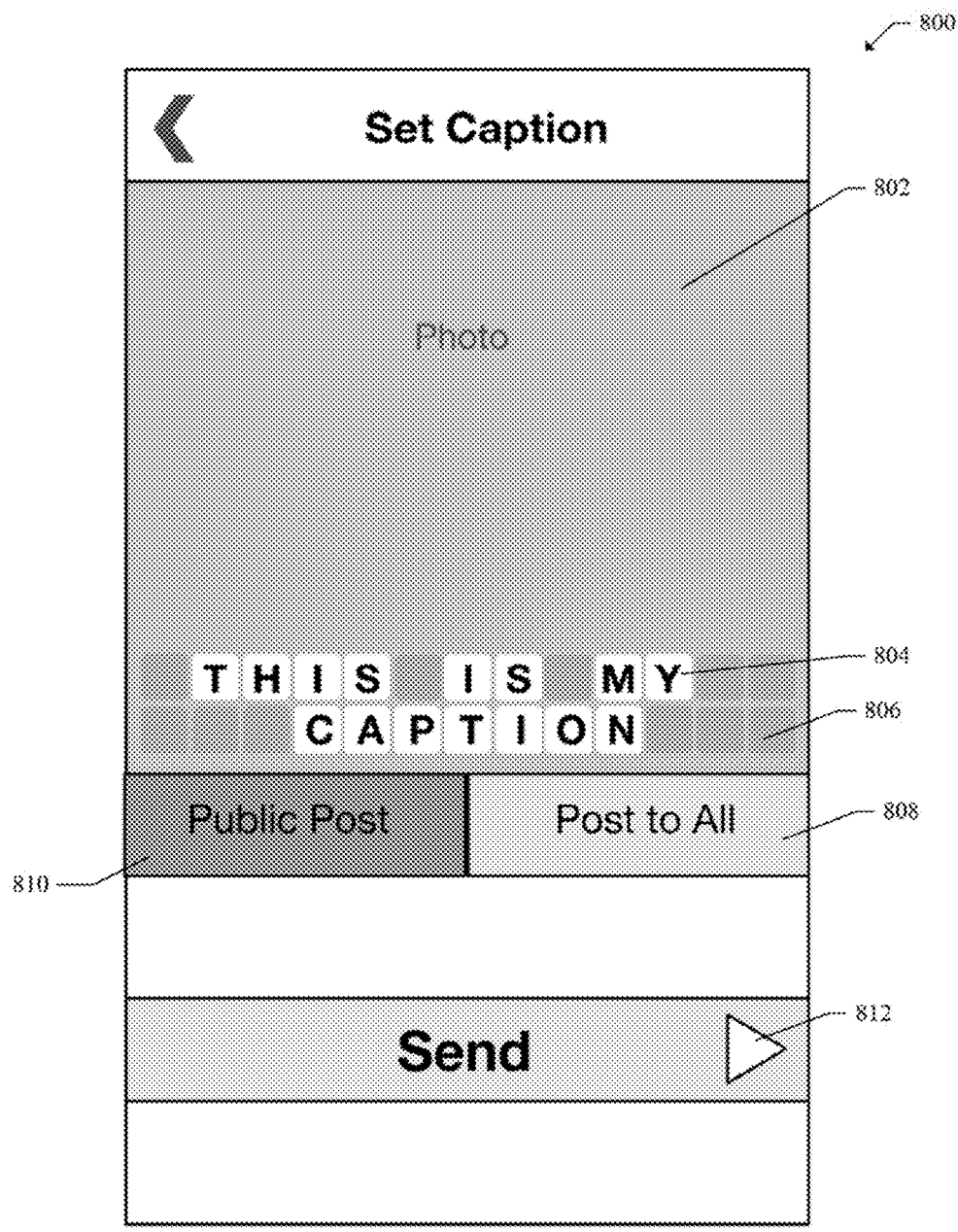
FIG. 8   APPROVE POST

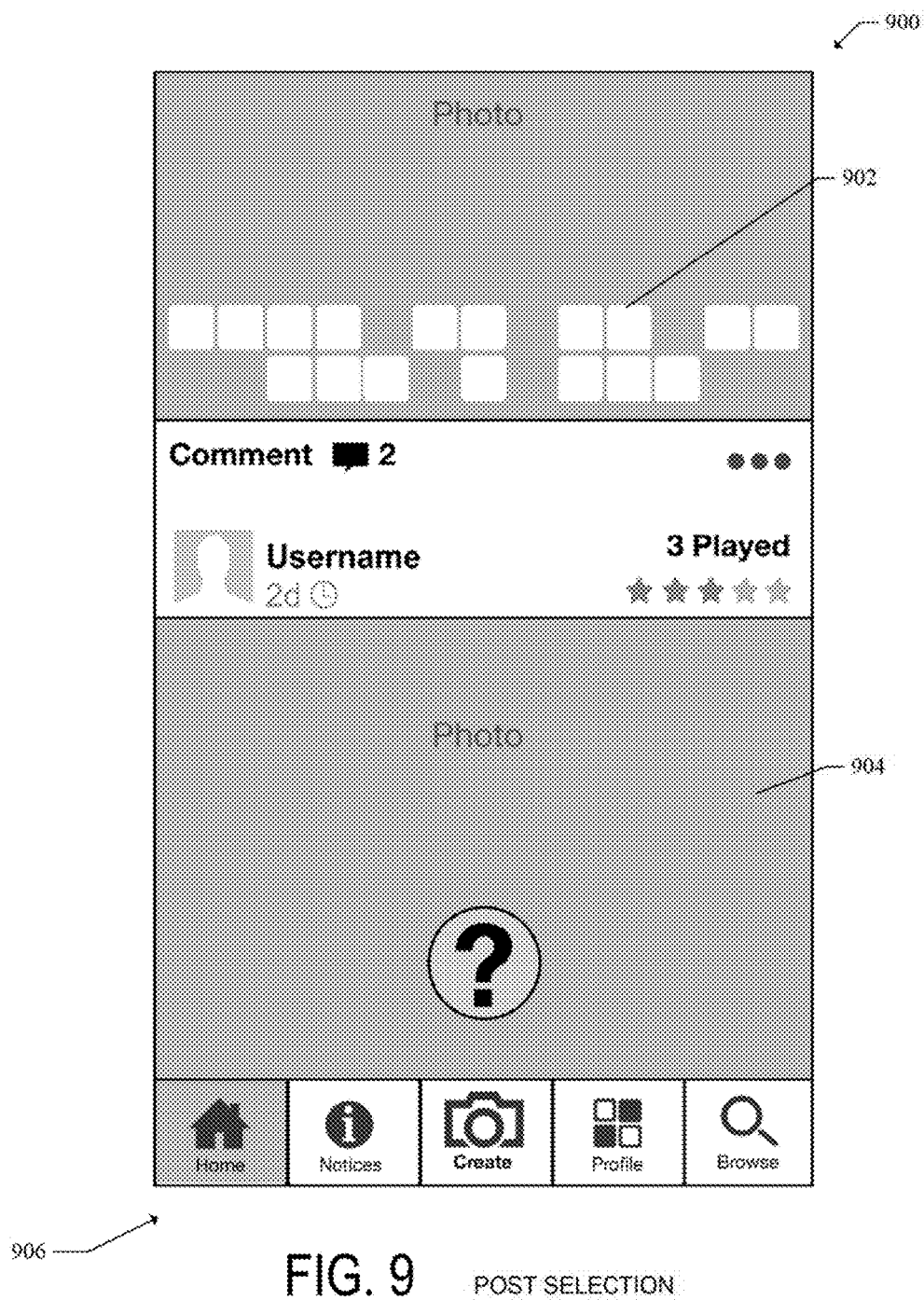
FIG. 9  POST SELECTION

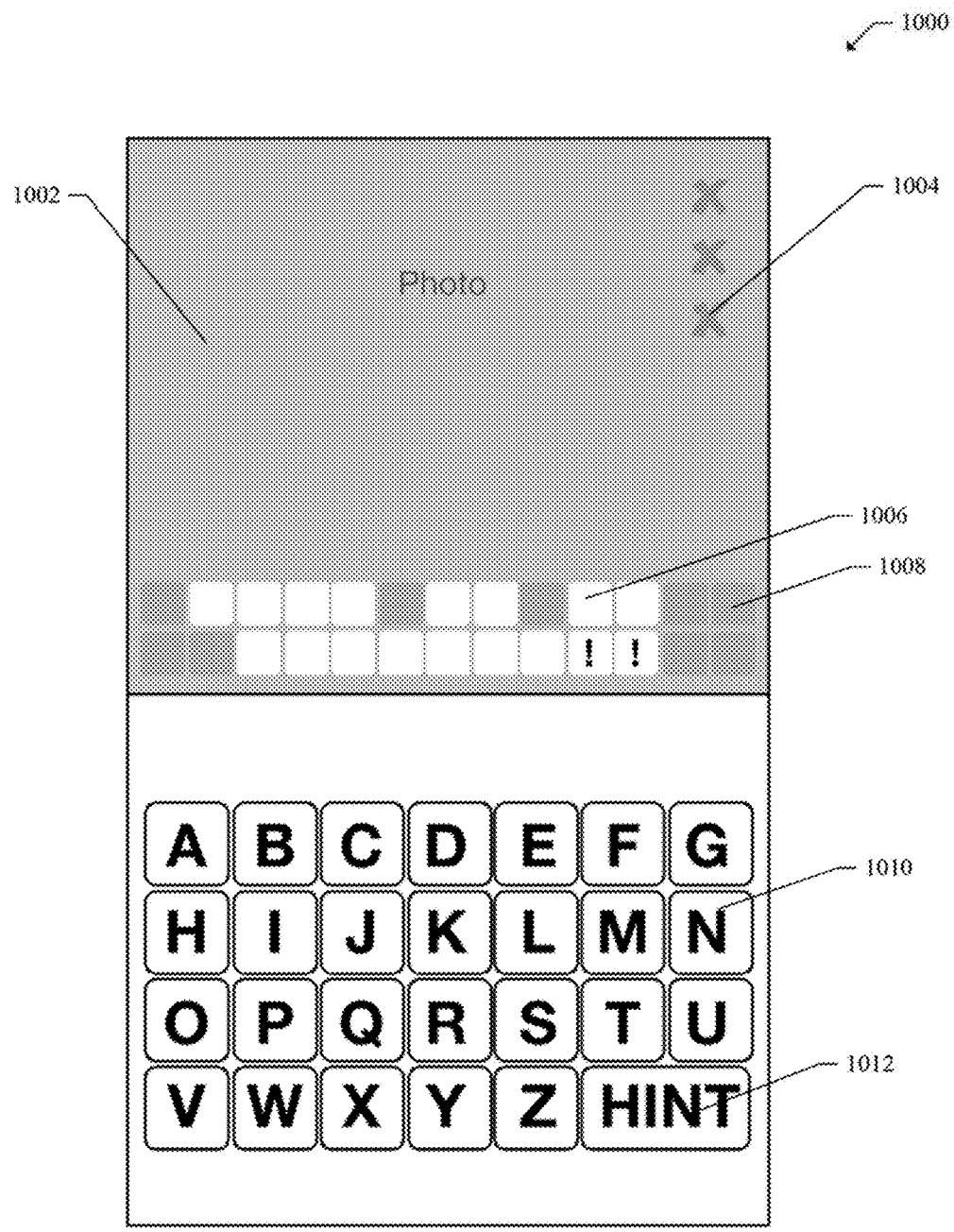
FIG. 10 EXEMPLARY GAME PLAY 1

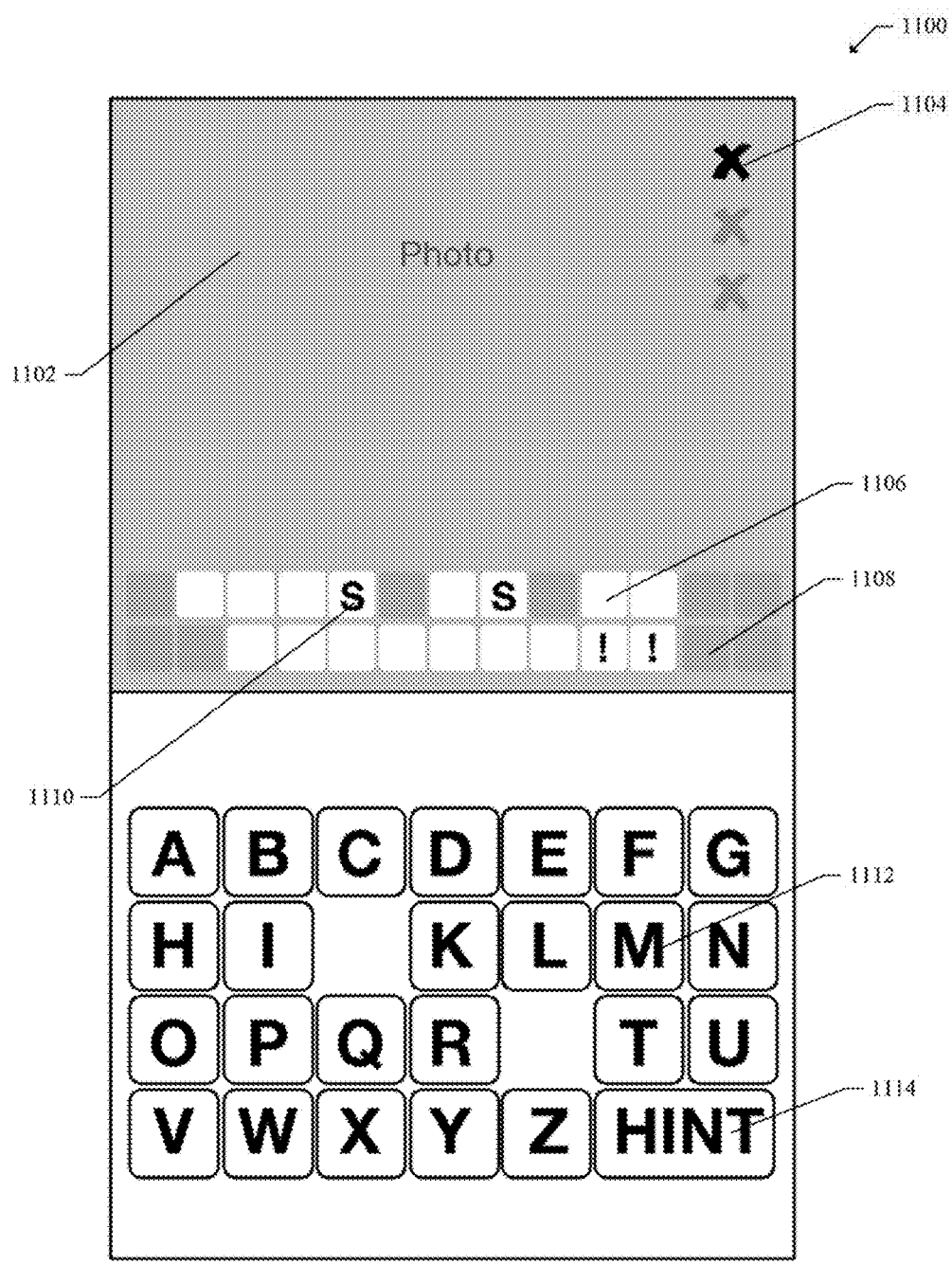
FIG. 11 EXEMPLARY GAME PLAY 2

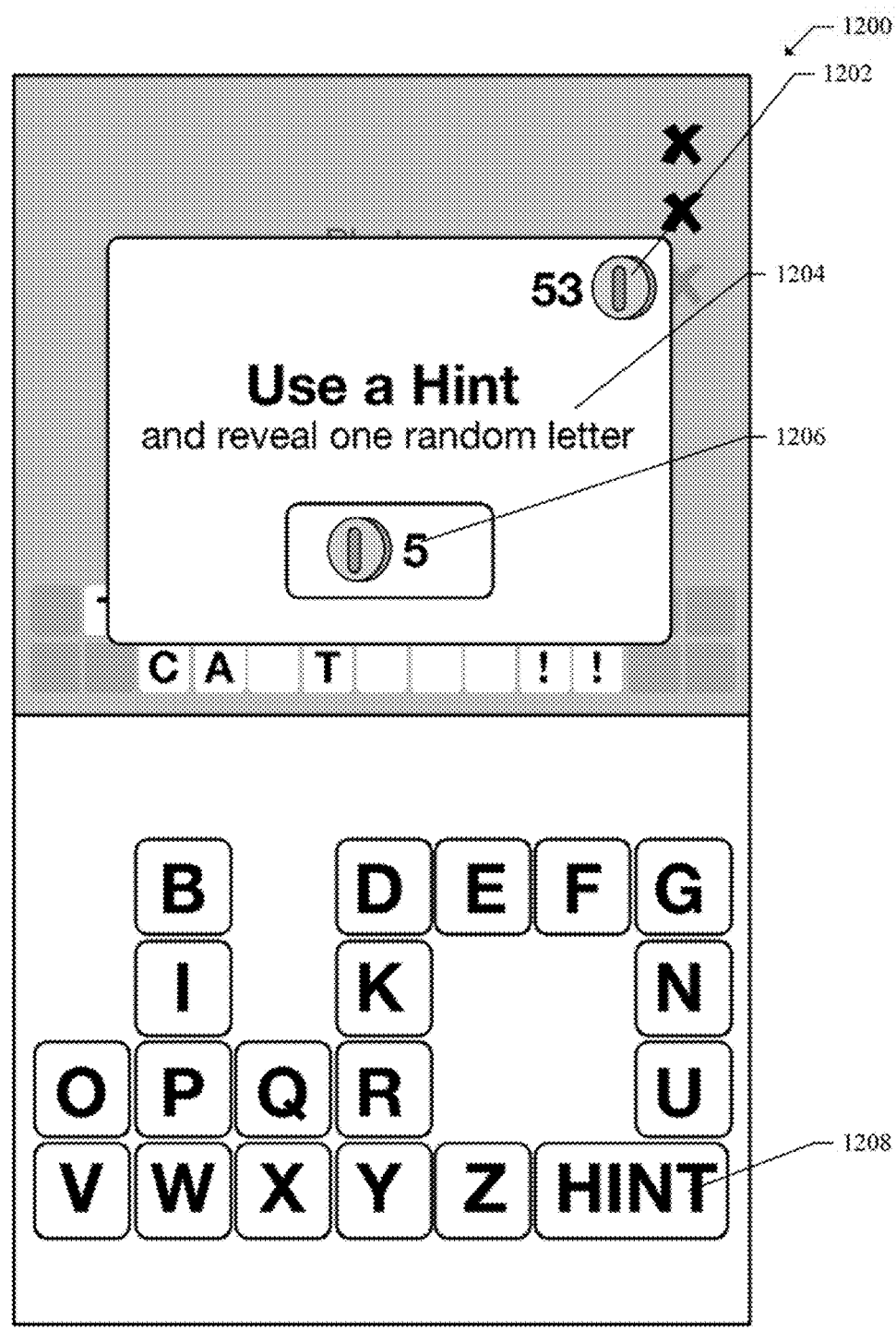
FIG. 12 EXEMPLARY GAME PLAY 3

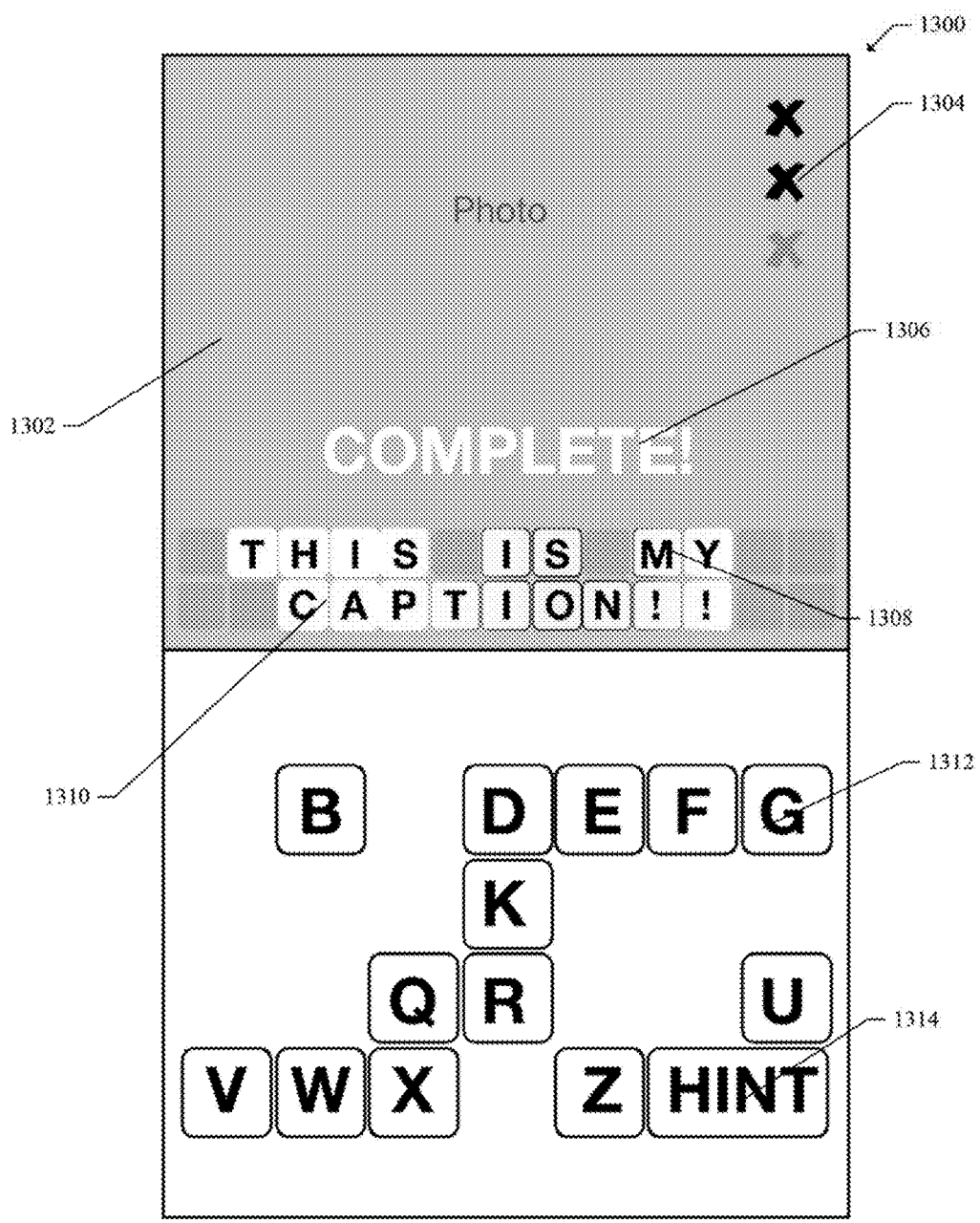
FIG. 13 EXEMPLARY GAME PLAY 4

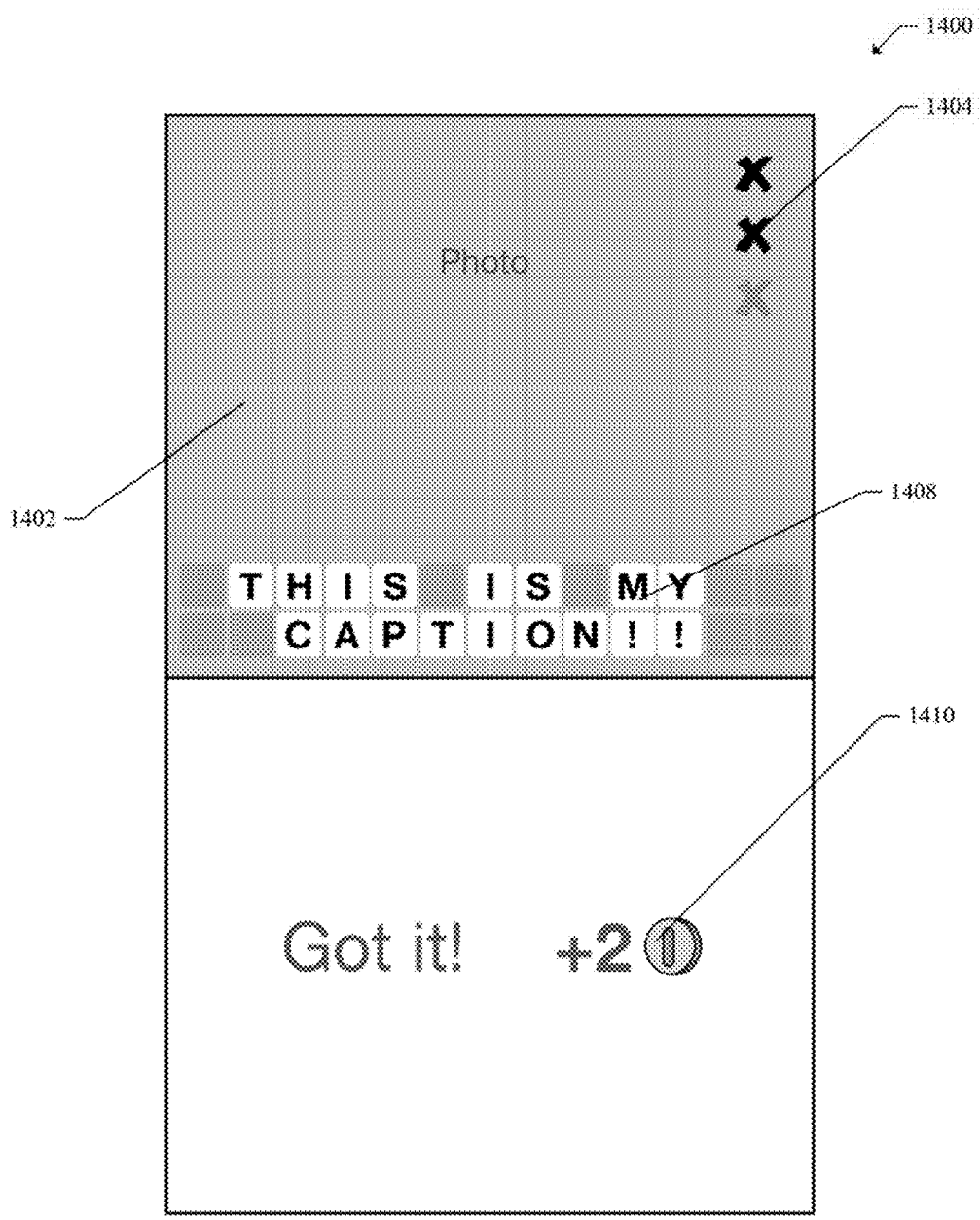
FIG. 14  COIN ADD

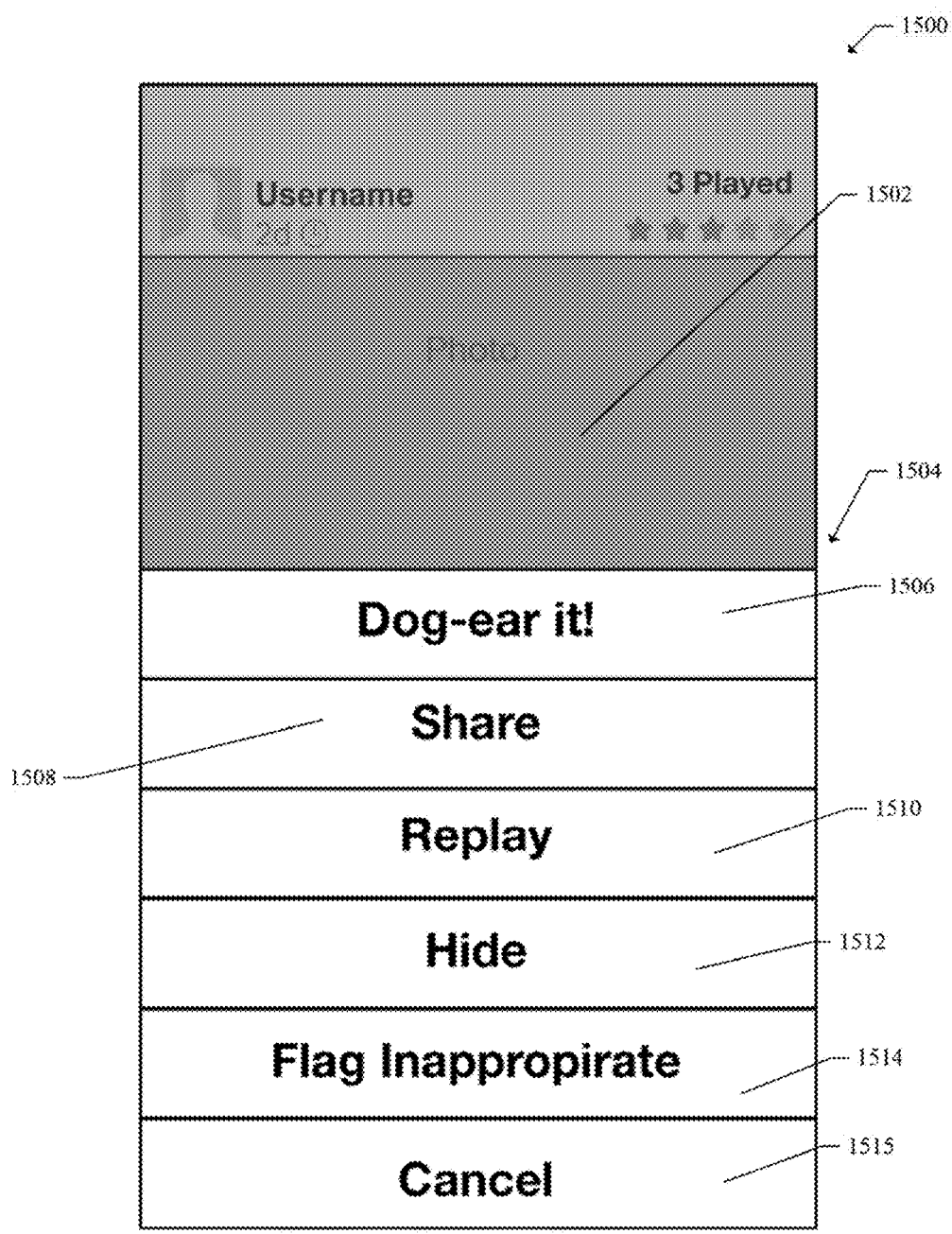
FIG. 15 OPTIONS AFTER PLAY OF POST TERMINATES

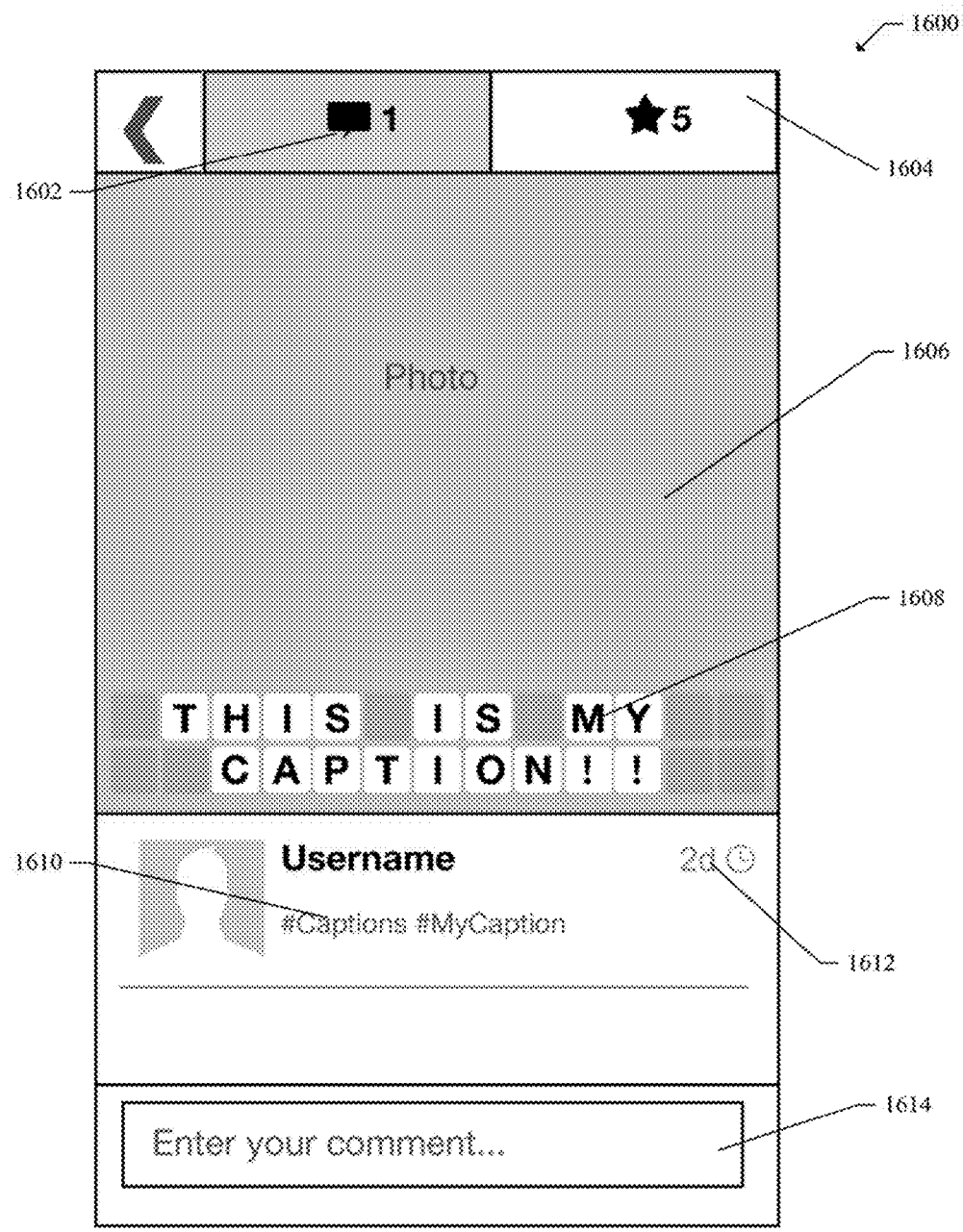
FIG. 16 ADD COMMENTS TO POST

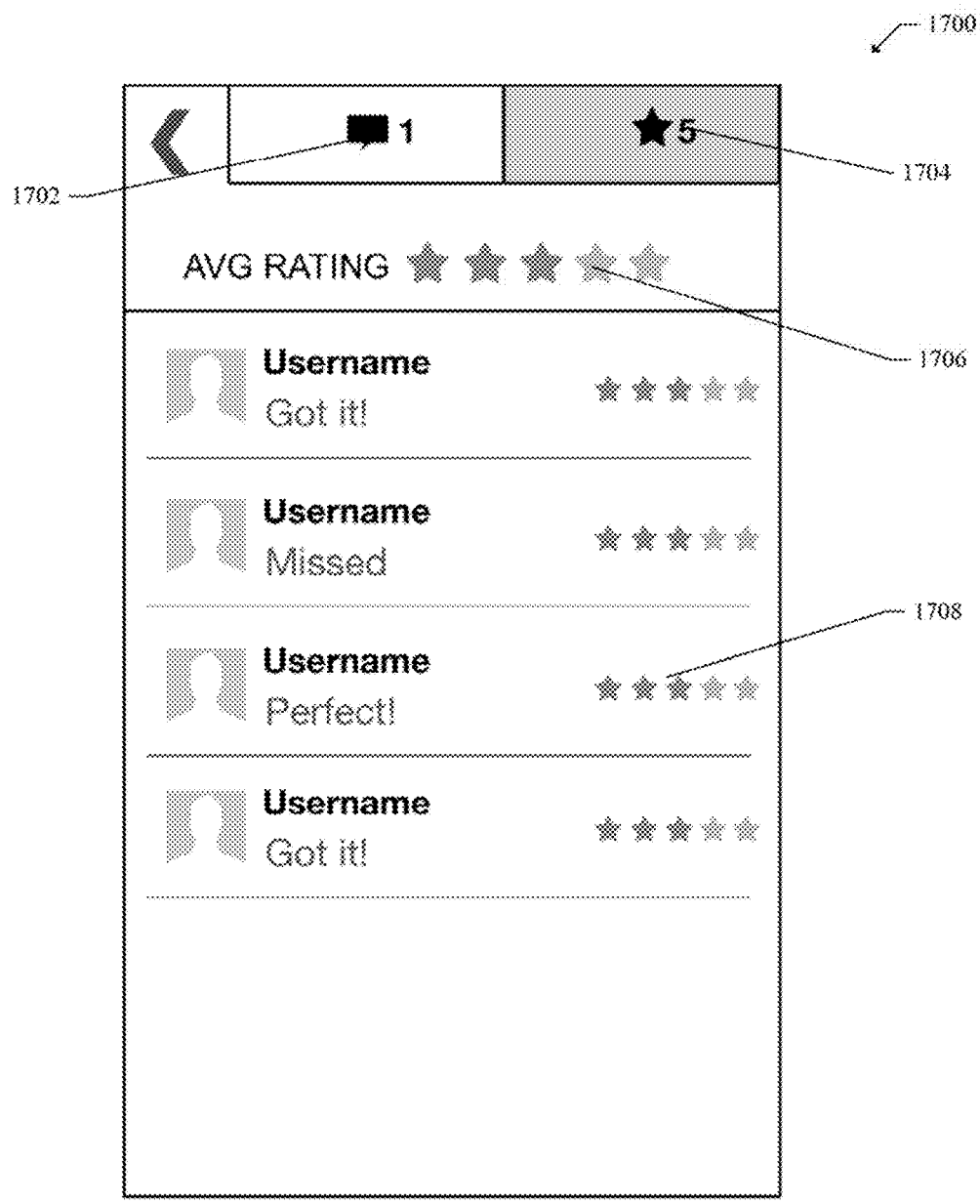
FIG. 17  VIEW POST RATINGS

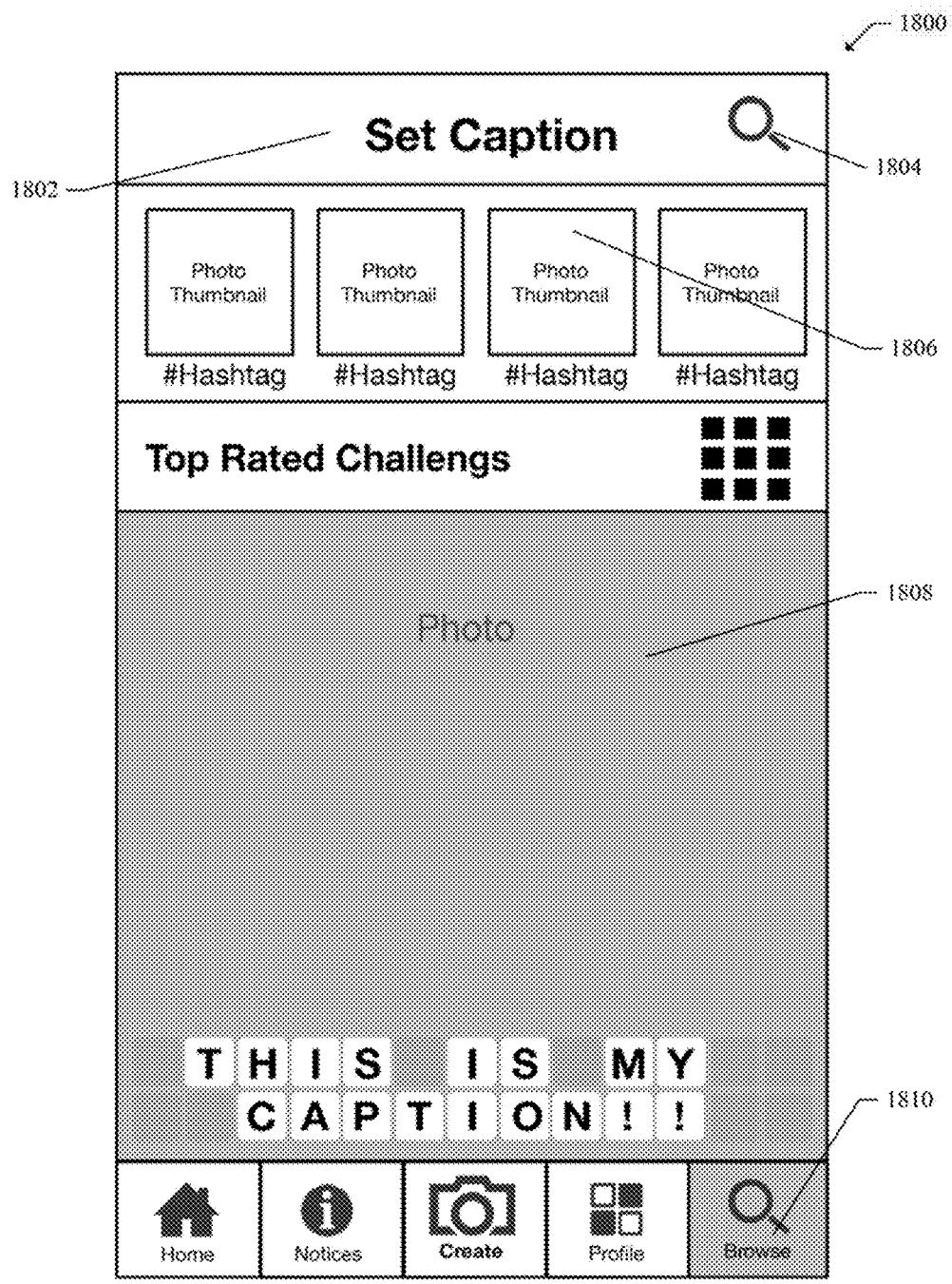
FIG. 18  BROWSE (HASH TAG)

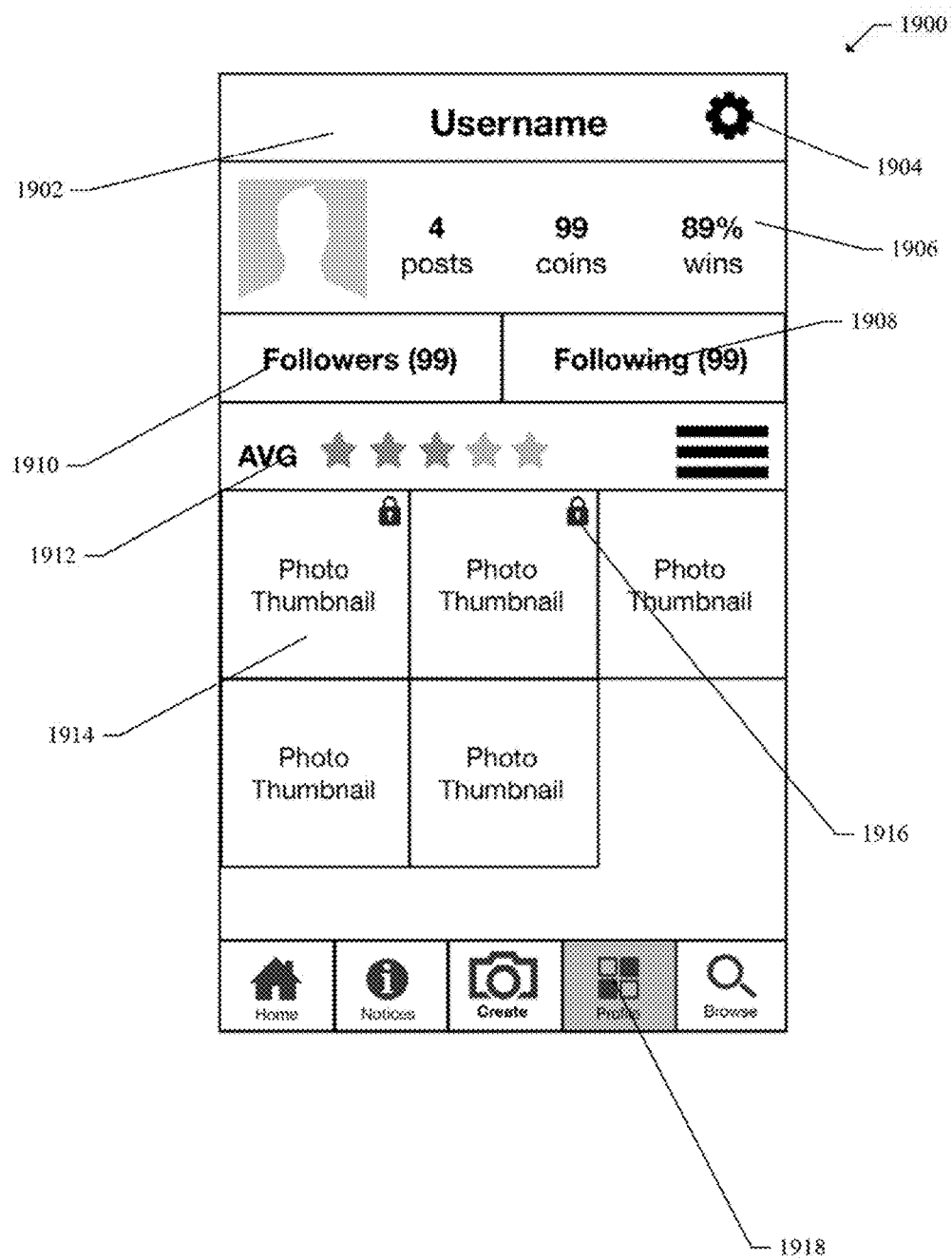
FIG. 19 PROFILE

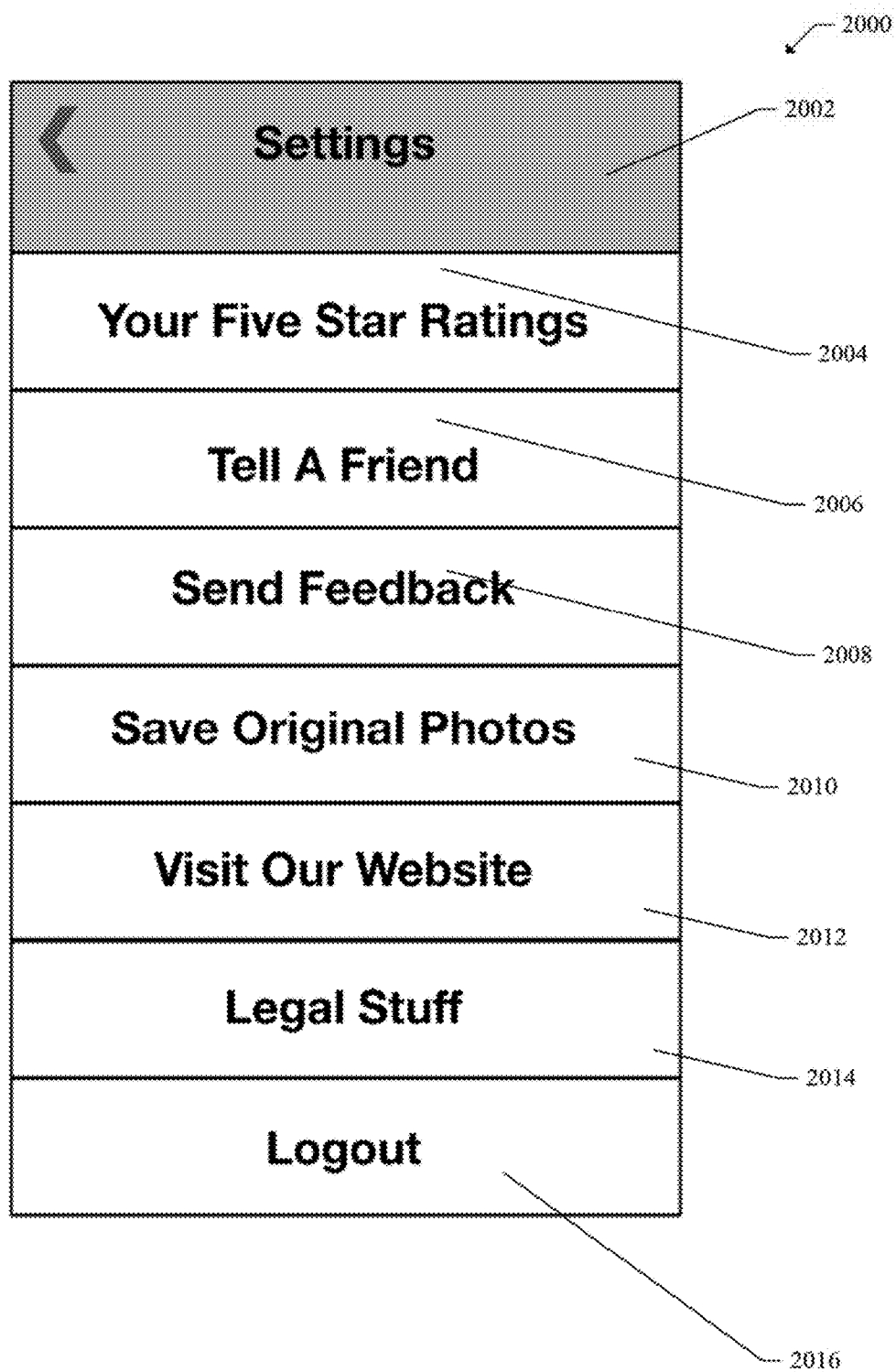
FIG. 20 SETTINGS

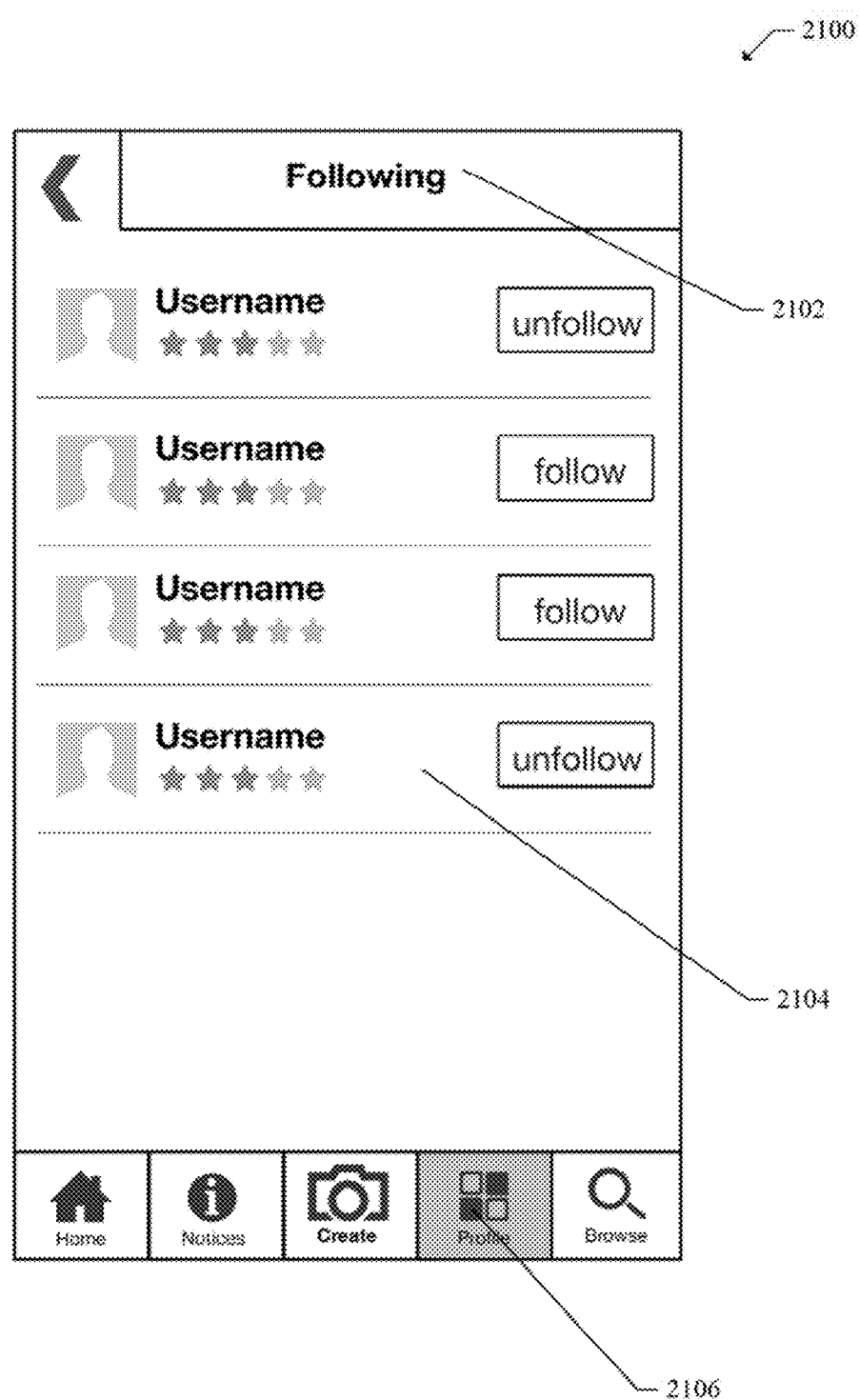
FIG. 21 FOLLOWED USERS

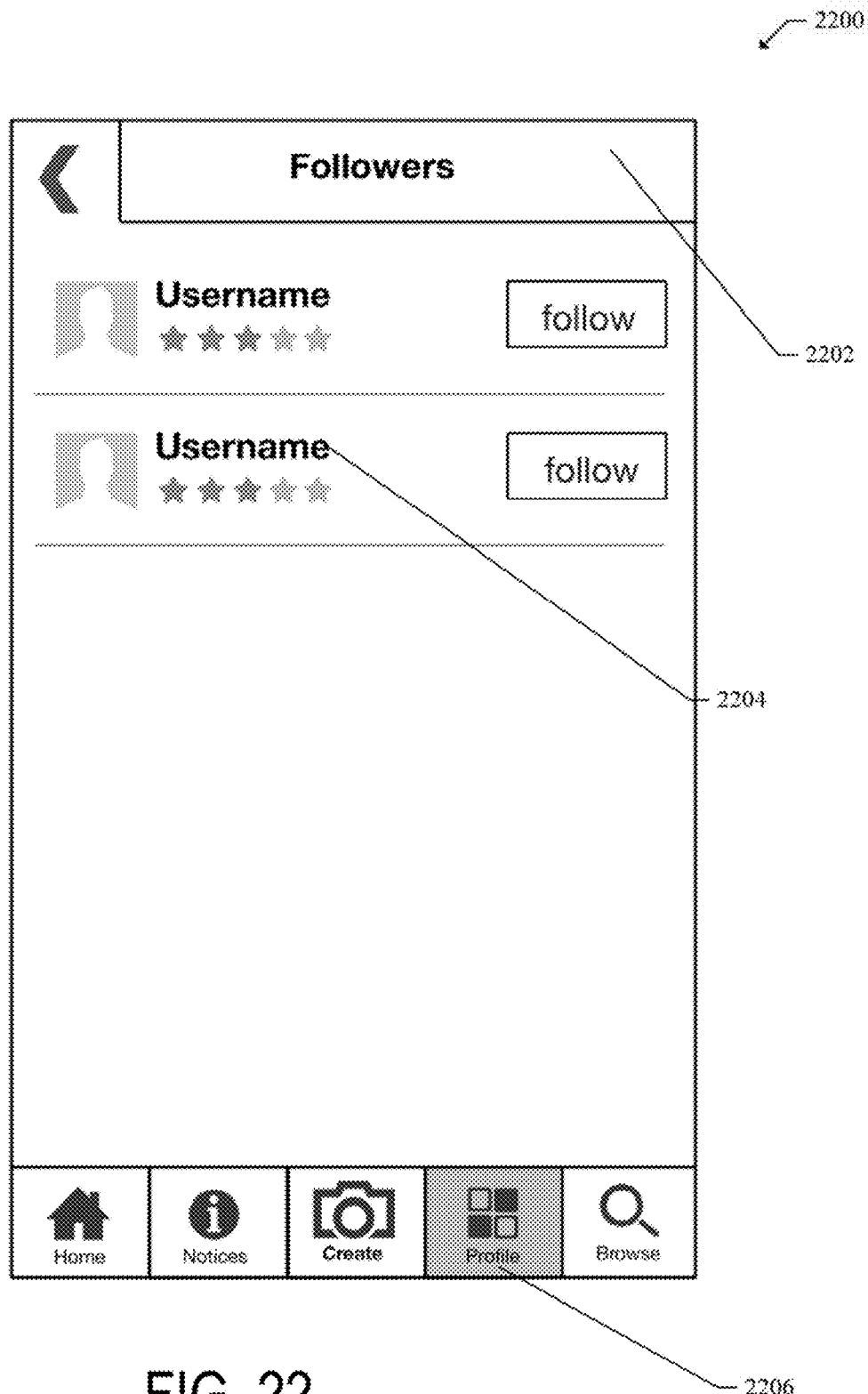
FIG. 22 FOLLOWING USERS

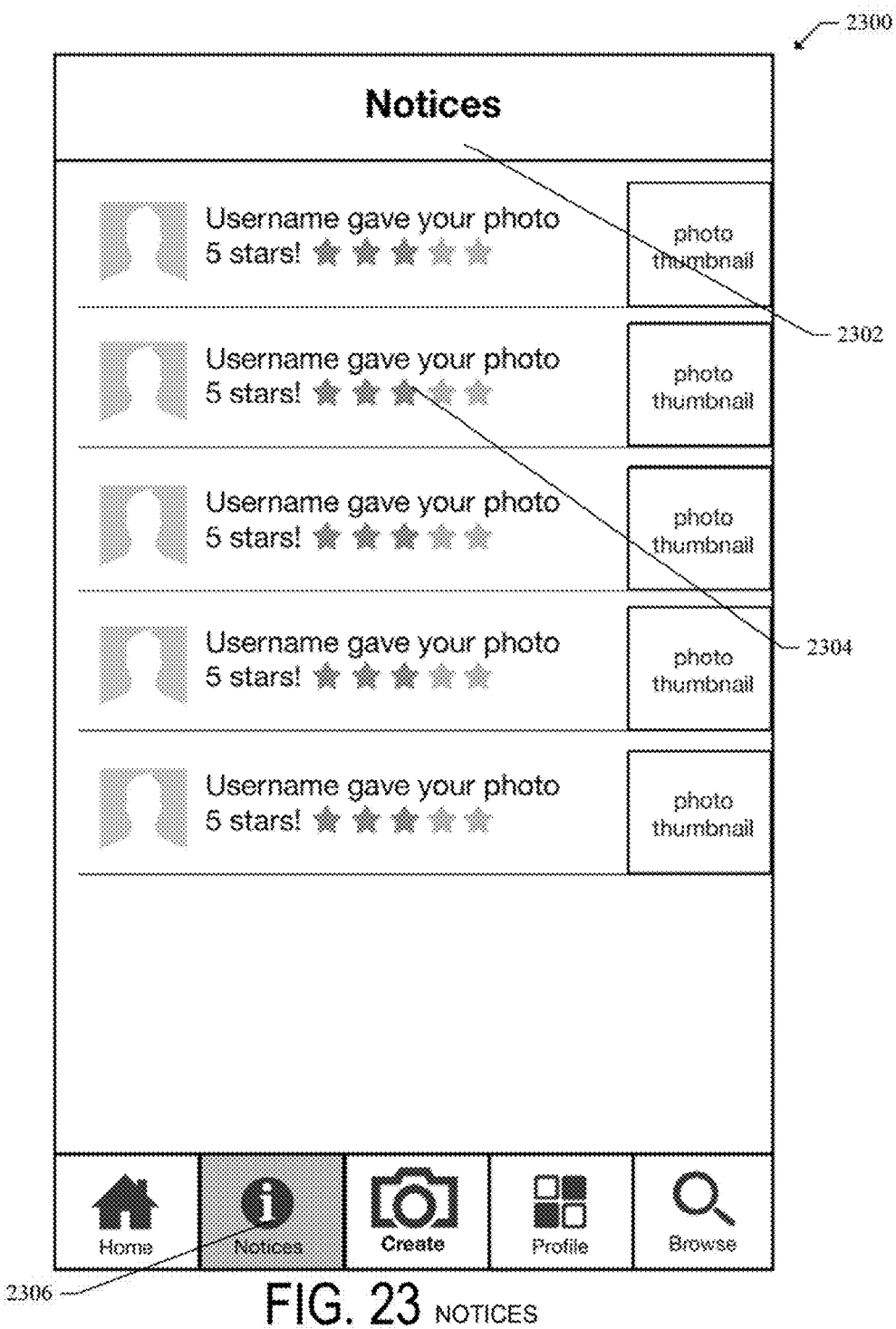
FIG. 23 NOTICES

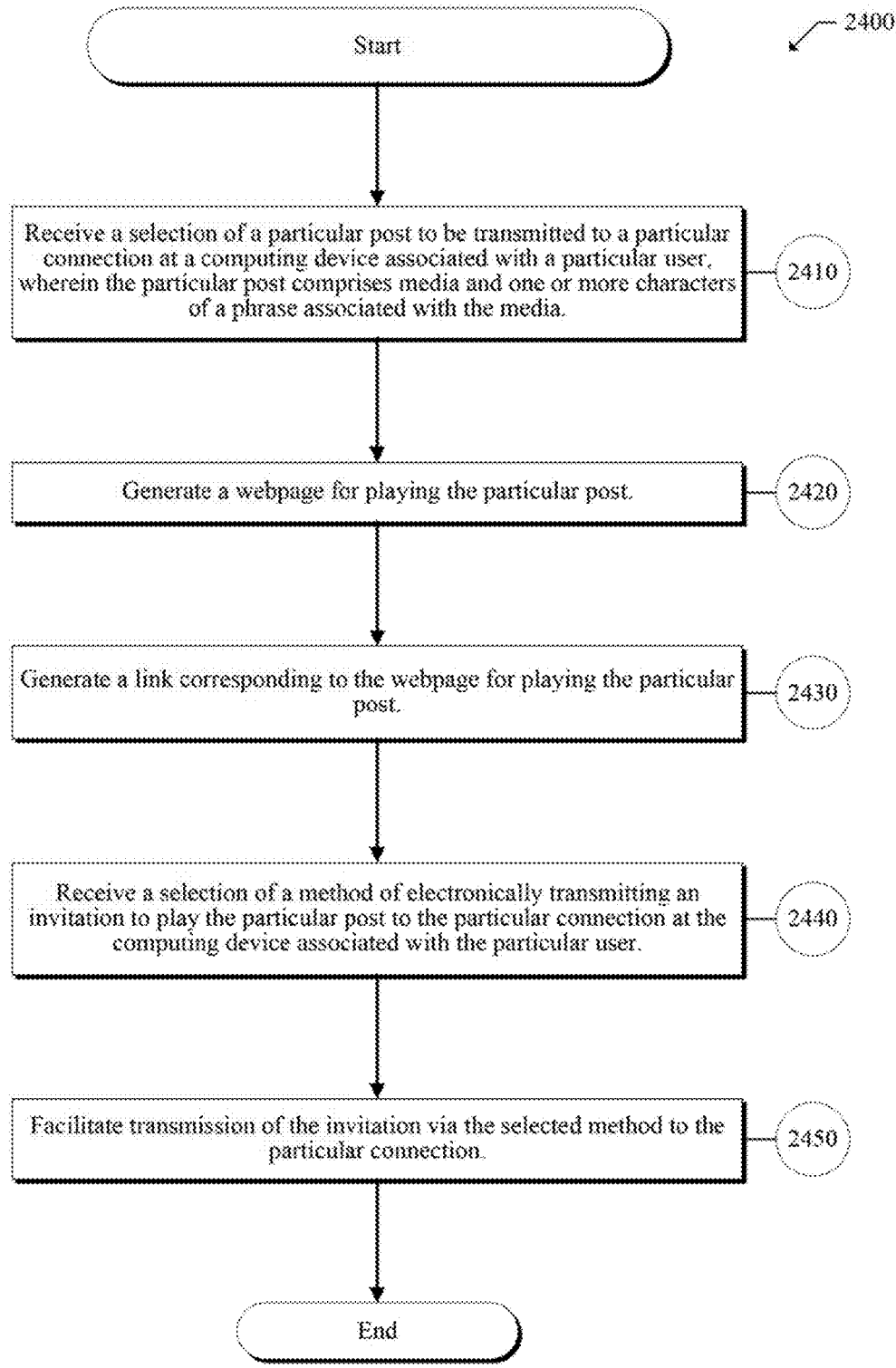
FIG. 24 EXEMPLARY POST INVITATION PROCESS

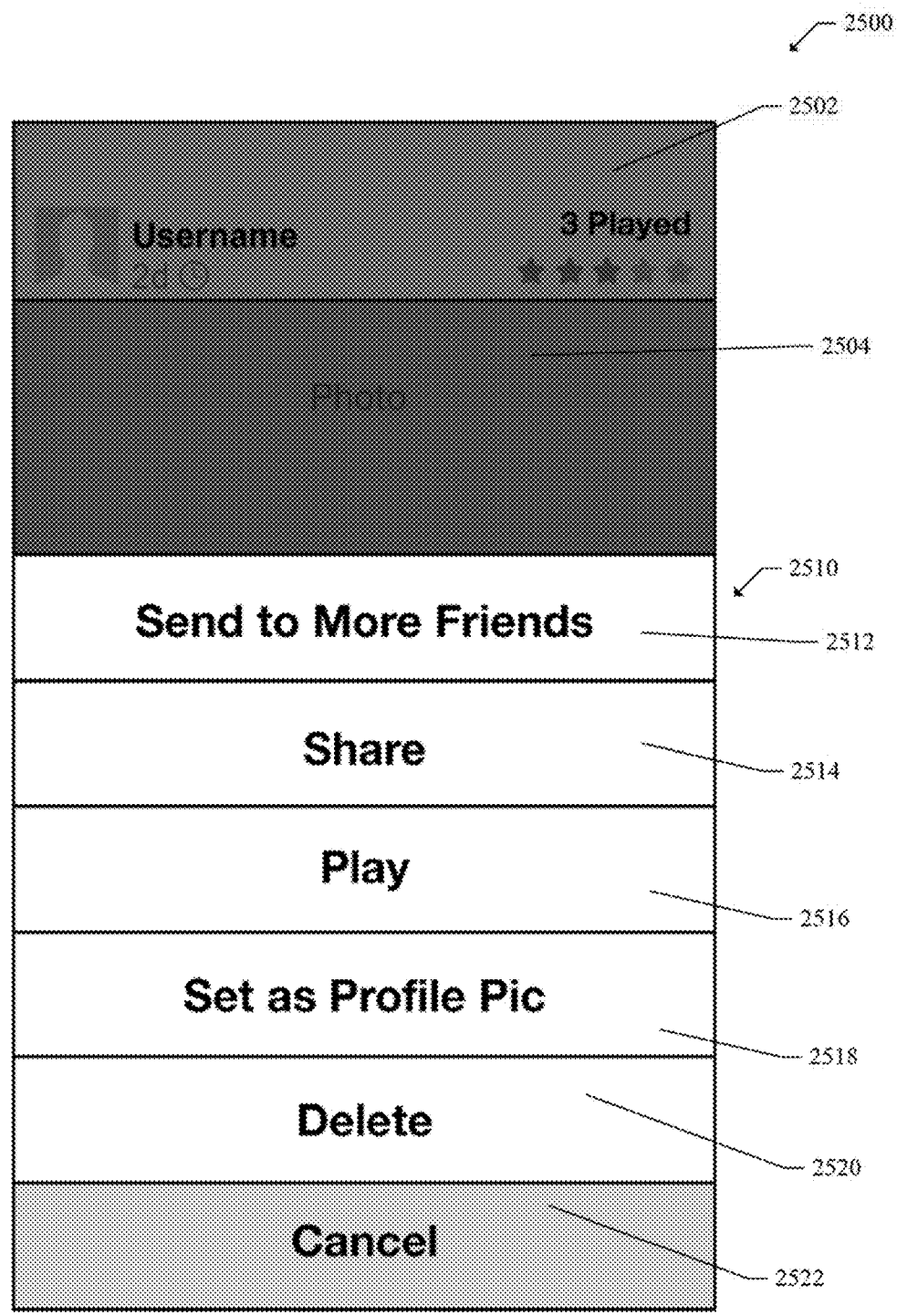
FIG. 25  Exemplary Post Options Menu

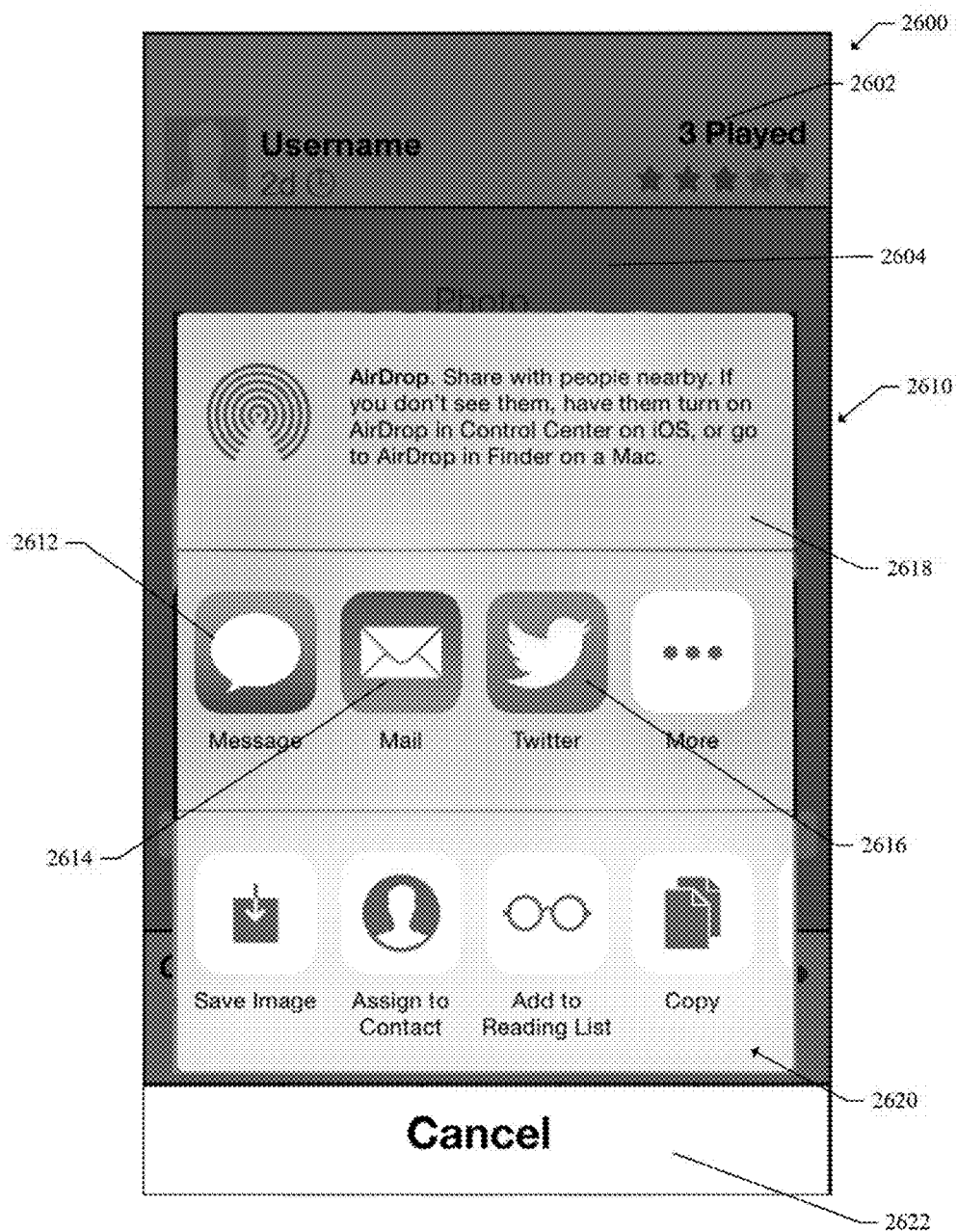
FIG. 26  Exemplary Post Sharing Method Selection Menu

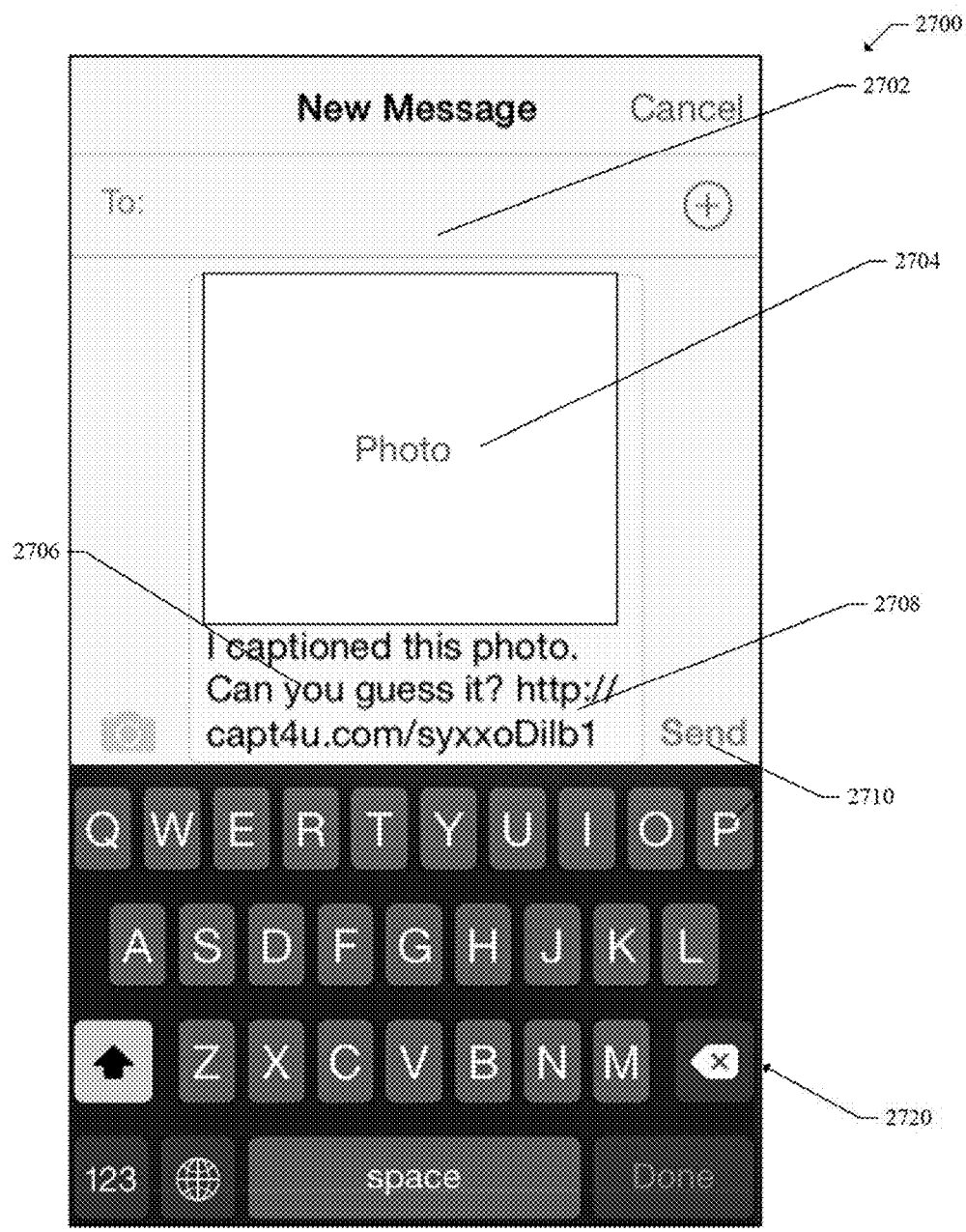
FIG. 27 Exemplary Sharing a Post by Message

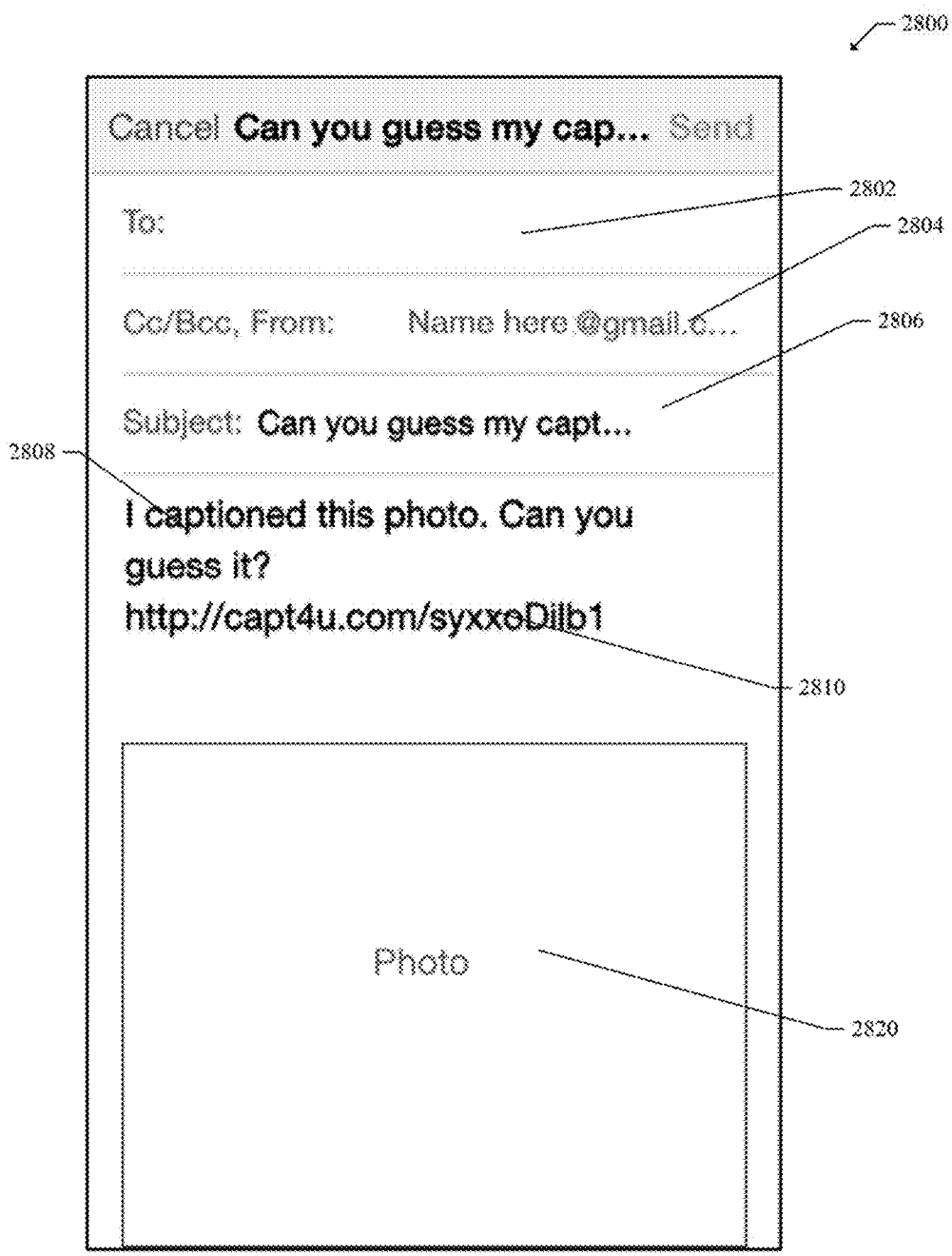
FIG. 28 Exemplary Sharing a Post by Email

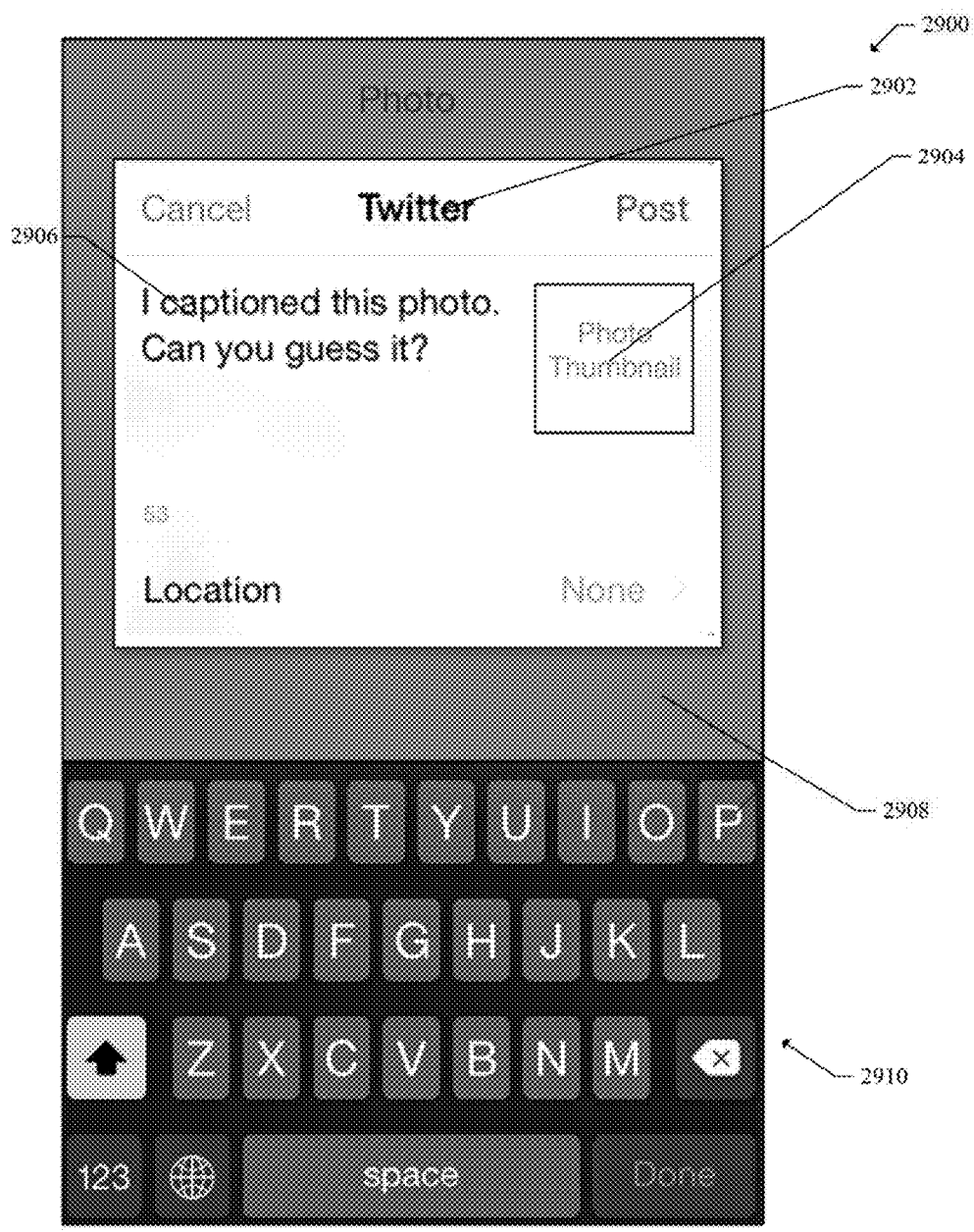
FIG. 29 Exemplary Sharing a Post by Third Party Application

FIG. 30  Exemplary Sharing a Post by Wireless Connection

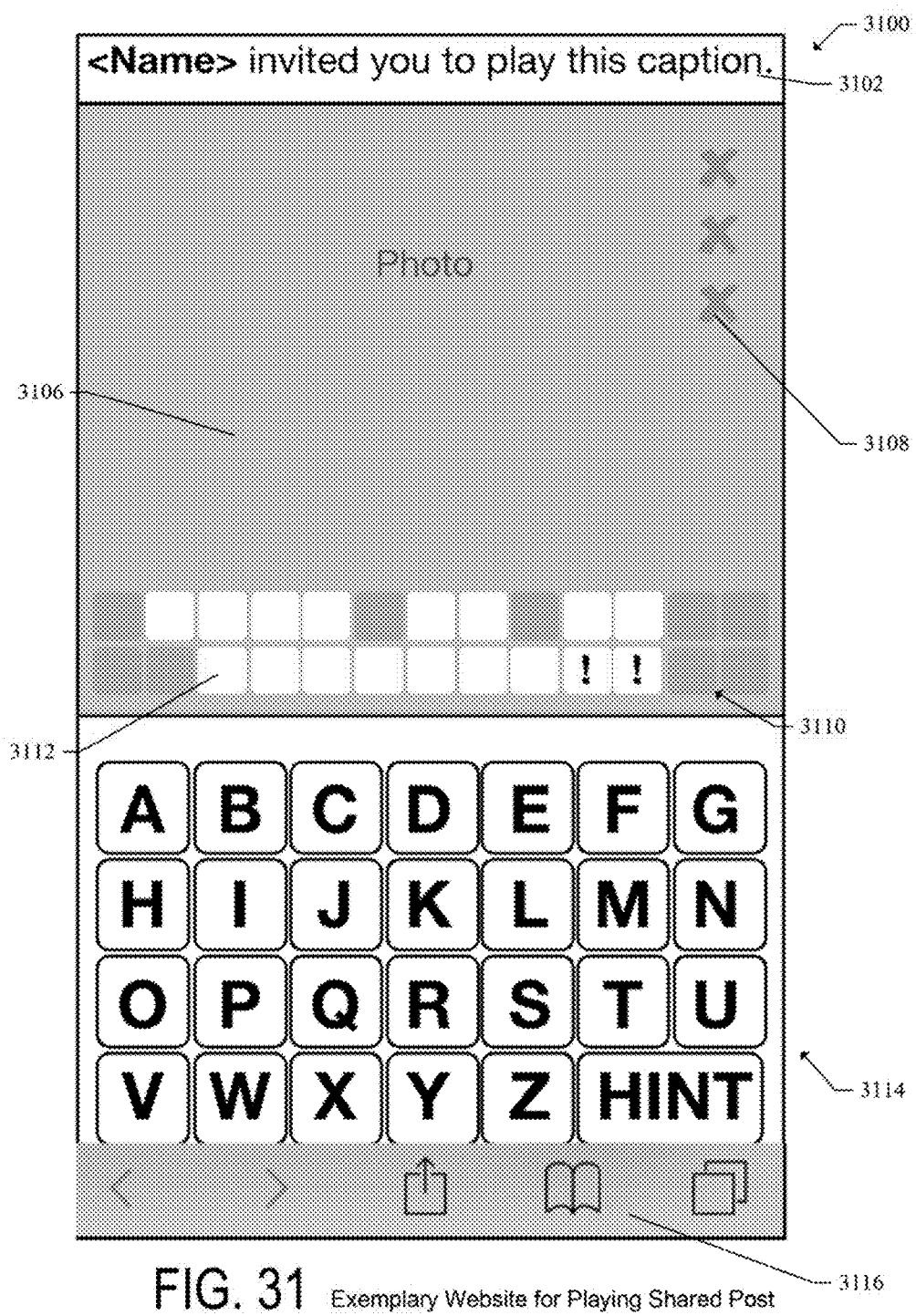
FIG. 31  Exemplary Website for Playing Shared Post

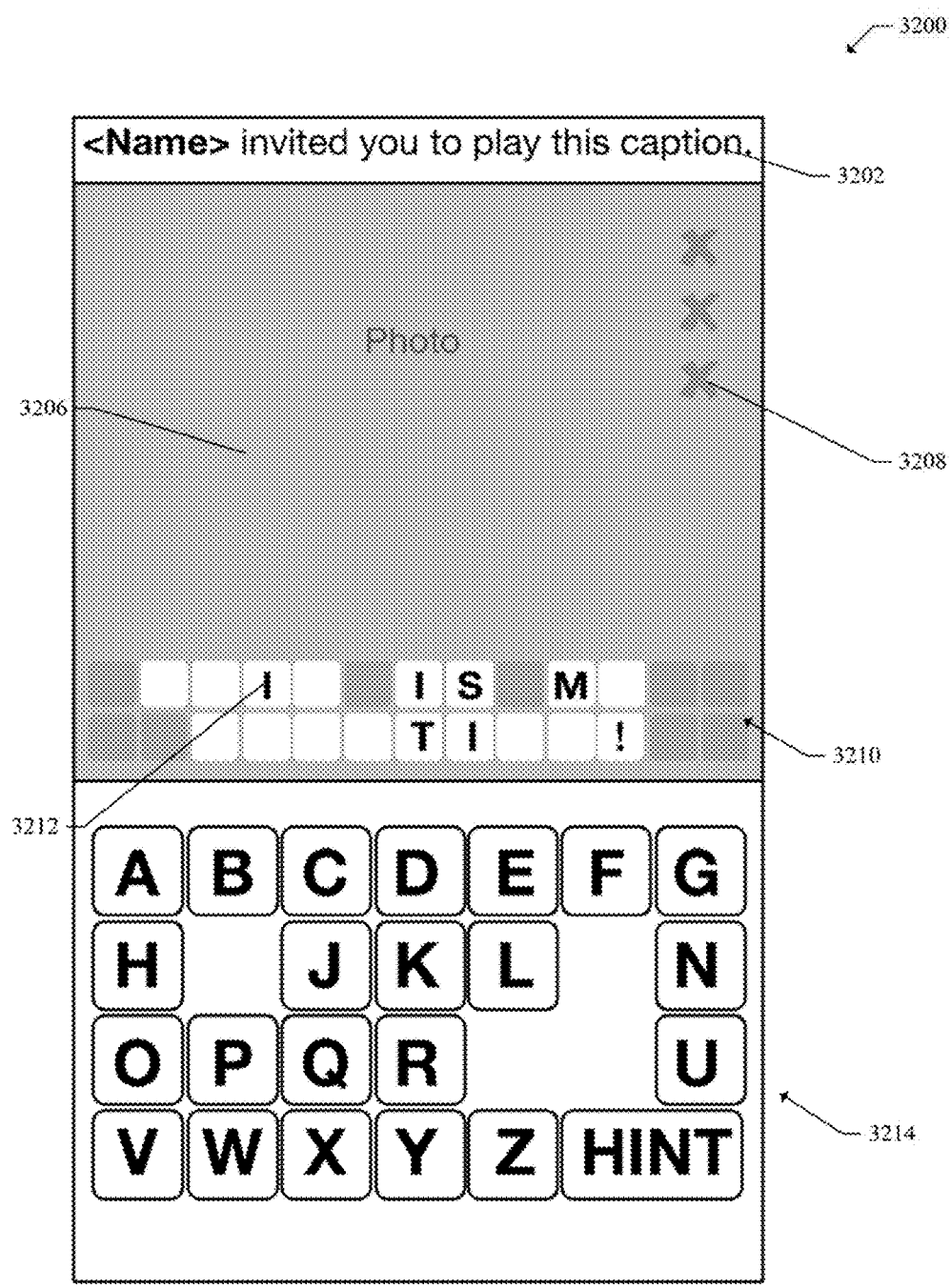
FIG. 32  Exemplary Game Play for Playing Shared Post

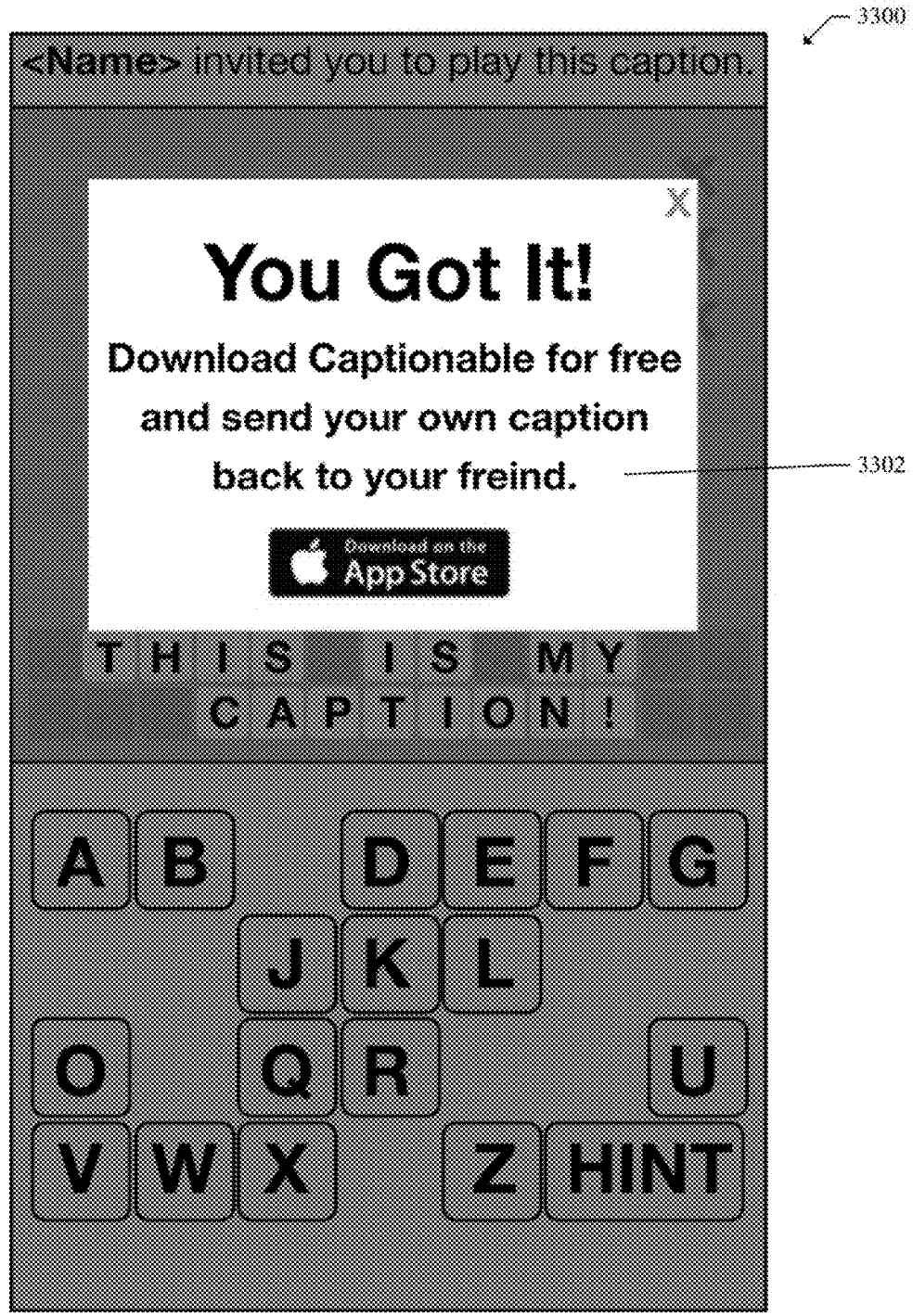
FIG. 33  Exemplary Game Play for Playing Shared Post

SYSTEMS AND METHODS FOR PLAYING ELECTRONIC GAMES AND SHARING DIGITAL MEDIA

CROSS REFERENCE TO RELATED APPLICATIONS

This Application is a continuation-in-part application and claims the benefit of and priority to U.S. patent application Ser. No. 14/503,828, filed Oct. 1, 2014, entitled "SYSTEMS AND METHODS FOR PLAYING ELECTRONIC GAMES AND SHARING DIGITAL MEDIA" by Christopher J. Decoufle, which is hereby incorporated by reference hereto as if set forth herein in its entirety.

BACKGROUND

Electronic and online games have risen to popularity over the past few decades at least partially due to the ubiquity of the Internet. Such games come in a variety of flavors from massive multiplayer online games to single player sidescroll games to multiplayer board-style games to educational card games. The popularity of online gaming may be partially due to the social aspects of gaming, including providing a unique way in which players can connect and compete against friends, colleagues, and family.

Similarly, social networking websites and applications have become very popular. The ability to share information, news, personal information, pictures, and videos with an online social media network seems to have become a popular, if not the most popular, contemporary way to communicate.

Such social networking websites and applications may provide some level of "gamification" of the shared information. For example, in some applications, users can accumulate "likes" for certain popular content, users can share content that is deleted after a certain amount of time lapses, and/or users can acquire "followers" who follow their content. However, such gamification of content sharing has not been fully realized. Therefore, there is a long-felt but unresolved need for a system or method that combines online gaming with the social aspects of social network information sharing.

BRIEF SUMMARY OF THE DISCLOSURE

In various embodiments, a method of playing a game is disclosed, the method including: 1) receiving, by at least one processor, a shareable media file and a phrase corresponding to the shareable media from a computing device associated with a first user, the phrase including a plurality of characters; 2) storing the shareable media and the phrase in memory; 3) transmitting, by at least one processor, the shareable media, the phrase, and a series of blanks corresponding to each of the plurality of characters to a second commuting device associated with a second user; 4) receiving, by at least one processor, a selection of a certain character of a plurality of predefined characters from the second computing device; 5) in response to receiving the selection of the certain character from the second computing device, comparing the certain character to each of the plurality of characters of the phrase stored in memory for determining whether the plurality of characters include the certain character; 6) upon determining that the phrase stored in memory includes the certain character, displaying the certain character in the one or more corresponding blanks on the second computing device; 7) upon determining that the phrase stored in memory does not include the certain character, indicating to the second user that the phrase stored in memory does not include the certain character; and 8) repeating steps 4-7 until a) each of the series of blanks displays a corresponding character or b) determining that the phrase stored in memory does not include the certain character n times.

According to particular embodiments, a system for playing a game is disclosed, the system including: A) memory for storing; i) a plurality of posts of a game, wherein each of the plurality of posts of the game includes at least one phrase associated with at least one shareable media file: and ii) information about a plurality of players of the game, wherein one or more of the plurality of posts are created by at least one player of the game of the plurality of players; and B) at least one processor operatively coupled to the memory, the at least one processor configured for: 1) receiving shareable media from a first computing device associated with a first user to be transmitted to a second computing device associated with a second user; 2) transmitting the shareable media to the second computing device; 3) receiving and a phrase corresponding to the shareable media from the second computing device, the phrase including a plurality of characters; 4) storing the shareable media and the phrase in memory as a post; 5) transmitting the shareable media, the phrase, and a series of blanks corresponding to each of the plurality of characters to a third computing device associated with a third user; 6) receiving an indication of a certain character of a plurality of predefined characters from the third computing device; 7) in response to receiving the indication of the certain character from the third computing device, comparing the certain character to each of the plurality of characters of the phrase stored in memory for determining whether the plurality of characters include the certain character; 8) upon determining that the phrase stored in memory includes the certain character, displaying the certain character in the one or more corresponding blanks on the third computing device; 9) upon determining that the phrase stored in memory does not include the certain character, indicating to the third user that the phrase stored in memory does not include the certain character; and 10) repeating steps 6-9 until a) each of the series of blanks displays a corresponding character on the third computing device or b) determining that the phrase stored in memory does not include the certain, character n times.

In one or more embodiments, a method of sharing media with a plurality of players is disclosed, wherein at least one of the plurality of players creates one or more playable posts, the method including: 1) receiving, by at least one processor, a shareable media file and a plurality of characters corresponding to the shareable media from a competing device associated with a post creation player of the plurality of players; 2) creating, by at least one processor, a playable post from the shareable media and the plurality of characters; 3) storing the playable post in memory; 4) displaying by at least one processor, an indication of the playable post on computing devices associated with the plurality of players; 5) receiving a request from a particular computing device associated with a particular player of the plurality of players to play the playable post; 6) upon receiving the request from the particular computing device, enabling the particular player to play the playable post on the particular computing device; 7) receiving from the particular computing device, a rating of the playable post; and 8) ranking the playable post based at least in part on the rating received from the particular computing device.

In further embodiments, a system for playing a game is disclosed, the system including; A) memory for storing: i) a plurality of posts, wherein each of the plurality of posts include at least one phrase associated with at least one shareable media file; and ii) information regarding a plurality of players, wherein one or more of the plurality of posts are created by at least one player of the plurality of players; and B) at least one processor operatively coupled to the memory, the at least one processor configured for: 1) displaying a list of the plurality of posts to a particular player of the plurality of players on a particular computing device, the list arranged based at least in part on one or more players' ranking of each of the plurality of posts; 2) receiving a request from the particular computing device associated with the particular player to play a particular post of the plurality of posts, the particular post at a first position in the list; 3) upon receiving the request, from the particular computing device, receiving a first character from the particular computing device; 3) determining whether the first character matches one or more characters of a plurality of characters included in at least one phrase of the particular post; 4) upon determining that the first character matches one or more characters of the plurality of characters included in the at least one phrase of the particular post, determining whether each of the plurality of characters included in the at least one phrase of the particular post has been matched; 5) based on determining that each of the plurality of characters included in the at least one phrase of the particular post has been matched, receiving, from the particular computing device, a rating of the particular post; and 6) rearranging the list such that the particular post is at a second position in the list based at least in part on the rating received from the particular computing device.

In at least one embodiment, a method for inviting a connection to play a particular post, wherein the particular post includes media and a phrase associated with the media and the connection is a third-parry capable of receiving an electronic message transmitted from a particular user, the method including the steps of A) receiving a selection of a particular post to be transmitted to a particular connection at a confuting device associated with a particular user; B) in response to receiving the selection of the particular post to be transmitted, generating a link corresponding to a webpage associated with the particular post; C) receiving a selection of a method of electronically transmitting an invitation to play the particular post to the particular connection at the computing device associated with the particular user; and D) in response to receiving the selection of the method of electronically transmitting the invitation to play the particular post to the particular connection, facilitating transmission of the invitation via the selected method to the particular connection, wherein the invitation includes a thumbnail representation of the particular post and the link corresponding to the particular post.

According to particular embodiments, a system for inviting a connection to play a particular post, wherein the particular post includes media and a phrase associated with the media and the connection is a third-party capable of receiving an electronic message transmitted front a particular user, the system including a game server for storing posts, generating webpages, and generating links, the game server operatively connected to an application provided to a particular user for playing posts, wherein the application is configured for: A) receiving a selection of a particular post to be transmitted to a particular connection at a computing device associated with a particular user, B) transmitting a request to the game server for generating a link, corresponding to a webpage associated with the particular post; C) receiving a selection of a method of electronically transmitting an invitation to play the particular post to the particular connection at the computing device associated with the particular user; and D) in response to receiving the selection of the method of electronically transmitting the invitation to play the particular post to the particular connection, facilitating transmission of the invitation via the selected method to the particular connection, wherein the invitation includes a thumbnail representation of the particular post and the link, corresponding to the particular post.

In some embodiments, a method for inviting a connection to play a particular post, wherein the particular post includes media, and a phrase associated with the media and the connection is a third-party capable of receiving an electronic message transmitted from a particular user, the method including the steps of: A) receiving a selection of a particular post to be transmitted to a particular connection at a computing device associated with a particular user, wherein the particular post includes media, and one or more characters creating a phrase associated with the media; B) in response to receiving the selection of the particular post to be transmitted: 1) generating a webpage for playing the particular post, wherein the webpage for playing, the particular post includes: a) the media of the particular post; b) one or more blanks, wherein each blank corresponds to each of the one or more characters of the phrase associated with the media of the particular post; and c) a plurality of selectable characters; and 2) generating a link corresponding to the webpage for playing the particular post; C) receiving a selection of a method of electronically transmitting an invitation to play the particular post to the particular connection at the computing device associated with the particular user; and D) in response to receiving the selection of the method of electronically transmitting the invitation to play the particular post to the particular connection, facilitating transmission of the Invitation via the selected method to the particular connection, wherein the invitation includes a thumbnail representation of the particular post and the link corresponding to the particular post.

In further embodiments, a system, for creating an interactive invitation, the system including a game server configured for: A) receiving media and a phrase associated with the media from a particular computing device, wherein the phrase comprises one or more characters in a particular order; B) storing the media and the phrase is memory as a particular post; C) generating a webpage comprising the media, a series of blanks, wherein each blank of the series of blanks corresponds to one of the one or ore more characters of the phrase, and a plurality of selectable characters; D) receiving a selection of a particular character of the plurality of selectable characters on the website; and E) in response to receiving the selection of the particular character of the plurality of selectable characters on the website, displaying the particular character in one or more of the series of blanks on the webpage.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 1 is an exemplary system environment constructed according to one embodiment of the present disclosure.

FIG. 2 is an exemplary computer/server architecture according to one embodiment of the present disclosure.

FIG. 3 is a flow chart illustrating an exemplary game play process according to one embodiment of the present disclosure.

FIG. 4 is a flow chart illustrating an exemplary post ranking process according to one embodiment of the present disclosure.

FIG. 5 is an exemplary screenshot of a user interface featuring a home screen of an electronic game according to one embodiment of the present disclosure.

FIG. 6 is an exemplary screenshot of a user interface for selecting a photograph source according to one embodiment of the present disclosure.

FIG. 7 is an exemplary screenshot of a user interface for adding a phrase to a selected photograph according to one embodiment of the present disclosure.

FIG. 8 is an exemplary screenshot of a user interface for approving a phrase and shareable media combination according to one embodiment of the present disclosure.

FIG. 9 is an exemplary screenshot of a user interface for selecting a particular post to play according to one embodiment of the present disclosure.

FIG. 10 is an exemplary screenshot of a user interface for playing a particular post according to one embodiment of the present disclosure.

FIG. 11 is an exemplary screenshot of exemplary game play according to one embodiment of the present disclosure.

FIG. 12 is an exemplary screenshot of exemplary game play according to one embodiment of the present disclosure.

FIG. 13 is an exemplary screenshot of exemplary game play according to one embodiment of the present disclosure.

FIG. 14 is an exemplary screenshot of a user interface for receiving coins/points after playing a particular post according to one embodiment of the present disclosure.

FIG. 15 is an exemplary screenshot of a user interface displaying options for a particular post that has been played by a particular user according to one embodiment of the present disclosure.

FIG. 16 is an exemplary screenshot of a user interface for viewing and/or adding comments to a particular post according to one embodiment of the present disclosure.

FIG. 17 is an exemplary screenshot of a user interface for viewing the ratings of a particular post according to one embodiment of the present disclosure.

FIG. 18 is an exemplary screenshot of a user interface for browsing posts according to one embodiment of the present disclosure.

FIG. 19 is an exemplary screenshot of a user interface displaying a profile of a particular user according to one embodiment of the present disclosure.

FIG. 20 is an exemplary screenshot of a user interface for displaying one or more adjustable settings according to one embodiment of the present disclosure.

FIG. 21 is an exemplary screenshot of a user interface displaying users that a particular user is following according to one embodiment of the present disclosure.

FIG. 22 is an exemplary screenshot of a user interface displaying followers of a particular user according to one embodiment of the present disclosure.

FIG. 23 is an exemplary screenshot of a user interface for displaying notices according to one embodiment of the present disclosure.

FIG. 24 is a flow chart illustrating an exemplary post sharing/invitation process according to one embodiment of the present disclosure.

FIG. 25 is an exemplary screenshot of a user interface for displaying selectable options for a particular post according to one embodiment of the present disclosure.

FIG. 26 is an exemplary screenshot of an exemplary post sharing method selection screen according to one embodiment of the present disclosure.

FIG. 27 is an exemplary screenshot of an exemplary post invitation message to be shared by message according to one embodiment of the present disclosure.

FIG. 28 is an exemplary screenshot of an exemplary post invitation message to be shared by email according to one embodiment of the present disclosure.

FIG. 29 is an exemplary screenshot of an exemplary post invitation message to be shared by a third patty application according to one embodiment of the present disclosure.

FIG. 30 is an exemplary screenshot of an exemplary post invitation message to be shared by a wireless connection according to one embodiment of the present disclosure.

FIG. 31 is a first exemplary screenshot of an exemplary website for playing a shared post according to one embodiment of the present disclosure.

FIG. 32 is a second exemplary screenshot of an exemplary website for playing a shared post according to one embodiment of the present disclosure.

FIG. 33 is a third exemplary screenshot of an exemplary website for playing a shared post according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

According to various embodiments, systems and methods disclosed herein describe a digital media sharing platform. In particular embodiments, systems and methods disclosed herein describe a system where a post creation player selects shareable media (e.g., an image, a document, a video, a gif, an audio clip, etc.) and selects or enters a phrase associated with the shareable media for a post player to guess the phrase letter-by-letter after or while simultaneously viewing the shareable media.

Particularly, in various embodiments, the system is configured for receiving a shareable media file and a phrase corresponding to the shareable media file from a computing device associated with the post creation player and storing the shareable media file and the phrase in memory. In these embodiments (and other embodiments), the system is configured for: 1) transmitting the shareable media file, the phrase, and a series of blanks corresponding to each of the plurality of characters to a computing device associated with the post player; 2) receiving a selection of a certain character of a plurality of predefined characters from the computing device associated with the post player; 3) in response to receiving the selection of the certain character from the computing device associated with the post player, comparing the certain character to each of the plurality of characters of the phrase stored in memory for determining whether the plurality of characters include the certain character; 4) upon determining that the phrase stored in memory includes the certain character, displaying the certain character in the one or more corresponding blanks on the computing device associated with the post player; 5) upon determining that the phrase stored in memory does not include the certain character, indicating to the post player that the phrase stored in memory does not include the certain character; and 6) repeating steps 2-5 until a) each of the series of blanks displays a corresponding character or b) determining that the phrase stored in memory does not comprise the certain character a predetermined number of times.

The systems and methods described above may have various additional features and/or functionality. As will be discussed herein, the system may be configured to receive a media file (to be combined with a phrase) in any suitable way, such as from post creation player's smart phone memory (in the case of mobile device application), directly from a camera associated with the post creation player (e.g., a mobile device's built-in camera), copied from the internet, selected from stock images, videos, etc. provided with the system, etc. Additionally, in one or more embodiments, once the shareable media file and phrase combination is stored in memory, the system may be configured to transmit the shareable media file and phrase combination (sometimes referred to as a "playable post") to the post player only (e.g., a private post), to the post player and one or more other users designated by the post creation player (e.g., a semi-private post), to the post player, one or more other users designated by the post creator, and to the public (e.g., a public post send to specific users), to the public (e.g., a public post), and/or any combination of the above. In these embodiments (and others), for example, a post creation player may select to transmit a playable post to one other user (e.g., and the post is not searchable), to more than one other user (e.g., and the post is not searchable), to the public (e.g., the post is searchable), to one or more other users and to the public (e.g., transmit directly to one or more users and the post is searchable), etc. In further embodiments, the system may be configured to enable the post creation player to vary one or more game parameters, such as a number of guesses the post player may take to guess the characters of a phrase, a number of hints available to the post player, etc.

In some embodiments, the systems and methods herein describe how to organize and rank shareable media files, phrases, and shareable media file and phrase combinations (e.g., posts), such as the shareable media file and phrase combinations discussed above. Particularly, in various embodiments, the system is configured to: 1) receive a shareable media file and a plurality of characters corresponding to the shareable media file from a computing device associated with a post creation player; 2) create a playable post from the shareable media file and the plurality of characters; 3) store the playable post in memory; 4) display an indication of the playable post on computing devices associated with the plurality of players; 5) receive a request from a post player to play the playable post; 6) upon receiving the request from the post player, enabling the post player to play the playable post on the particular computing device; 7) receive from the post player, a rating of the playable post; and 8) rank the playable post based at least in part on the rating received from the post player.

The playable posts mentioned herein may be ranked and/or sorted in any suitable way. In various embodiments, playable posts are ranked or sorted based on players' ratings of the playable posts (e.g., average rating, high rating, low rating, etc.). In one or more embodiments, playable posts may be ranked based on players' performance of the playable post (e.g., an average of how many turns it takes the post player to guess the phrase, etc.).

In addition to being ranked, posts may also be searchable by post players. In various embodiments, the system is configured to enable the post player to search for a playable post by keyword and/or hashtag associated with the playable post. These keywords, in particular embodiments, may be associated with playable posts at the time of creation and/or by various post players when they are played. It should be understood by one of ordinary skill in the art that the system may be configured to "normalize" keywords into one or more hashtags (#'s) to allow for easier searching.

For example, a particular post creation player creates a playable post including an image of a soccer ball. The particular post creation player associates the keyword "football" with the playable post (e.g., the more internationally recognized term for a soccer ball). The system, in this example, may be configured to normalize the keyword "football" to "soccer ball" and/or associate additional terms with the keyword (e.g., "soccer ball") such that when post players search for "soccer" or "soccer ball," the playable post-created by the particular post creation player in this example is retrieved.

The system may be configured to enable a player to select one or more other players to "follow." The player, in various embodiments, may receive notifications or other indications when one or more of the other players they are following creates a post and/or takes some other action. It should be understood that "players" may be individuals, companies, or groups. In this way, the player may "follow" a particular company and receive notifications of the particular company's posts.

Further, the system may be configured for enabling companies (or users) to create interactive posts, such that the player may solve the posts and then access special information, advertisements, deals, sales, and the like. In various embodiments, an interactive post may act as a call to action (e.g., a post that provokes an immediate response such as selecting a link to purchase a product, etc.) As a particular example, Company A creates a playable post including an image of a new product and a phrase corresponding to the image (e.g., the phrase is, for example, the name of the new product), once solved by a particular player, the post presents a link or automatically sends the particular player to a page where the particular player can buy the new product (e.g., at a discount). In this example, the particular player may be given a different discount dependent on how may turns it took the user to guess the phrase.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable-instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a special purpose computer or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified, in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

As discussed above, various systems and methods herein describe a platform for sharing media. As will be understood by one of ordinary skill in the art, these media sharing systems and methods may be implemented in any suitable way. The following is a description of exemplary architecture and is but one example of how the herein described systems and methods may be implemented.

FIG. 1 is a block diagram of a system 100 according to a particular embodiment. As may be understood from this figure, the system 100 includes one or more computer networks 115, a game server 200, a database 140, one or more computing devices 152 (e.g., such as a smart phone, a tablet computer, a wearable computing device, a laptop computer, etc.), a desktop computer 154, and/or a game console 156. In particular embodiments, the one or more computer networks 115 facilitate communication between the game server 200, database 140, and one or more computing devices 152, 154, 156.

The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between the game server 200 and the database 140 may be, for example, implemented via a Local Area Network (LAN) or via the internet.

In particular embodiments, the one or more mobile computing devices 152, the desktop computing device 154, and/or the game console 156 are configured to download a game engine 300A, 300B, and/or 300C, respectively (collectively "game engine 300"). As will be understood by one of ordinary skill in the art, the game engine 300 may represent any suitable instance or portion of the systems and methods described herein that is stored locally on any of the one or more computing devices 152, 154, and/or 156.

As a particular example, a user downloads an application (or "App") from an application store, which is stored on the user's mobile device (e.g., the one or more mobile computing devices 152). Continuing with this particular example, the application includes the game engine 300, which includes the basic components of the media sharing systems and methods discussed herein. The game engine 300, in this particular example, communicates (e.g., via the one or more networks 115) with the game server 200 to receive/retrieve and/or transmit content (e.g., shareable media, statistics, user account/profile information, etc.) for use in the application on the user s mobile device.

FIG. 2 illustrates a diagrammatic representation, in various embodiments, of the architecture of an exemplary computer that can be used within the system 100, for example, as a client computer (e.g., one of the one or more computing devices 152, 154, 156 shown in FIG. 1) or as a server computer (e.g., game server 200 shown in FIG. 1). In particular embodiments, the architecture of the game server 200 may be suitable for use as a computer within the context of the system 100 that is configured to enable users to create, play, and rank posts, among other various functions. For purposes of clarity and brevity, the exemplary computer shown in FIG. 2 will be referred to as the game server 200, although it should be understood that this exemplary computer may represent any suitable computing device associated with the systems and methods described herein.

In particular embodiments, the game server 200 may be connected (e.g., networked) to other computers in a LAN, an intranet, an extranet, and/or the internet. As noted above, the game server 200 may operate in the capacity of a server, a client computer in a client-server network environment, and/or as a peer computer in a peer-to-peer (or districted) network environment. The game server 200 may be a desktop personal computer (PC) a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary game server 200 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processor 202 represents one or more processors such as a microprocessor, a central processing unit, or the like. More particularly, the processor 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 202 may also be one or more special-purpose processors such as an application specific integrated circuit (ASIC), a field programmable gate array (FPGA), a digital signal processor (DSP), a network processor, or the like. The processor 202 may be configured to execute processing logic 226 for performing various operations and steps discussed herein.

The game server 200 may further include a network interface device 208. The game server 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a machine-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processor 202 during execution thereof by the game server 200—the main memory 204 and the processor 202 also constituting computer-accessible storage media. The software 222 may further be transmitted or received over a network 115 via a network interface device 208.

The software 222 may represent any number of program modules, including, but not limited to an operating system (not shown), a game engine 300, and/or a post ranking engine 400. For simplicity and brevity, these engines are merely exemplary and may represent a number of program modules that control certain aspects of the operation of the game server 200. The game engine 300 and post ranking engine 400 are described in more detail below.

While the machine-accessible storage medium 230 is shown in an exemplary embodiment to be a single medium, the term "computer-accessible storage medium" should be understood to include a single medium, or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary Post Creation

Turning to FIG. 3, game engine 300 may carry out any number of suitable processes, many of which may be related to game play. FIG. 3 depicts an exemplary post creation and game play process by game engine 300 according to various embodiments of systems and methods disclosed herein. As will be understood by one of ordinary skill in the art, the following process (and as shown in FIG. 3) is exemplary only and the steps shown and discussed may be performed in a different order and/or a number of steps may be removed or added.

Beginning with step 310, the system is configured to receive a shareable media file and a phrase corresponding to the shareable media from a computing device associated with a first user, the phrase comprising a plurality of characters. In various embodiments, the system is configured to receive the shareable media and the phrase from a computing device associated with an individual (e.g., the first user is a player on their mobile device, etc.). In one or more embodiments, the system is configured to receive the shareable media and phrase from a computing device associated with a corporation, advertiser, and/or third party product seller (e.g., wherein the post is created as an advertisement). As discussed herein, the computing device may be any suitable computing device (e.g., mobile device, tablet, desktop computer, wearable computing device, etc.) regardless of what type of user creates and transmits the post.

The shareable media may be any suitable media received from any suitable source. In various embodiments, the system is configured to receive the shareable media by accessing memory of the first user's computing device and enabling the first user to select the shareable media as stored in the computing device memory (e.g., a mobile device's media storage, a desktop or laptop computer's memory). In particular embodiments, the system is configured to receive the shareable media by receiving the shareable media as selected from predetermined stock media (e.g., images, videos, gifs, etc. stored by the system and available to the first user). In further embodiments, the system is configured to receive the shareable media from the computing device by enabling the computing device associated with the first user to copy an image from the Internet (or any suitable source) and import the image for use with the system. In still further embodiment, the system is configured to receive the shareable media by: 1) determining whether the computing device associated with the first user is operatively connected to a shareable media capture device (e.g., a digital camera); 2) upon determining that the computing device associated with the first user is operatively connected to the shareable media capture device, enabling the first user to capture the shareable media on the shareable media capture device and directly importing the captured shareable media.

The system may be configured to receive any suitable phrase corresponding to the shareable media. In various embodiments, the system may be configured to prompt the first user to submit a series of characters which may form the phrase. In these embodiments (and others) the first user may submit any suitable characters including alpha-numeric characters, punctuation, foreign characters, etc. As will be understood by one of ordinary skill in the art, the system may be configured to receive any series of characters that may or may not be associated with the shareable media. As a particular example, the first user submits and the system receives characters "C", "A", and "T" where the shareable media is an image of a cat. Alternatively, the system may receive the same characters ("C", "A", and "T") where the shareable media is an image of a soccer ball.

The system may be configured to receive the phrase and/or characters in any suitable way. In various embodiments, the system is configured to receive the phrase and/or characters from a typing device (e.g., an alphanumeric keyboard) operatively connected to the computing device associated with the first user. In particular embodiments, the system is configured to receive the phrase and/or characters by voice command of the computing device associated with the first user. In some embodiments, the system is configured to receive the phrase and/or characters from a touch screen, touch pad, gesture input, etc. As will be discussed herein, the phrase may include any suitable characters of any language, punctuation characters, emoticons, images, gifs, etc.

The system may be further configured to enable the first user to adjust and/or define various other parameters related to the shareable media and phrase combination. In various embodiments, the system is configured to receive a number of turns, guesses, or strikes a second user may use when guessing the characters of the phrase). In some embodiments, the system is configured to receive a number of hints the second user may use when guessing the characters of the phrase (e.g., the system may be configured to enable the first user to choose the number of hints the second user may receive when guessing the phrase). In further embodiments, the system is configured to receive a font choice for displaying the characters of the phrase (e.g., the system is configured to enable the first user to choose a font to display characters of the phrase, such as TIMES NEW ROMAN, ARIAL, COMIC SANS, WINGDINGS, etc.). In still further embodiments, the system is configured to enable the first user to change the color, bold, underline, strikethrough, italicize, add a shadow to, and/or emboss the characters of the phrase. In at least one embodiment, the system is configured to enable the first user to annotate, draw on, or add stickers to the shareable media (e.g., the first user may select one or more stickers to add to a selected image). In particular embodiments, the system may be configured to enable the first user to tag the shareable media (e.g., with another user's account information, user name, etc.) and/or to add a geolocation to the shareable media.

In at least one embodiment, the system is configured to enable the first user to add audio comments to the playable post (e.g., to be heard by a second user playing the playable post). The audio comments may be any suitable message and may be a hint regarding the playable post. It will be understood by one of ordinary skill in the art that the system may be configured to associate the audio comment with the playable post in any suitable way, such as by associating an audio file with the playable post, etc.

The system may be configured to enable the first user to adjust or change the shareable media. In various embodiments, the system is configured to enable the first user to select one or more filters to change the appearance of the shareable media, such as, for example, sepia tone and/or black and white filters (e.g., to display the shareable media to a second user in sepia tone or in black and white). In particular embodiments, the system is configured to enable the first user to further modify the shareable media by, for example, cropping and/or scaling an image, video, gif, etc.

In various embodiments, the system may be configured to create a representation of the characters of the phrase. In particular embodiments, the system is configured to create a series of blanks representing the characters of the phrase (e.g., a series of visual placeholders, where each placeholder represents a character of the phrase). In one or more embodiments, the system is configured to create a number representing the characters of the phrase and/or a number representing the number of spaces, punctuation marks, etc. of the phrase (e.g., the system may display to a user a number (e.g., "10") representing the number of characters of the phrase and/or a number of spaces (e.g., "10 Characters, 2 Spaces")). The representation of the characters of the phrase is referred to as "blanks" or "series of blanks"; it should be understood from discussions herein, that "blanks" or "series of blanks" may represent any suitable representation of the characters.

At step 320, the system is configured to store the shareable media and the phrase in memory. As will be understood by the discussion above, the system may be configured to store other relevant data with the shareable media and phrase in memory, such as the number of turns the second user may take to guess the phrase, the number of misses/strikes the second user may receive when guessing characters of the phrase, the number of hints the second user may receive when attempting to guess the phrase, any keywords and/or hashtags associated with the shareable media and/or phrase, etc.

In various embodiments, the system is configured to create a thumbnail or other representation of the shareable media and phrase combination in memory. In these embodiments (and others), the system is configured to create a thumbnail displaying a smaller version of the shareable media and the number of blanks for the phrase to be displayed to the second user in a list. It will be understood by one of ordinary skill in the art that the thumbnail may be any suitable representation of the shareable media and phrase and may include (or not include), the shareable media, blanks, the phrase, punctuation of the phrase (if any), spaces (e.g., between words or groups of characters), number of strikes, etc.

Exemplary Game Play

Once a playable post is created and stored (e.g., the shareable media and phrase combination, blanks, and associated other settings), the system may be configured to enable a second user (e.g., or second users, etc) to play the playable post. In particular embodiments, the second user selects the playable post to play, receives the shareable media and blanks created to represent characters of the phrase, and attempts to guess the phrase letter-by-letter by selecting letters presented by the system. A number of variations on this game play will be discussed below.

Continuing with FIG. 3, at step 330, the system is configured to transmit the shareable media, the phrase, and a series of blanks corresponding to each of the plurality of characters to a second computing device associated with a second user. In various embodiments, the system is configured to transmit the shareable media, the phrase, and the series of blanks corresponding to each of the plurality of characters (the "playable post") based upon and/or in response to receiving, a request front the second user's computing device to transmit the playable post. In some embodiments, the system is configured, to transmit the playable post in response to receiving a request from a third user to transmit the playable post to the second user's computing device. In these embodiments (and others), the system is configured to transmit, the playable post to the second user's computing device because the playable post has been selected by the first user to be sent to the second user. It will be understood by one of ordinary skill in the art, that the first user may select the playable post to send to the second user's computing device in any suitable way, such as by creating the playable post and directing the system to send the playable post, to one or more users. Including the second user, by user-name and/or other credential (e.g., if the system is connected, to a social network, by the second user's social network credentials) and/or by selecting the playable post front a list, of playable posts (e.g., regardless of whether the first user created the playable post) to send to one or more users, including the second user.

The system may be configured to transmit the playable post to the second user in any suitable way. In various embodiments, the system is configured to transmit the playable post to the second user by selecting the playable post in memory (e.g., at database 140 discussed in association with FIG. 1), and transmitting data representing the playable post to the computing device associated with the second user via a network (e.g., one or more networks 115).

At step 340, the system is configured to receive a selection of a certain character of a plurality of predefined characters from the second computing device. In particular embodiments, the system is configured to receive the selection of the certain character from the second computing device by receiving an indication that the second user has selected the certain character on an input mechanism of the second computing device (e.g., a touchscreen input on a mobile device or tablet, a keyboard input on a desktop computer, etc).

The plurality of predefined characters may include any suitable characters. In various embodiments, the plurality of predefined characters includes English language alpha-numeric characters. In some embodiments, the plurality of predefined characters includes punctuation, such as ".", ";", "?", "!", etc. In further embodiments, the plurality of predefined characters includes various symbols and/or emoticons. In still further embodiments, the plurality of predefined characters includes non-English, alpha-numeric characters, such as characters specific to German, Russian, Mandarin (Chinese), Japanese, Spanish, and/or French languages. As will be understood by one of ordinary skill in the art, the plurality of characters may include any suitable characters and the list of languages above is intended to be exemplary only.

The system may be configured to receive the selection of the certain character after, or in response, to any suitable action. In various embodiments, the system is configured to receive the selection of the certain character after or in response to transmitting the predefined characters to and/or displaying the predefined characters on the second computing device. In one or more embodiments, the system is configured to receive the selection of the certain character from the second computing device based on, or in response to, one or more notifications, one or more actions by the second user (e.g., guessing a character, requesting a hint, etc.), etc.

At step 350, the system is configured to, in response to receiving the selection of the certain character from the second computing device, compare the certain character to each of the plurality of characters of the phrase stored in memory for determining whether the plurality of characters comprise the certain character. The system may be configured to compare the certain character to each of the plurality of characters in the phrase in any suitable way and may depend upon how the plurality of characters are stored in memory. In at least one embodiment, the system is configured to parse the plurality of characters (e.g., if they are stored in memory as a string of characters and/or as the phrase) and compare the certain character to each of the parsed characters. In some embodiments, the plurality of characters may be stored in memory separately (e.g., as a character, opposed to a string) in a table or other suitable data construct and. the system is configured to compare the certain character to each of the plurality of characters by comparing the certain character to each character/position of the table or portion of the table. In further embodiments, the system is configured to classify the certain character (e.g., as a punctuation mark, emoticon, letter, number, etc.) and compare the classified character only to characters of the plurality of characters of the same class (e.g., where the system classifies each of the plurality of characters and stores each of the plurality of characters in memory associated with the classification). As will be understood by one of ordinary skill in the art, the system may be configured to compare the certain character to the plurality of characters on the game server (e.g., the certain character is sent to the game server from the second computing device for comparison) and/or at the second computing device (e.g., an instance of the playable post is transmitted from the game server to the second computing device and the second computing device completes the processing for the playable post on a local processor, including this comparison).

At step 360, the system is configured to, upon determining that the phrase stored in memory comprises the certain character, display the certain character in the one or more corresponding blanks on the second computing device. In various embodiments, the system is configured to display the certain character in the one or more corresponding blanks by displaying the certain character over the corresponding blank (e.g., the blank is visible "behind" the certain letter). In some embodiments, the system is configured to replace the blank with the certain letter (e.g., the blank is removed from the display and a representation of the certain character is displayed).

At step 370, the system is configured to, upon determining that the phrase stored in memory does not include the certain character, indicate to the second user that the phrase stored in memory does not include the certain character. In various embodiments, the system is configured to indicate to the second riser that the phrase stored in memory does not include the certain character by a visual indication, such as by displaying an "x" on the display of the second computing device, displaying the certain character with a line through it (e.g., a "strike out") by lighting up an indicator (e.g., making an "x" or other visual cue visible, more visible, or highlighted), etc. In further embodiments, the system is configured to indicate to the second user that the phrase stored in memory does not include the certain character by a non-visual indication such as by an audio cue, by causing the second computing device to vibrate, etc. It will be understood by one of ordinary skill in the art that the system may be configured to indicate to the second user that the phrase stored in memory does not include the certain character by any combination of indications, such as by a visual cue and by causing the second computing device to vibrate.

At step 380, the system is configured to repeat steps 340-370 until a) each of the series of blanks displays a corresponding character or b) determining that the phrase stored in memory does not comprise the certain character n times.

Upon completing the playable post, the second user may have any number of options discussed herein, including, but not limited to: 1) creating a new playable post to send to the first user; 2) creating a new playable post using the shareable media file used in the playable post (e.g., creating a new playable post based on the same shareable media of the playable post); 3) sharing the playable post with other users; 4) saving the playable post for later; 5) ranking the playable post; and/or 6) commenting on the playable post.

Exemplary Post Rating

FIG. 4 is a flowchart of an exemplary process wherein the system, in various embodiments, receives particular information, creates a playable post from the particular information, and enables a user to play and rate the playable post. A number of variations on these features of the systems and methods herein will be discussed below.

At step 410, the system is configured to receive a media file and a plurality of characters corresponding to the shareable media from a computing device associated with a post creation player of a plurality of players. In various embodiments, the system is configured to receive the shareable media and plurality of characters in substantially the same way as described above in step 310.

The plurality of players may be any suitable plurality of players. In various embodiments, the plurality of players includes one or more players that have accounts with the system (e.g., have created an account to play the game which may be based, for example, on a phone number, email address, user name, and/or password associated with the user). In some embodiments, the plurality of players includes one or more players that have logged into the game via a social network (e.g., a network of users for sharing messages, text, media, etc.). In further embodiments, the plurality of players includes one or more players that have downloaded an application associated with the system onto a computing device (e.g., mobile device, tablet, etc.) or have accessed an application via a web browser that allows the one or more players to create posts and/or participate in the systems and methods described herein. In still further embodiments, the plurality of players may include one or more post creators/players that represent corporate users of the system that create posts as marketing material, as advertisements, as promotional and/or sales offers, etc.

At step 420, the system is configured to create a playable post of the game from the shareable media and the plurality of characters. According to particular embodiments, the system is configured to create the playable post by creating one or more blanks for each of the plurality of characters. In various embodiments, the system is configured to create the playable post by creating a thumbnail of the shareable media. In some embodiments, the system is configured to create the playable post by creating a data object corresponding to the shareable media, plurality of characters, blanks, and other associated game features(e.g., parameters that determine how a post appears on a particular device, rules associated with what particular characters are included in the plurality of characters (e.g., what characters are included out of a larger set of characters), rules associated with how many misses and/or hints are available to a player, and/or any other suitable rules of game play and/or functionality).

The system may be configured to create any other suitable standard or non-standard functionality associated with the playable post. In various embodiments, the system is configured to create the playable post and create a thumbnail of the playable post for display (e.g., within a list of other playable posts). In some embodiments, the system is configured to create one or more hints for use in play with the playable post. In particular embodiments, the system is configured to create and/or associate any suitable backgrounds, audio effects, music, etc, with the playable post. In one or more embodiments, the system is configured to create and/or associate one or more searchable keywords and/or hashtags with the playable post (e.g., to assist a user in searching for, locating, and/or organizing the playable post).

At step 430, the system is configured to store the playable post of the game in memory. In various embodiments, the system is configured to store the playable post in memory at a central server. In particular embodiments, the system is configured to store the playable post on the computing device associated with the post creation user. According to one or more embodiments, the system is configured to store the playable post in memory in a way substantially similar to the way the system is configured, to store the shareable media and phrase in memory as described in step 320 (e.g., see FIG. 3). It will be understood by one of ordinary skill in the art that the playable post may be stored in memory in any suitable way and may be indexed by any suitable mechanism (e.g., by associating a keyword, by associating with the post creation user, etc.).

At step 440, the system is configured to display an indication of the playable post on computing devices associated with the plurality of players. In various embodiments, the system is configured to display a thumbnail or other suitable representation of the playable post on the computing devices associated with the plurality of players (e.g., upon request, the system may be configured to retrieve the thumbnail and/or other representation of the playable post from memory and display the thumbnail and/or other representation of the playable post on the computing devices of the plurality of players). In particular embodiments, the system is configured to display the indication of the playable post on the computing devices associated with the plurality of players by displaying data associated with the playable post, such as description, an icon, a representation of the post creation, player, etc, In further embodiments, the system is configured to display the indication of the playable post relative to other playable posts on computing devices associated with the plurality of players (e.g., the playable post may be displayed in a first of playable posts, in a swipe list (e.g., wherein a user can swipe left, right, up, or down on a mobile device to access the next playable post), etc.

The system, in various embodiments, is configured to display the indication of the playable post based on a suitable request from one or more of the computing devices associated with the plurality of players, in a particular embodiment, the system is configured to display the indication of the playable post based on receiving a search term that corresponds to one or more keywords and/or hashtags associated with the playable post. In some embodiments the system is configured to display the indication of the playable post based on receiving a search term associated with the post creation player (e.g., the request from the one or more computing devices associated with the plurality of players includes a search term or name that the system uses to locate posts associated with the post creation player).

At step 450, the system is configured to receive a request from a particular computing device associated with a particular player of the plurality of players to play the playable post of the game. In various embodiments, the system is configured to receive the request from the particular computing device associated with the particular player by receiving an indication that the particular player has selected the particular post or an indication of the particular post (e.g., a thumbnail of the particular post, etc.). In particular embodiments, the system is configured to receive the request from the particular computing device associated with the particular player by receiving a response to a message from the post creation player (e.g., the post creation player sends the playable post to the second computing device In a message or in another suitable form).

At step 460, upon receiving the request from the particular computing device, the system is configured to enable the particular player to play the playable post on the particular computing device. In various embodiments, the system is configured to enable the particular player to play the playable post by enabling the user to guess various characters as substantially described herein at steps 340 to 380 (FIG. 3). As will be understood by one of ordinary skill in the art, the functionality of playing the particular post may be located at the particular computing device or remotely at one or more servers (e.g., the system may be configured to transmit the playable post to the particular computing device or, in some embodiments, the system may be configured to send and receive commands and data from the particular computing device and substantially carry out the processes for playing the game on a remote server).

At step 470, the system is configured to receive, from the particular computing device, a rating of the playable post. In various embodiments, the system is configured to receive the rating of the playable post after the particular player plays the playable post (e.g., the particular player plays the post to completion, the particular player guesses each of the plurality of characters ending play of the game, the particular player accumulates a predetermined number of misses or strikes and fails to guess each of the plurality of characters ending play of the game). In one or more embodiments, the system is configured to receive the rating of the playable post before the particular player plays the playable post. In further embodiments, the system is configured to receive the rating of the playable post during the play of the playable post.

The rating may be any suitable rating. According to particular embodiments, the rating is a rating from one (1) to five (5), where each number (e.g., 1, 2, 3, 4, and 5) are represented by a star and a user selects the number of stars to indicate the rating (e.g., a user chooses three stars for a rating of "3"). In various embodiments, the rating is a percentage (e.g., the rating is displayed at a percentage, such as 61%, 5%, 100%, etc.). As will be understood by one of ordinary skill in the art, the rating may be any suitable range (e.g., one to five, one to ten, 1.5 to 2.6, one to 100, one to three, etc.). As will also be understood, by one of ordinary skill in the art, the rating may be represented in any suitable way, such as by another symbol (e.g., by hearts or spades instead of by stars), by a meter that indicates a higher rating the higher the meter reading, by the actual number of the rating (e.g., the playable post has a rating of "4"), by a letter rating (e.g., "A", "B", "C", "D", etc.), etc.

The rating may be associated with any suitable portion of the playable post or may be associated with the entire playable post. In various embodiments, the system may be configured to enable the particular player to rate a portion of the playable post, such as the shareable media, the plurality of characters (e.g., the phrase), etc. In some embodiments, the system may be configured to enable the particular player to rate the entire post, which may be used to arrange and/or sort the post (e.g., a particular player may be able to search for "top rated posts" or the like).

The system may be configured to receive other information from the particular computing, device regarding the playable post. In various embodiments, the system is configured to receive comments (e.g., text, audio comments, audio hints, etc) regarding the playable post. In further embodiments, the system is configured to receive keywords and/or hashtags to associate with the playable post.

At step 480, the system is configured to rank the playable post based at least in part on the rating received from the particular computing device. In various embodiments, the system is configured to rank the playable post against all other playable posts. In some embodiments, the system is configured to rank the playable post against a particular subset of other playable posts (e.g., playable posts with similar keywords, playable posts in the same category, playable posts created only by the post creation player, etc). In further embodiments, the system is configured to rank the playable post based on popularity, such as number of plays, number of recent plays, number of plays within a particular time-frame (e.g., the system may be configured to rank posts that are "trending"), etc.

Exemplary Features, Additional Functionality, Alternate Embodiments
Ranking Users In addition to ranking posts, as discussed above, the system may be configured to rank users (e.g., post creators). In various embodiments, the system is configured to rank a particular user based on the overall, avenge, median, highest, and/or lowest rating or ranking of one or more posts created by the particular user (as discussed above, posts may be rated and/or ranked). In further embodiments, the system may be configured to rank the particular user based on the number of one or more posts the particular user has guessed correctly, guessed the fastest, guessed with the least number of hints, and/or guessed with the fewest misses (e.g., posts created by other users played by the particular user). In further embodiments, the system may be configured to rank the particular user based on the number of posts played and/or number of posts created (e.g., a user whom has played more posts may be ranked higher than a user who has played a fewer number of posts). In still further embodiments, the system may be configured to rank the particular user on the number of points, coins, hints, etc., which may be earned or purchased by playing the game.

Award/Reward System

As discussed herein, the system may be configured to award a user for any suitable action. In various embodiments, the system is configured to award the user for correctly completing a playable post without receiving a predefined number of strikes (e.g., the user may receive a reward for completing a playable post without receiving one strike, two strikes, three strikes, etc.). According to particular embodiments, the system may be configured to award the user for creating a predefined number of playable posts (e.g., the user may receive an award for each playable post created, for two or mom playable posts created, etc.). In further embodiments, the system may be configured to enable the user to purchase awards/rewards.

The award/reward may be any suitable award or reward. According to particular embodiments, the system is configured to award the user with one or more coins based on the user competing a suitable action. In one or more embodiments, the system is configured to award the user with one or more hearts, stars, dollars, etc. for completing a suitable action. In various embodiments, the system may be configured to enable the user to earn hints (e.g., for use during game play). The system may be configured, in at least one embodiment, to enable the user to "spend" awards (e.g., coins, hints, etc.) on in-game features, such as stock shareable media (for use in creating one or more playable posts), hints, etc.

Alternate Embodiments

In an alternate embodiment, the systems and methods herein may be used for educational purposes. Particularly, the systems and methods herein, may be used by schools or educational institutions to teach and/or test students about different locations, names of various objects, etc. In a particular example, a school uses the systems and methods by transmitting playable posts including an image of a state and a phrase corresponding to the name of the state capital. In this particular example, one or more students playing these playable posts of state capitals may learn the state capitals.

As a second particular example, a set of playable posts may include an image of an object and a name of the object as the phrase. Students, in this second particular example, may guess the name of the object to help build vocabulary, teach a foreign language, etc.

In a second alternate embodiment, the systems and methods herein may be used in the contest of a text and file sharing system in a text-messaging format. As a third particular example, the system is configured to receive a media file and a phrase (e.g., a series of characters) from a user in the form of an SMS text message for other suitable messaging type), convert the media file and the phrase into a playable post including the media file and a series of blanks representing the phrase, and transmit the playable post to another user via messaging or SMS test.

In a third alternate embodiment, the system may enable a first particular user to send a shareable media file to a second particular user for a phrase to be stored by the system and transmitted to other users. In this third alternate embodiment (and others), the system is configured to enable the first particular user to select a shareable media file (e.g., an image, video, gif, etc), store the shareable media file (e.g., at the game server), transmit the shareable media file (e.g., via the game server) to the second particular user (e.g., one or more users selected by the first particular user), enable the second particular user to add a phrase to the shareable media, and transmit a playable post substantially based on the shareable media file and the phrase to a third particular user, to the first particular user, to the public, and/or to any combination of the previous users and public.

In a fourth alternate embodiment, the system may enable a user to create a phrase (e.g., caption) contest for a particular shareable media file. In this example, the user (e.g., a company) may select shareable media and instruct other users to create a phrase to associate with the shareable media. Continuing with this example, the user may set-up a suitable reward for the other user that creates the best phrase to associate with the shareable media (e.g., this may be a link to a special product, special discount, or other suitable call to action).

Exemplary User Interface

FIGS. 5-23 provide examples of the systems and methods described herein within the context of a website or application. Particularly, FIGS. 5-23 depict exemplary screenshots of various user interlaces for playing a game and sharing digital media. These figures represent interfaces which may be displayed on tablet computers, desktop computers, laptops, mobile devices, handheld devices such as smart phones, and other similar devices. These exemplary screenshots use the term "Photo." However, it should be understood that the use of "photo" in these exemplary screenshots should not be limited to photographs, but that this term may represent any media or shareable media as disclosed herein.

FIG. 5 is a user interface 500 featuring a game home screen of a particular user (e.g., the user viewing the game). The game home screen generally includes one or more playable posts (e.g., combinations of shareable media and phrases created by one or more users) and user options 530. As will be understood from discussions herein, the one or more playable posts may include any suitable number of playable posts that are arranged in any suitable way. In the particular embodiment in FIG. 5, the one or more playable posts are arrange such that the particular user can scroll through the one or more playable posts by swiping their screen vertically (e.g., up or down) to reveal new playable posts.

The game home screen 500 depicts a single playable post 501. Playable post 501 includes a post creation username 502 (e.g., a username of a player that created playable post 501), an image 504 (e.g., which may be an image, a video, a gif an audio file, etc.) associated with the post creation username 502, and other information and statistics regarding playable post 501. This other information, and statistics includes the creation, time indication 506 of when playable post 501 was created, a played number 508 depicting how many times playable post 501 has been played by users, and an average rating 510, indicating the average rating of users who have played playable post 501 (e.g., as depicted, four (4) of five (5) stars).

The playable post 501, as shown in FIG. 5, includes an image 512 and an indication that the playable post 501 has not been played by the particular user 514. The playable post 501 includes one or more blanks 516, representing a phrase associated with the image 512 to be guessed by users. As shown, the playable post 501 includes one or more comments 518 where users can leave one or more comments regarding the playable post 501.

The game home screen 500 shows user options 530. As shown, user options include a home button 540 (e.g., for displaying the home screen 500), a notices button 538 (e.g., for displaying one or more alerts, notifications, and the like as further discussed below), a create button 530 (e.g., for creating a playable post), a profile button 534 (e.g., for accessing profile information of the particular user), and a browse button 532 (e.g., for browsing playable posts, searching for playable posts, for searching hashtags, etc.). Each of these user options will be further discussed below.

Exemplary Playable Post Creation

FIGS. 6-8 depict exemplary user interfaces for creating a playable post. In various embodiments, these figures depict an exemplary series of user interfaces the particular user (above) may experience upon selecting the create button 536 from the home screen 500 discussed above.

FIG. 6 is an exemplary screenshot of a user interface for selecting a media source for selecting shareable media to use in creating a particular playable post (e.g., accessed upon the particular user selecting the create button 536 above). As shown in FIG. 6, the particular user is presented several option to choose the shareable media for creating the particular playable post, including taking a photograph 604 (e.g., with an image capture device operatively connected the device displaying the user interface), selecting the shareable media from a "camera roll" 606 (e.g., selecting the shareable media from internal memory of the device displaying the user interface), selecting the shareable media from "add from third-party source" 608, which represents the user selecting the shareable media from a third party service (e.g., via an appropriate API), such as a social network (e.g., Facebook®, Instagram®, LinkedIN®, Twitter®,) and/or a image services (e.g., Getty Images®), and pasting the shareable media 610 (e.g., enabling the particular user to copy and paste the shareable media from another source, such as the Internet).

FIG. 7 is an exemplary screenshot of a user interface 700 for enabling the particular user to add a phrase to a selected shareable media (e.g., shareable media selected from a shareable media source as discussed above regarding FIG. 6). As shown, the user interface 700 includes the selected shareable media 702, an area for displaying the phrase the particular user wishes to add to the selected shareable media 704, and a keyboard for inputting characters of the phrase the particular user wishes to add to the selected shareable media 704. As will be understood by one of ordinary skill in the art, the keyboard for inputting characters of the phrase may be any suitable keyboard or character input device. As shown in the exemplary embodiment of FIG. 7, the keyboard is a touch keyboard associated with the device displaying the user interface 790.

In various embodiments, once the particular user has entered the phrase for the selected shareable media, the system converts the phrase into a series of blanks (including spaces) and enables the particular user to approve and send the playable post to other users. FIG. 8 is an exemplary screenshot of a user interface for approving the playable post according to one embodiment of the present disclosure. As shown in FIG. 8, the user interface for approving the playable post 800 includes the selected shareable media 802, the characters of the phrase (e.g., as shown in blanks), unused spaces 806, a private post button 808 for sharing the playable post privately (e.g., with one or more users selected by the particular user), a public post button for sharing the playable post publicly (e.g., with all users), and a send button 812 for sending (e.g., approving) the playable post (e.g., the playable post is sent to a game server for storage and/or distribution to selected users and/or the public as described herein). As will be understood from discussion herein, should the particular user select the send button 812, the playable post will be sent to a selected group of users (e.g., a group of private users or all users depending upon whether the public post button 810 or the private post button 808 has been selected) as shown.

Exemplary Game Play

As discussed regarding FIG. 5, the particular user may select a playable post to play (e.g., guess the phrase associated with the shareable media and/or access other functionality). In the embodiment shown in FIG. 9, the particular user may browse playable posts on the home screen user interface 900 by swiping vertically. As shown in FIG. 9, the particular user views playable posts 902 and 904 and may select either to play (or another post not shown).

Upon the particular user selecting a particular playable post to play, in various embodiments, the particular user is presented with the user interface depicted in FIG. 10. User interface 1000 shows the playable post selected by the particular user. In the embodiment shown in FIG. 10, the playable post includes shareable media 1002, a number of strikes (e.g., the number of times the particular user may guess an incorrect letter before the game ends) 1004, and a plurality of blanks 1006 representing a plurality of characters of the phrase of the playable post, including a number of prefilled blanks 1008 displaying characters that are not guessable. Continuing with FIG. 10, this embodiment includes a set of characters 1010 that the particular user may select to guess a character of the phrase and a hint button 1012 that the particular user may select to receive a hint for guessing the phrase (e.g., the hint may be any suitable hint, such as filling in one or more characters of the plurality of characters of the phrase.

FIG. 11 shows a user interface 1100 in the midst of game play. As shown in the embodiment shown in FIG. 11, the user interface 1100 includes shareable media 1102 of the playable post, a number of strikes 1104 (e.g., the particular user has guessed an incorrect character and has thus earned a strike as characterized by the highlighted "X"), a plurality of blanks 1106 representing the plurality of characters of the phrase associated with the shareable media, a number of profiled blanks 1108, and a number of correctly guessed characters 1110 of the plurality of characters of the phrase (e.g., "S"). The embodiment shown in FIG. 11 also includes the set of characters 1112 that the particular user may guess, with two characters missing, representing characters that have been guessed (e.g., "S" and "J"). This embodiment further shows the hint button 1114 for enabling the particular user to use a hint for guessing the plurality of characters of the phrase.

FIG. 12 shows a user interface 1200 in the midst of game play. As shown in the embodiment of FIG. 12, the user interface 1200 includes "Use a Hint" 1204 indication (e.g., as shown, a pop-up style screen) displayed over the playable post shareable media. The Use a Hint semen 1204 may be displayed in response to the particular user (e.g., the particular user discussed herein that has selected and is playing the playable post) selecting a hint button 1208 and includes an available coin indication 1202 indicating a number of coins available to the particular user. The Use a Hint screen 1204 further includes a use a hint button 1206 indicating the number of coins that will be used to reveal the hint (e.g., upon the particular user selecting the use a hint button 1206, the system, in various embodiments, is configured to deduct the number of coins indicated by the use a hint button 1206 from the available coin indication 1202 and reveal the hint).

FIG. 13 shows a user interface 1300 at completion of the particular user playing the particular post (as discussed above regarding FIGS. 10, 11, and 12). As shown, user interface 1300 includes the shareable media of the playable post 1302, an indication of the number of strikes received 1304 by the particular user (e.g., two strikes as indicated by each highlighted "X"), and an indication the particular user has solved (or completed) the playable post 1306 ("Complete!"). The user interface 1300 former includes an indication of the correctly guessed plurality of characters of the phrase by highlighting the plurality of blanks 1308, an indication of the plurality of characters of the phrase displayed in each of the plurality of blanks 1310, an indication of the letters guessed by the particular user of the character set 1312, and a hint button 1314.

FIG. 14 shows a user interface 1400 after the particular user completes playing the playable post (e.g., after the user interface 1300). In the embodiment shown in FIG. 14, the user interface 1400 includes the playable post 1402 and a message 1410 indicating that the particular user completed the playable post (e.g., "Got it!") and is awarded two (2) coins. In the one or more embodiments discussed regarding FIGS. 9-14, the particular user completes play of a playable post once the message 1410 is displayed and the particular user is taken back to the home screen where the particular user may select one or more other options and/or may choose to play another playable post.

Additional Exemplary Features and Options

FIGS. 15-23 show various user interfaces featuring additional exemplary features and options of the systems and methods described herein. A particular user will be used in the following discussion of FIGS. 15-23, although it should be understood by one of ordinary skill in the art that any user may access these features and options. Beginning with FIG. 15, a user interface 1500 displays exemplary options available to the particular user after playing a particular playable post 1502. As shown in the embodiment in FIG. 15, the previously played post 1502 is displayed in the background of various options 1504 relating to the previously played post 1502. As shown in FIG. 15, the various options 1504 relating to previously played post 1502 include a "Dog-ear It!" option 1500 for recommending the previously played post 1502 to another user and/or to save the previously played post to memory so the user may find the previously played post (e.g., the previously played post is associated with the user's account), a hide option for hiding the previously played post 1502 from the particular user's home screen, a replay option enabling the particular user to replay the previously played post 1502, and a share option 1512 for enabling the particular user to share the previously played post 1502 with other users and/or on one or more social networks (e.g., a media or message sharing social computing network). According to the embodiment shown in FIG. 15, the various options 1504 further include a cancel button for exiting the various options 1504.

FIG. 16 shows an exemplary user interface 1600 for adding one or more comments to a playable post. As shown in FIG. 16, user interface 1600 includes two options, a comment viewing option 1602 and a rating viewing option 1604. In the embodiment shown in FIG. 16, the comment viewing option 1602 is selected and one or more comments from one or more other users is displayed, such as, for example, user comment 1610. In this embodiment, user comment 1610 includes the commenting user's username, shareable media associated with the commenting user, and the commenting user's comment. The user comment 1610 further includes the time of the comment 1612 (e.g., seven (7) days ago). User interface 1600 further includes a comment area 1614 for the particular user to enter a comment (e.g., by selecting the comment area 1614 and typing a comment on a suitable key-entry device).

FIG. 17 shows an exemplary user interface 1700 for viewing the average rating for a playable post and individual rating from one or more users of the playable post. As shown in FIG. 17, user interface 1700 includes a comment viewing option 1702 (e.g., see FIG. 16) and a rating viewing option 1704. In the embodiment shown in FIG. 17, the rating viewing option 1704 is selected and an average rating 1706 for the playable post is displayed (e.g., one star). Further, continuing with FIG. 17, the user interface 1700 includes one or more ratings from one or more individual users 1708 as well as an indication of whether each of the one or more individual users solved the playable post (e.g., "Got it!" for a user that solved the playable post or "Oh well . . . " for a user that did not solve the playable post).

FIG. 18 shows an exemplary user interface 1800 wherein the particular user has selected the browse button 1810 on the user home screen (e.g., as discussed above regarding FIG. 5). As shown in FIG. 18, user interface 1800 includes a title 1802, a search button 1804 (e.g., for enabling the particular user to search for a playable post by one or more keywords), example one or more hashtags/keywords 1806 (e.g., the particular user may select one of the one or more hashtags/keywords to display related playable posts), and top rated challenges 1808 (e.g., one or more highly rated playable posts, etc.), which the particular user may browse by vertical swipe.

FIG. 10 shows an exemplary user interface 1900 wherein the particular user has selected the profile button 1918 (e.g., as discussed above regarding FIGS. 5 and 18). In the embodiment shown in FIG. 19, the user interface 1900 includes a name of the particular user 1902 (e.g., full name, username, etc.), a settings button 1904 for accessing one or more settings (which will be discussed below regarding FIG. 20), various profile statistics 1906 (e.g., win percent, number of coins won, collected, and/or purchased, and number of playable post created), a following button 1906 for accessing a list of users particular user is following (as will be further discussed below regarding FIG. 21), a followers button 1908 for accessing a list of users following the particular user (as will be further discussed below regarding FIG. 22), an indication of the average rating of playable posts created by the particular user 1912 (e.g., three (3) of five (5) stars), a list of playable posts created by the particular user 1914, which includes an indication of each private post created by the particular user 1916 (e.g., indicated by the lock).

FIG. 20 shows an exemplary user interface 2000 wherein the particular user has selected a settings button (e.g., settings button 1904 in FIG. 19) or otherwise accessed settings options for their profile. As shown in FIG. 20, user interface 2000 includes a title 2002 (e.g., "Settings"), and various settings buttons including: 1) a "Your 5 Star Ratings" button 2004 (e.g., for displaying a list of playable post created by the particular user that have received a five (5) star rating); 2) a "Tell A Friend" button 2000 (e.g., for transmitting a message to an entity that is not a user of the system, such as by sending a user of a social network an invite to create an account or otherwise participate in the systems and methods disclosed herein, etc.), 3) a "Send Feedback" button 2008 (e.g., for transmitting one or more comments from the particular user regarding the systems and methods disclosed herein from a computing device associated with the particular user to a computing system associated with the systems and methods disclosed herein); 4) a "Save Original Photos" button 2010 (e.g., for saving one or more shareable media files to local memory of a computing device associated with the particular user); 5) a "Visit Our Website" button 2012 for enabling the particular user to access web-based content; 6) a "Legal Stuff" button 2014 for enabling the particular user to view various legal documents (e.g., for example, a terms of use document); and 7) a "Log Out" button 2016 for enabling the particular user to log out of the system (e.g., requiring the particular user to log back in to play or create playable posts the next time the particular user accesses the system).

FIGS. 21 and 22 show exemplary user interfaces 2100 and 2200 for displaying a list of one or more users that are being followed by, or are following, the particular user, respectively. As will be understood by one of ordinary skill in the art, the particular user may "follow" another user. In various embodiments, selecting to follow another user indicates that the particular user will receive updates and notifications associated with the users the particular user is following. For example, the particular user may receive a notification each time a user the particular user is following creates a new playable post, gives a particular playable post a five (5) star rating, etc.

As shown in FIG. 21, user interface 2100 shows a title of the screen 2102 ("Following") and a list of one or more other users the particular user is following 2104. In the embodiment shown in FIG. 21, the particular user is following four (4) other users. The four other users, in this embodiment (and in others) are each represented by a username, shareable media, and a star rating.

As shown in FIG. 22, user interface 2200 shows a title of the screen 2202 ("Followers") and one or more users following the particular user 2204. In various embodiments, the one or more users following the particular user may receive notifications when the particular user creates a playable post, rates a particular playable post a five (5) star post, etc. The one or more users following the particular user are each represented by a username, shareable media, and a star rating.

FIG. 23 shows an exemplary user interface 2300 that the system, in various embodiments, is configured to display to the particular user upon selection of the notification button 2306 (e.g., see FIG. 5). The user interface 2300 includes a title of screen 2302 ("Notices") and one or more notices 2304 regarding playable posts (e.g., various players ratings of playable posts created by the particular user), regarding other users of the system the particular user is following, and/or regarding otter users of the system following the particular user. As will be understood by one of ordinary skill in the art, previously unviewed notices may be highlighted in any suitable way, such as by being displayed in a different color than viewed notices, by being displayed at the top of a list of notifications, and/or by being displayed with an icon or other indication that the notice has not been viewed by the particular user.

Exemplary Post Sharing/Invitation Process

In various embodiments, a particular user may select a playable post to share with a third party (e.g., a person, a company, one or more connections on a social network, etc.). For example, the particular user may create a particular post or play the particular post (e.g., the particular post is created by a user other than the particular user) and then wish to share the particular post with a friend, by a method other than through the game (as discussed herein). Continuing with this example, the particular user may select the particular post and a method of sending the particular post to the friend (e.g., via email, text message, iMessage, on a social network, etc.). The system, in this example, produces a link to a website that includes a playable version of the particular post and creates an invitation that includes the link for the particular user to send to the friend. Upon receiving the invitation, the friend, in this example, can play the particular post on the website. An exemplary process of sharing a post will be further described below regarding FIGS. 24-33.

FIG. 24 is a flowchart of an exemplary process wherein the system, in various embodiments, receives a selection of a particular post (a playable post), generates a webpage for playing the particular post and a link corresponding to the webpage, and facilitates transmission of an invitation to play the particular post, where the invitation includes the link and may be transmitted in a variety of ways. A number of variations on these features of the systems and methods herein will be discussed below.

Beginning at step 2410, the system is configured to receive a selection of a particular post (e.g., a particular playable post) to be transmitted to a particular connection at a computing device associated with a particular user, wherein the particular post comprises media and one or more characters of a phrase associated with the media. In various embodiments, "a particular connection" may be any entity capable of receiving an invitation to play the particular post, including, but not limited to, an individual, a company (e.g., company representatives), a group (e.g., the particular post is transmitted to a mass text, a listserv, a mass email, a group chat, a group Snapchat, etc.), etc.

The system may be configured to receive the selection of the particular post in any suitable way. In particular embodiments, the system is configured to receive the selection of the particular post by displaying a menu of options and receiving the selection from the particular user via the menu. In various embodiments, the system is configured to receive the selection of the particular post by displaying multiple posts to be selected and receiving a selection of one or more posts, including the particular post. In at least one embodiment, the system is configured to receive the selection of the particular post by receiving an indication of the particular post, such as, but not limited to, a description of the particular post, a hash tag associated with the particular post, etc. (e.g., the particular user selects the particular post by searching for and selecting the particular post).

According to particular embodiments, the particular post includes media and a phrase associated with the media. The particular post may be constructed in any suitable way discussed herein and may include any various components and features discussed herein.

At step 2420, the system is configured to generate a webpage for playing the particular post. In various embodiments, the system is configured to generate the website for playing the particular post based upon receiving the selection of the particular post (e.g., at step 2410). In some embodiments, the system is configured to generate the website for playing the particular post at the time of the creation of the particular post (e.g., the system may be configured to create a playable website for each particular post at the time of creation). In these embodiments (and others), the system is configured to retrieve or access the website for playing the particular post (e.g., if the website for the playing the particular post has already been created and stored at the game server).

The website for playing the particular post may be generated in any suitable way. In one embodiment, the system is configured to access data associated with the particular post (e.g., data representing any media, characters, blanks, stickers, phrases, metadata etc) and convert the data into HTML or another suitable, web browser (or mobile device)—readable format. In particular embodiments, the system is configured to access data associated with the particular post and arrange the data such that the data is optimized for display via a webpage (e.g., the data is stored in a language that is readable by web browsers and/or mobile device browsers).

The webpage for playing the particular post may represent the particular post in any suitable way. In some embodiments, the webpage for playing the particular post displays the particular post in substantially the same way as the particular post is displayed in other formats (e.g., on a mobile application. In particular embodiments, the webpage for playing the particular post displays only portions of the particular post (e.g., does not display stickers, certain selected, fonts or styles, etc.). In one or more embodiments, the webpage for playing the particular post displays the particular post with portions of the particular post in a different location than displayed in other formats (e.g., blanks representing a phrase may be displayed in a different location on the webpage representing the particular post than on a mobile application).

At step 2430, the system is configured to generate a link corresponding to the webpage for playing the particular post. According to particular embodiments, the system is configured to generate the link by retrieving an identifier associated with the particular post (e.g., an address identifying where information associated with a particular post is stored on a server), appending the identifier to a domain, and associating the web address (e.g., domain plus identifier) with the created webpage. In various embodiments, the system is configured to generate the link using a random number generator to create a unique identifier and append the unique identifier to a main domain; thus, creating a unique address pointing to the webpage as stored on a server (such as a game server as discussed herein). In these embodiments (and others), the system is configured to store the unique address with information associated with the particular post at the game server. For example, the system may use a random number generator for creating a random series of letters and numbers "L3ctFb6wpY" to designate the particular post. The system, in this example, may then associate the random series of letters and numbers with the particular post and store the random series of letters and numbers at the game server. Continuing with this example, the random series of numbers and letters may be used as a subpage of a domain, such as thecaptionable.com or capt4u.com. In this example, the link to the webpage may be "capt4u.com/L3ctFb6wpY". In this example, when a user selects or accesses capt4u.com/L3ctFb6wpY with a browser, the system directs the user to the webpage associated with the particular post such that the user can play the particular post. As will be understood by one of ordinary skill in the art, the link may be any suitable way to direct the particular connection to a website, mobile application, or social network where the particular post may be played.

In various embodiments, each link generated is linked to a single website for playing a single post. In some embodiments, more than one link may direct connections to the same website for playing the same post (e.g., each time a certain post is shared, a link is generated, but a new webpage for playing the post is not). In at least one embodiment, a single link is generated for playing a specific post. In these embodiments, the single link may be transmitted to many players for playing the same playable post on the same website.

The link may be generated by any suitable component of the system. In particular embodiments, the particular user downloads an instance of an application on their mobile device. In these embodiments (and others), the link is generated at the application based on data received or retrieved from a game server operatively connected to the application that stores various information and definitions associated with the particular post (including, for example, metadata). In some embodiments, the link is generated at the game server operatively connected to the application based on information and definitions associated with the particular post stored at the game server and transmitted to the application (e.g., upon request).

At step 2440, the system is configured to receive a selection of a method of electronically transmitting an invitation to play the particular post to the particular connection at the computing device associated with the particular user. As will be further discussed herein, any suitable method of electronically transmitting the invitation may be selected. Exemplary methods for transmitting the invitation include, but are not limited to: email, SMS message, IMessage, via a social network or messaging application such as LinkedIN, Face-book, Twitter, Instagram, Snapchat, and Yik Yak. In particular embodiments, the system is configured to receive information regarding the particular connection, such as email address, telephone number, user name, handle, etc. In at least one embodiment, the system is configured to receive the information regarding the particular connection depending on the selected method of electronically transmitting the invitation (e.g., the system may receive a telephone number for sending the invitation by text message and may receive an email address for sending the invitation by email).

The invitation may include any suitable information. In various embodiments, the invitation includes a thumbnail of the media of the particular post, predetermined text, and the generated link. In these embodiments (and others), the thumbnail may be created at any suitable location, including, for example by an application downloaded by the particular user for playing a game. In various embodiments, the thumbnail may be created by a game server operatively connected to the application based on various information and definitions stored at the game server and associated with the particular post.

In particular embodiments, the invitation also includes information regarding the particular user (e.g., sender of the invitation), other information regarding the game, instructions for game play, a message, a sound, a video, a gif, etc. As will be understood by one of ordinary skill in the art, the thumbnail may include the media of the particular post, one or more blanks associated with the phrase of the particular post and any other suitable information.

At step 2450, the system is configured to facilitate transmission of the invitation via the selected method to the particular connection. In further embodiments, the system is configured to enable the particular connection to play the particular post by selecting the link. Game play of the particular post at the website may be substantially similar to the game play of a post as described herein.

Exemplary Screenshots of Various Functionality of Post Sharing

FIGS. 25-33 depict exemplary screenshots displaying various functionality of systems and methods described herein. In particular, FIGS. 25-33 show one or more features and functions for sharing a particular post with a third-party (e.g., sharing a particular post outside of a game application or website)

FIG. 25 depicts an exemplary options menu associated with a selected particular post. In the embodiment shown, the post options menu 2510 is displayed "over" the particular post 2504 to be shared and information and statistics regarding the particular post 2502, including, but not limited to a username of the user that created the particular post, a time indicating when the particular post was posted/created, a number of times the particular post has been played, and a rating of the particular post. In the embodiment shown in FIG. 25, the particular user has played or selected a particular post 2504 and selected an options menu 2510 associated with this particular post. In the embodiment shown, the options menu 2510 includes a "Send to More Friends" option 2512, a "Share" option 2514, a "Play" option 2516, a "Set as Profile Pic" option 2518, a "Delete" option 2520, and a "Cancel" option 2522. In various embodiments, the Send to More Friends option 2512 enables file particular user to share the particular post with other users within the game (e.g., with other users that have an account within the game). In particular embodiments, the Share option 2514 enables the particular user to share the particular post with third parties outside of the game environment (e.g., via email, text, social network, etc.), as will be further discussed below. In one or more embodiments, the Set as Profile Pic option 2518 enables the particular user to set the particular post as the particular user's profile picture (e.g., a picture used to identify the user within the game). In particular embodiments, the Delete option 2520 enables the particular user to remove the particular post from the particular user's screen, and/or list of playable posts that are displayed to the particular user within the game. In at least one embodiment, the Cancel option 2522 enables the particular user to close the options menu 2510.

FIG. 26 depicts an exemplary sharing method selection menu for selecting a method for sharing the particular post. In various embodiments, the sharing method selection menu 2620 is accessed when the particular user selects the Share option 2514 (as shown in FIG. 25), although the sharing method selection menu 2620 may be accessed in any suitable way. In the embodiment shown, the sharing method selection menu 2620 is displayed "over" the particular post 2604 to be shared and information and statistics regarding the particular post 2602, including, but not limited to, a username of the user that created the particular post, a time indicating when the particular post was posted/created, a number of times the particular post has been played, and a rating of the particular post.

In the embodiment of FIG. 20, the exemplary sharing method selection menu 2020 includes an icon for sharing the particular post by message (e.g., SMS message, MMS message, etc.) 2612, an icon for sharing the particular post by email 2614, an icon for sharing the particular post via a third party application 2616, an icon for wirelessly sharing the particular post (e.g., with one or more people within a certain location) 2618 and a cancel button 2622. Each of these sharing methods will be discussed in further detail below. As will be understood, the exemplary sharing method selection menu may include other methods of sharing the particular post, including: by other applications, by near-field, communication, by Bluetooth, or by any other suitable method.

FIG. 27 depicts an exemplary screen for sharing a post by message (e.g., text message). The embodiment shown includes an address field 2702 (e.g., for entering an address of one or more intended recipients of the particular post), a thumbnail image of the particular post 2704, text to accompany the particular post 2706, a link to a playable version of the particular post 2708, a send button 2710 for sending the thumbnail image, text, a link (to a website for playing the particular post), and a keyboard associated with a computing device of the particular user 2720.

The thumbnail image of the particular post 2704 may include any suitable content. According to particular embodiments, the thumbnail image of the particular post 2704 is a thumbnail image of the media associated with the particular post (e.g., photo, gif, video, etc.). In some embodiments, the thumbnail image of the particular post 2704 is a thumbnail image of the media associated with the particular post and includes one or more of the blanks of the particular post, one or more of the strikes of the particular post, etc. (as discussed herein, a playable post may include media, one or more blanks representing a phrase associated with the media, and/or a visual representation of the number of strikes (misses) a user has to complete the phrase). In at least one embodiment, the thumbnail image of the particular post 2704 includes a profile picture of the particular user sending the particular post or other information associated with particular user. In further embodiments, the "thumbnail image of the particular post" 2704 may be the actual media of the particular post or the particular post itself (e.g., opposed to a "thumbnail image" of the particular post).

The thumbnail image of the particular post 2720, in various embodiments, may be retrieved from a database for inclusion in the message for sharing the particular post. In some embodiments, the system is configured to create the thumbnail image of the particular post 2720 in response to receiving the request to share the particular post (e.g., upon the particular user selecting a method of sharing the particular post from the sharing method selection menu 2620).

The embodiment shown in FIG. 27 includes text to accompany the particular post 2706. As will be understood by one of ordinary skill in the art, the system may be configured to produce the text to accompany the particular post 2706 in any suitable way. In various embodiments the text to accompany the particular post 2706 is predetermined and is the same for each post. In some embodiments, the text to accompany the particular post 2706, varies with the method for sending the particular post and/or may be custom set by users. In one embodiment, the text to accompany the particular post 2706 includes a location of the particular user (e.g., accessed through a GPS radio of a particular computing device) or other suitable information such as the name or information of the third party to receive the particular post.

As shown in FIG. 27, the message for sharing the particular post includes the link to the playable version of the particular post 2708. The link to the playable version of the particular post 2708 may be generated in any suitable way, as further discussed herein.

FIG. 28 shows an exemplary screen for sharing the particular post by email (e.g., if the user selects email as the method for sharing the particular post at 2614 of FIG. 26). In the embodiment shown, the exemplary screen for sharing the particular post by email includes an address line 2802 for entering an email address of a third party to receive the particular post, a from/cc/bcc line 2804 for displaying from which address the particular post is being sent and/or what additional addresses should be included as copied (cc) or blind copied (bcc), a subject line 2806 for the email text to accompany the particular post 2808, a link to a playable version of the particular post 2810, and a thumbnail image of the particular post 2820.

In various embodiments, the system is configured to automatically include a subject in the subject line 2806 for the email. In these embodiments (and others), the system may be configured to include a predetermined subject for subject line 2806 that is consistent across all particular posts to be sent by email, that varies based on the particular post, that varies based on the time of day, that varies based on the date, and/or that may be customizable the user. Further, in particular embodiments, the system is configured to including additional information, in the subject line 2806, including, but not limited to, further information about the particular user sending the particular post (username, profile information), one or more emoticons, a geolocation, etc. In at least one embodiment, the text to accompany the particular post 2808, the link to the playable version of the particular post 2810, and the thumbnail image of the particular post 2820 may be substantially similar to the text to accompany the particular post 2206, a link to a playable version of the particular post 2708, and a thumbnail image of the particular post 2704 as discussed above regarding FIG. 27.

FIG. 29 depicts an exemplary screenshot for sharing the particular post by third party application (as shown here, on Twitter®). In the embodiment shown in FIG. 29, the exemplary screen for sharing the particular post includes the name of the third party application 2902, a thumbnail image of the particular post 2904, text to accompany the particular post 2906, the particular post 2908 (as shown, "behind" the third party application interface for sharing the particular post), and a keyboard of a computer device associated with the particular user. The third party application interface may be produced by the system or accessed by the system (e.g., produced by the third party application). As will be understood by one of ordinary skill in the art, upon the particular user selecting the "Post" button shown in FIG. 29, the thumbnail image 2904, the text to accompany the particular post 2906, and the link to the particular post (not shown) will be "posted" to the third party application via the particular user's account with the third party application sharing the post with other users of the third party application.

FIG. 30 shows an exemplary screenshot for sharing the particular post wirelessly. In the embodiment shown, the system is configured to show third parties within a certain geographic area of the particular user. In the embodiment of FIG. 30, only "Daniel" or "DS" is within the certain area of the particular user. Upon selecting a third party user within the certain area (e.g., Daniel), the particular user can share the particular post with the third party user (e.g., the particular user can transmit a link to a playable version of the particular post to third parties within the certain area).

FIG. 31 depicts an exemplary screen for playing the particular post on a website accessed by selecting a link transmitted by one of the various methods discussed above (e.g., message, email, social network, or wirelessly with a nearby third party). As shown in this embodiment, the website for playing the particular post includes the media of the particular post 3106 (e.g., the photo, image, video, gif, etc. of the particular post), the number of strikes the person playing the particular post has to guess a phrase of the particular post 3108, one or more blanks that represent one or more characters of the phrase of the particular post 3110 including exemplary empty blank 3112, and a plurality of selectable characters 3114. FIG. 31 also depicts various icons of the third party's web browser 3116. The playable particular post may be played in any way discussed herein, such as, for example, by the third party selecting one of the plurality of selectable characters to guess a letter of the particular phrase.

As shown in FIG. 33, if the third party guesses a selectable character correctly as one of the one or more characters of the phrase, the selectable character is displayed in a corresponding blank (e.g., as shown at 3212). Further, in various embodiments, as the third party guesses selectable characters, the guessed selectable characters are removed from the plurality of selectable characters so they may not be selected again.

If the third party correctly guesses all of the characters of the one or more characters of the phrase, the system is configured to display a message 3302 to the third party and allow the third, party user to download an application as shown, in FIG. 33. The message displayed to the third party may include any suitable information, including information regarding the particular user that sent the third party the particular post, an advertisement, a video, and/or other text. In some embodiments, upon completion of the particular post, the system may be configured to display a new post for the third party to play.

Conclusion

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A system for inviting a connection to play a particular post, the system comprising: a game server for storing posts and generating platform-agnostic post data, the game server operatively connected to an application instance provided to a particular user for playing posts, wherein the application instance is configured for:
   receiving a selection of a particular post to be transmitted to a particular connection at the application instance associated with the particular user, wherein the particular post comprises a particular electronic media file and a series of data items representing parsed characters of a particular phrase;
   receiving selection of at least one game parameter comprising customizable game features for when a user plays the particular post, the at least one game parameter selected from the group comprising a number of misses available when playing the particular post, a number of hints available when playing the particular post, a font for display of the one or more characters of the phrase when playing the particular post;
   transmitting a request to the game server for creating platform-agnostic post data comprising a platform-agnostic sharable media data object representing the particular electronic media file, a platform-agnostic phrase data object representing the particular phrase, game-play rules, and the at least one parameter by:
      (i) transforming the particular electronic media file and the particular phrase into a platform-agnostic format playable in at least two formats;
      (ii) adding game-play rules to the platform-agnostic post data, the game-play rules comprising rules for displaying the electronic media and enabling a user to guess letters of the particular phrase, wherein each guessed letter is evaluated as being included in the particular phrase prior to a subsequent letter being guessed; and
      (iii) transforming the at least one game parameter into a platform-agnostic data object;
   receiving, based on the request transmitted to the game server: a) a link generated by the game server, the link representing an address to the platform-agnostic post data; and b) a thumbnail representation of the particular post, the thumbnail representation of the particular post created by the game server;
   receiving a selection of a method of electronically transmitting an invitation to play the particular post to the particular connection at the computing device associated with the particular user; and
   in response to receiving the selection of the method of electronically transmitting the invitation to play the particular post to the particular connection, facilitating transmission of the invitation via the selected method to the particular connection, wherein the invitation comprises the thumbnail representation of the particular post and the link corresponding to the particular post.

2. The system of claim 1, wherein:
   the particular phrase comprises one or more characters; and
   the particular post is rendered on a website from the platform-agnostic post data.

3. The system of claim 2, wherein the game server is configured for:
   receiving a selected character of a plurality of selectable characters from the website;
      comparing the selected character to each of the one or more characters of the phrase associated with the media of the particular post; and
      upon determining that the selected character corresponds to at least one of the one or more characters of the phrase associated with the media of the particular post, displaying the selected character in a corresponding blank on the website.

4. The system of claim 3, wherein the application instance is further configured for, prior to receiving the selection of the particular post to be transmitted to the particular connection, receiving the electronic media file and the one or more characters of the phrase associated with the electronic media file from the particular user at the particular application instance.

5. The system of claim 1, wherein the application instance is further configured for, in response to receiving the selection of the particular post to be transmitted, accessing a menu from the computing device comprising the methods of electronically transmitting the particular post to the particular connection at a computing device associated with the particular user.

6. The system of claim 5, wherein the menu comprises one or more of the following methods of electronically transmitting the particular post: email, text message, wirelessly sharing the particular post with a nearby user, third-party application.

7. The system of claim 1, wherein the thumbnail representation of the particular post comprises the media of the particular post and one or more blanks, wherein each blank corresponds to each of one or more characters of the phrase associated with the media represented by the electronic media file of the particular post.

8. A method comprising the steps of:
receiving a selection of a particular post to be transmitted to a particular connection at a computing device associated with a particular user, wherein the particular post comprises media, represented by an electronic media file, one or more characters of a phrase associated with the media, and selected game parameters, wherein the selected game parameters comprise customizable game features for when a user plays the particular post, the selected game parameters selected from the group comprising a number of misses available when playing the particular post, a number of hints available when playing the particular post, a font for display of the one or more characters of the phrase when playing the particular post;
in response to receiving the selection of the particular post to be transmitted:
transforming the particular post into platform-agnostic data playable in at least two formats, the platform-agnostic data comprising:
a platform-agnostic sharable media data object representing the media of the particular post;
a platform-agnostic phrase data object representing one or more blanks, wherein each blank corresponds to each of the one or more characters of the phrase associated with the media of the particular post;
platform agnostic game parameters representing the selected game parameters;
a plurality of selectable characters; and
game-play rules comprising rules for displaying the electronic media and enabling a user to guess letters of the particular phrase, wherein each guessed letter is evaluated as being included in the particular phrase prior to a subsequent letter being guessed; and
generating a link corresponding to the platform-agnostic data for playing the particular post;
receiving a selection of a method of electronically transmitting an invitation to play the particular post to the particular connection at the computing device associated with the particular user; and
in response to receiving the selection of the method of electronically transmitting the invitation to play the particular post to the particular connection, facilitating transmission of the invitation via the selected method to the particular connection over a telecommunications network, wherein the invitation comprises a thumbnail representation of the particular post and the link corresponding to the platform-agnostic data for playing the particular post.

9. The method of claim 8, wherein the method further comprises the steps of:
receiving a selected character of the plurality of selectable characters;
comparing the selected character to each of the one or more characters of the phrase associated with the media of the particular post; and
upon determining that the selected character corresponds to at least one of the one or more characters of the phrase associated with the media of the particular post, displaying the selected character in a corresponding blank.

10. The method of claim 9, wherein the method further comprises, prior to the step of receiving the selection of the particular post to be transmitted to the particular connection, the step of receiving the electronic media file and data representing the one or more characters of the phrase associated with the electronic media file from the particular user at the particular computing device.

11. The method of claim 8, wherein the method further comprises the step of, in response to receiving the selection of the particular post to be transmitted, accessing a menu comprising the methods of electronically transmitting the particular post to the particular connection at the computing device associated with the particular user.

12. The method of claim 11, wherein the menu comprises one or more of the following methods of electronically transmitting the particular post: email, text message, wirelessly sharing the particular post with a nearby user, third-party application.

13. The method of claim 12, wherein the thumbnail representation of the particular post comprises the media embodied by the electronic media file of the particular post.

14. The method of claim 13, where in the thumbnail representation of the particular post further comprises one or more blanks, wherein each blank corresponds to each of one or more characters of the phrase associated with the media of the particular post.

15. The method of claim 8, wherein the method further comprises adding platform-agnostic character data to the platform-agnostic data, the platform-agnostic character data representing a plurality of predefined characters to be displayed.

* * * * *